(12) United States Patent　　　　　(10) Patent No.:　US 12,584,846 B2

Ariya et al.　　　　　　　　　　　　　(45) Date of Patent:　　Mar. 24, 2026

(54) DYNAMIC NANO-DIHM FOR REAL-TIME AND IN-SITU MEASUREMENT OF PARTICLES SUCH AS VIRUSES

(71) Applicant: THE ROYAL INSTITUTION FOR THE ADVANCEMENT OF LEARNING/MCGILL UNIVERSITY, Montréal (CA)

(72) Inventors: Parisa A. Ariya, Hampstead (CA); Devendra Pal, Montréal (CA)

(73) Assignee: THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 266 days.

(21) Appl. No.: 18/076,503

(22) Filed: Dec. 7, 2022

(65) Prior Publication Data

US 2024/0192119 A1　　Jun. 13, 2024

(51) Int. Cl.
| | |
|---|---|
| *G01N 15/1434* | (2024.01) |
| *G01N 15/01* | (2024.01) |
| *G01N 15/14* | (2024.01) |
| *G03H 1/00* | (2006.01) |
| *G03H 1/22* | (2006.01) |

(52) U.S. Cl.
CPC ....... *G01N 15/1434* (2013.01); *G03H 1/0005* (2013.01); *G03H 1/2205* (2013.01); *G01N 15/01* (2024.01); *G01N 2015/1493* (2013.01); *G01N 2015/1497* (2013.01); *G03H 2001/005* (2013.01); *G03H 2001/2244* (2013.01)

(58) Field of Classification Search
CPC .............. G01N 15/1434; G01N 15/01; G01N 2015/1493; G01N 2015/1497; G01N 15/1433; G01N 15/1459; G01N 2015/0038; G01N 2015/0233; G01N 2015/0294; G01N 2015/1454; G01N 15/0227; G03H 1/0005; G03H 1/2205; G03H 2001/005; G03H 2001/2244; G03H 1/0866; G03H 1/0443; G03H 2001/0033; G03H 2001/0447; G03H 2001/0883; G03H 2210/62
USPC ....................................................... 356/336
See application file for complete search history.

(56) References Cited

U.S. PATENT DOCUMENTS

| | | | | |
|---|---|---|---|---|
| 11,806,711 | B1 * | 11/2023 | Friedman | ................ B01L 3/505 |
| 2003/0161364 | A1 * | 8/2003 | Perry | .................... H01S 3/025 |
| | | | | 372/39 |

(Continued)

*Primary Examiner* — Md M Rahman

(74) *Attorney, Agent, or Firm* — Norton Rose Fulbright Canada LLP; Alexandre Daoust

(57) ABSTRACT

A real-time, in situ and automated technology and method for dynamic observation of airborne viruses has been developed, and its application for airborne viruses, using a model virus, MS2 bacteriophage, and SARS-COV-1 RNA, has been demonstrated. There is described a method of performing measurements using a digital in-line holographic microscope (DIHM). The method generally has: propagating a light beam through a pinhole, across a medium including particles, and to a sensor; acquiring, with the sensor, a plurality of holograms, the holograms including scattering information of the particles; and determining, from a reconstruction of the holograms, at least one of shape, size, intensity and phase of the particles from the scattering information of said particles.

23 Claims, 43 Drawing Sheets

(56) References Cited

U.S. PATENT DOCUMENTS

| 2012/0248292 A1* | 10/2012 | Ozcan | G03H 1/0866 |
| | | | 250/208.1 |
| 2013/0242301 A1* | 9/2013 | Berg | G01N 15/1434 |
| | | | 356/336 |
| 2019/0011882 A1* | 1/2019 | Gusyatin | G01N 15/1433 |
| 2023/0065504 A1* | 3/2023 | Wagner | G01N 15/1433 |
| 2023/0258917 A1* | 8/2023 | Springer | G03H 1/0866 |
| | | | 359/368 |

* cited by examiner

Bacteriophage MS2 with TiO$_2$ a) Raw hologram with many particles.
b) Clear phase reconstructed of Bacteriophage with coating of TiO$_2$.
c) TiO$_2$ spherical particle.

Airborne MS2 bacteriophage virus with MilliQ water

Airborne MS2 Bacteriophage with TiO₂ and MilliQ water

| Object ID | Taxon | Object image | X(μm) | Y(μm) | Z(μm) | Length(μm) | Width(μm) | Width(μm) | Contour | Area(μm) | Perimete | Edge gra | Roughne | R1 | R2 |
|---|---|---|---|---|---|---|---|---|---|---|---|---|---|---|---|
| 150 | Unclassified |  | 1205.23 | 923.578 | 3854.9 | 12.8869 | 12.1653 | 12.1653 | | .7743 | 52.8741 | 112.18 | 1.51275 | 0.54344 | 0.93161 |
| 150 | Unclassified | | 1229.12 | 943.248 | 3936.12 | 17.7279 | 13.359 | 13.359 | | 135.811 | 60.4525 | 114.929 | 1.37531 | 0.50767 | 0.73331 |
| 149 | Unclassified | | 1238.91 | 922.885 | 3854.9 | 6.34982 | 5.76941 | 5.76941 | | 29.4454 | 23.0363 | 98.047 | 1.13839 | 0.42919 | 0.2146 |
| 148 | Unclassified | | 1002.11 | 924.485 | 3854.9 | 12.4462 | 11.8805 | 11.8805 | | 77.4342 | 52.1023 | 122.293 | 1.63698 | 0.96415 | 1.12484 |
| 147 | Unclassified | | 1227.85 | 940.287 | 3936.12 | 18.003 | 15.7944 | 15.7944 | | 167.177 | 57.2711 | 109.801 | 1.14909 | 0.22219 | 0.55546 |

| | X (µm) | Y (µm) | Z (µm) | Length (µm) | Width (µm) | Area (µm²) | Perimeter (µm) | Edge Gradient | Roughness |
|---|---|---|---|---|---|---|---|---|---|
| | 737.3 | 779.5 | 5171 | 29.99 | 28.95 | 562.4 | 135.2 | 93.86 | 1.599 |
| | 1357 | 721.0 | 4831 | 12.52 | 12.00 | 107.0 | 39.58 | 81.30 | 1.121 |
| | 1043 | 1133 | 4722 | 9.693 | 9.693 | 62.21 | 30.77 | 91.66 | 1.085 |
| | 768.5 | 777.6 | 5171 | 29.23 | 25.28 | 498.4 | 98.05 | 99.48 | 1.243 |
| | 1289 | 933.2 | 4779 | 11.75 | 10.13 | 88.50 | 36.47 | 93.96 | 1.085 |

Fig. 29

DYNAMIC NANO-DIHM FOR REAL-TIME AND IN-SITU MEASUREMENT OF PARTICLES SUCH AS VIRUSES

FIELD

The improvements generally relate to the field of digital in-line holographic microscopy.

BACKGROUND

In the era of COVID-19 and climate change, novel mutating viruses will increasingly affect humans. Yet, humanity is not ready for them. Even key identified factors in viral disease transmission of respiratory diseases, such as size, number density, transmissivity, and transformation processes of viruses, in their entirety, in real time or in situ are unknown that are essential for formulating smart responses and better management of the current and future pandemics.

In-situ and real-time characterization of airborne particle (aerosol) size, phase, and morphology is vital to several fundamental and applied research domains, including atmospheric chemistry and physics, air quality, climate change, and human health. Aerosols are diverse and are emitted from anthropogenic or natural sources. Aerosols particles undergo physicochemical transformations in the atmosphere over a wide range of spatial and temporal scales. Aerosols can contain biological particles such as bacteria and viruses. There is increasing evidence that airborne SARS-COV-2-virion-containing aerosols can be significant in the COVID-19 transmission.

Understanding of the size, shape and phase of nanosized particles are of key importance, namely in medical imaging, optics, heterogeneous reactions, biological processes, mixed-phase colloids, and nucleation processes in climate change science.

While certain methods permit some level of observation and quantification of particles, there always remains room for improvement, such as in-situ and real-time physico-chemical characterization in four-dimensions.

SUMMARY

In the era of climate change, particles (in air aka aerosols) are also important factors in the Earth's atmospheric energy (climate change), and important in aerosol-cloud interactions. These unknowns constitute the larger uncertainty in climate change science as of now. According to the world health organization, airborne particles, particularly those particle sizes below 100 nm, cause premature death of millions every year. Indeed, the lack of physicochemical understanding such as size, surface properties, etc. are the key information that are required to narrow gaps of climate sciences as well as the challenges raised by the world health organization. Particles have sizes from a couple of nm to high micrometer scales in air, and larger particles undergo gravitation settling very quickly. Yet, in aquatic and heterogeneous phases, it can vary from a few nm to several centimeters, and in some cases more. Water moves, air movies, so are the particles in them. Lack of in-situ and real-time technology for 4D tracking of particles size, shape, surface, intensity, phase, for particles from a few nanometers to several centimeter diameters concurrently as a single particle tracking and/or ensemble of particles in air, water, and in other heterogeneous matrices.

It arises an immediate need for the development of in situ and real-time technologies to detect and classify these contaminants to evaluate a wide range of physicochemical characteristics of diverse nano/microplastic, oil waste, biological system, toxic metals, emerging chemicals, etc. that allow understanding of their environmental fate in atmosphere, aquatic, ice and heterogeneous systems and a more effective approach to remediation of natural waters, or soil or atmosphere as we have recently demonstrated for various contaminants such as oil spills, toxic metals such as mercury, as well as biological entities in the various Earth systems. With advancing coding and artificial intelligence, automation can be achieved. It allows using miniaturized detection 4D tracking in dynamic media and/or in stationary or heterogeneous phases, by providing information not only size but diverse physicochemical characteristics such as very difficult surfaces feasible. Such technologies can preferably be used in larger lab size units or very miniaturized version, can be run in two ways: (a) as sensors with automation in millisecond identification of yes or no; (b) as a more sophisticated physicochemical equipment for particles in different domains.

Such 4D tracking technologies are not just needed in the domains of imaging (e.g., electron microscopy, surface research medical imaging and pharmaceutical industries) from nanometer to centimeter, and can use for satellite, identification of extra-terrestrial materials, and detecting diseases without operation and invasive surgeries. It can also serve as part of environmental pollution (in situ sensor or as a emote sensors) for qualitative and quantitative observation, and more effective remediation in air, water, soil and heterogeneous phases. The remote sensing capability can allow global sharing the data, and improve automations. It also allows remote repair, update and improvement, and integrated robotics, allowing it to be fully smart.

Digital in-line holographic microscopy (commonly referred to as DIHM) is a highly promising alternative approach to analyzing aerosol size distributions and three-dimensional morphologies of airborne particles in real time. DIHM directly records the interference pattern of incident and scattered light with a light-sensitive matrix without any lenses or objectives. DIHM allows the recording of 6D spatial motion of aerosol particles: 3D for the position and 3D for the orientation.

A real-time, in situ, and automated technology and method for dynamic observation of airborne viruses has been developed, and its application for airborne viruses, using a model virus, MS2 bacteriophage, as well as viral RNA (SARS-COV-1), has been demonstrated. This technique does not require deposition, yet it can also be used in concert with a suite of aerosol collection techniques for further genomic studies for viruses. As such, it can be operated both as stationary and dynamic manners. The newly developed integrated DIHM-flow tube technique (generally referred to herein as the Nano-DIHM) and artificial intelligence (deep learning/automation) is successfully used to measure the airborne particle (aka aerosol) size distribution and individual particle shape, phase, and particle dimensions from the nanoscale to microscale, including airborne viruses. Aerosolized viruses were produced using an air bubbling system as well as commercialized aerosolizers (c-Flow aerosolizer), and successfully detected by Nano-DIHM. The technique visualizes moving airborne particles in three-dimensional space and allows simultaneous measurement of each particle's dimensions.

Airborne virus size, number density, distribution, shape, configuration, phase, intensity and refractive indices have been obtained, compared and validated with several aerosol sizers and high-resolution electron microscopy. Nano-DIHM enables the visualization of airborne particle dynamics in air, as well as liquid and solid matrices. Machine learning software enables the portable unit to be operated remotely. As such, it can be operated for permanent observations or as a mobile unit for indoor and outdoor air measurement. All data can be saved on cloud storage. This technique was demonstrated in the context of in situ detection and quantification of a single airborne virus as well as a cluster of viruses. It also showed that it can image virus fragments and virus complex structures, notably on various natural airborne particles. It is demonstrated that this dynamic nano-DIHM can be used to detect viruses in water and aquatic media. It has also been shown that it can distinguish various biological from other airborne and waterborne nanoparticles and microparticles, including microplastics. The unit can be used for stationary or mobile purposes. The Nano-DIHM can be used for concurrent measurements of a wide range of in-situ observation of various types of aerosols and bioaerosols simultaneously, in situ and real time, namely airborne viruses as both the droplets (>5 microns) and the aerosolized forms (<5 microns) including single virus particles that are nanoparticles. The Nano-DIHM is capable of detecting a wide range of nanoparticles to microparticles, it is shown to be able to detect other particles, including bioaerosols such bacteria, fungi, algae, and remnants of biological activities such as polymers, RNA, DNA fragments. This automated and machine learning technique can be used for in situ and real-time analysis of various known viruses and also as proactive technology for detection of new viruses.

With the system disclosed herein, a novel application of DIHM for in situ and real-time observation and quantification of airborne viruses (both aerosols and droplets) in dynamic media such as air, liquid (e.g., water) and solid is demonstrated. We show that we are able to observe single aerosols and clusters of particles in real time and in situ, along with airborne viruses and other bioaerosols, which are referred to as airborne living and dead organisms such as viruses, bacteria, fungi, algae and remnants of biological activities. Furthermore, we herein demonstrate the same equipment can lead to real-time detection of airborne and waterborne emerging particles such as microplastics. Using artificial intelligence and machine learning, the equipment can be fully automated and operated remotely, and the future advances in artificial intelligence, as well as big data collection can push the boundaries of remote control, permitting higher resolution and faster detection. The automated Nano-DIHM can be operated both in stationary and mobile manner, and remotely. The data can also be saved on cloud storage for remote sensing access from anywhere on the planet. Thus, shared resources will likely bring this innovation to more integrated levels.

To date, most digital holography setups could only characterize particles held in electrodynamic or optical traps, or particles deposited on a substrate. Investigations of airborne particles by DIHM have all been limited to relatively large particles (>1 μm). Up to now, it has been impossible to characterize airborne nanosized particles by DIHM.

We have demonstrated that DIHM, with the additional flow-tube and different optics and aerosolizers, can be used for characterizing nanosized particles such as bioaerosols including viruses. The technique has been applied to different types of nanoscale objects in a range of stationary and moving matrices (air, water, and solid materials). Herein we developed this technology for airborne viruses by addressing three above-mentioned objectives. We herein demonstrated the successful application of Nano-DIHM for real time in situ determination of the shape, size and phase of nanosize particles (<200 nm), in dynamic systems such as ambient air, without optical traps or additional lenses, with a high refractive index accuracy/resolution of 0.001.

Nano-DIHM also evaluates the dynamics of moving aerosol particles in 3D space, characterizing the dimensions of individual airborne particles in a whole particle ensemble. In addition to the incorporation of all existing optical data and the creation a wide data on refractive indices of particles/materials at different matrices, i.e., not only air but also liquid and solid.

It will be understood that the expression "computer" as used herein is not to be interpreted in a limiting manner. It is rather used in a broad sense to generally refer to the combination of some form of one or more processing units and some form of memory system accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope use of partial capabilities of a given processing unit.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions.

In accordance with one aspect, there is provided a method of performing measurements using a digital in-line holographic microscope (DIHM), the method comprising: propagating a light beam through a pinhole, across a medium including particles, and to a sensor; acquiring, with the sensor, a plurality of holograms, the holograms including scattering information of the particles; and determining, from a reconstruction of the holograms, at least one of shape, size, intensity and phase of the particles from the scattering information of said particles.

In accordance with another aspect, there is provided a measurement system for use in performing shape, size, intensity and phase measurements of a medium, the measurement system comprising a digital in-line holographic microscope (DIHM) including a light source directed through a pinhole towards a sensor forming an illuminated volume between the pinhole and the sensor, and a medium holder having an interrogation volume configured to receive the medium and be placed within the illuminated volume, wherein the sensor collects holographic images of the medium.

In accordance with another aspect, there is provided a method of performing measurements of at least one of shape, size, intensity and phase of particles in a medium using a digital in-line holographic microscope (DIHM) including a light source directed through a pinhole towards a sensor forming an illuminated volume between the pinhole and the sensor, and a flow tube placed within the illuminated volume, the method comprising: circulating the medium including the particles in a interrogation volume of the flow tube, the interrogation volume overlapping with the illuminated volume of the DIHM; acquiring with the sensor a plurality of holograms, the holograms including scattering information of the particles in the medium; and determining, from a reconstruction of the holograms, at least one of shape, size, intensity and phase of the particles from the scattering information of said particles.

Many further features and combinations thereof concerning the present improvements will appear to those skilled in the art following a reading of the instant disclosure.

DESCRIPTION OF THE FIGURES

In the figures,

FIG. 12(b) background hologram recorded without PSL particles; FIG. 12(c) contrast hologram obtained after subtracting the background hologram from the raw hologram. FIG. 12(d) zoomed-in area of c1 at z=3109 μm. FIG. 12(e) particles in focus from FIG. 12(d). FIG. 12(f) zoomed-in area of FIG. 12(e) showing the precise recovery of nanosized PSL particles and their shape. FIG. 12(g, h) phase reconstruction of PSL particles;

FIG. 13(b) width, height, and length distribution of PSL particles in a single hologram over 62.5 ms; FIG. 13(c) highlighted PSL particle size distribution from FIG. 13(b) within the nanosized width of particles;

FIG. 14(b) zoomed-in region of FIG. 14(a) at Z=1547 μm; FIG. 14(d, e) phase and intensity reconstruction of the region of box b1 in FIG. 14(b); the arrow mark indicating the airborne PSL particles from nanosized to the larger diameter of particles; FIG. 14(g-i) phase, intensity, and amplitude reconstruction of PSL particles in the region of box b2 in FIG. 14(b), respectively; FIGS. 14(c) and (f) are zoomed-in intensity and amplitude images of the PSL particle clearly showing the spherical shape; FIG. 14(j-n) intensity crosscut of particles 1, 2, 3, and 4 levels in panel FIG. 14(e), respectively; and FIG. 14(n, o) the airborne PSL particle size distribution confirmation by the SMPS and the OPS;

FIGS. 15(b) and (e) the intensity response of selected particles and their diameters are 180, 110 nm (FWHM), respectively; FIG. 15(c) sum of 9 holograms with 62.5 ms temporal resolution; FIG. 15(d) reconstruction of summed hologram FIG. 15(c) in one plane with the trajectory of circled data in focus; the cross cut Red arrows indicate the directions of particles motion;

FIG. 16(d-f) in-focus high-resolution reconstructions of images at Z=1347 μm corresponding to FIG. 16a-c), respectively; FIG. 16(g and i) S/TEM images of the same 100 nm PSL samples; and FIG. 16(h) Intensity reconstructions at Z=1650 μm;

FIG. 17(*b*) Zoomed-in area of FIG. 17(*a*); FIG. 17(*c*) in-focus, high-resolution reconstruction at Z=2321 µm; FIG. 17(*d-f*) S/TEM images of same 200 nm PSL samples; FIG. 17(*g*) Intensity crosscut of particles in (c) with a diameter of 205 nm; FIG. 17(*h, i*) intensity and phase crosscut of particles with the confirmation of existing clusters of PSL particles;

FIG. 17A(c) an in focus high-resolution reconstruction at Z=2419 µm; and FIG. 17A(d-f) S/TEM images of same 200 nm PSL samples;

FIG. 18(*c, d*) Zoomed-in area circles 2 and 3 of FIG. 18(*a*); FIG. 18(*e*) S/TEM images of the same sample confirming the presence of both PSL and iron oxide nanoparticles; FIG. 18(*f*) selected area diffraction pattern and FIG. 18(*g, h*) EDS data for Spot A and Spot B, respectively;

FIG. 18A(b) a zoomed in the area circle of FIG. 18A(a), FIG. 18A(c) 3D view of phase reconstruction at 562 µm; FIG. 18A(d) a zoomed in area ranctangle shows in figure FIG. 18A(c); and FIG. 18A(e-f) S/TEM images of the same sample confirmed the existence of both PSL and iron oxide nanoparticles;

FIG. 19(*b, c*) High-resolution intensity images; FIG. 19(*d*) Phase reconstruction of image FIG. 19(*a*); and FIG. 19 (*e*) phase image;

FIG. 21(*b*) Background hologram recorded without PSL particles; FIG. 21(*c*) Contrast hologram obtained after subtracting the background hologram from the raw hologram; FIG. 21(*d-i*) Reconstruction of particles at different reconstruction position Z, showing that small changes in Z position changes the particles from focus to defocused;

FIG. 22(*b*) is raw background hologram; FIG. 22(*c*) is the resulting raw hologram after subtracting background;

FIG. 24(*b*) is phase reconstruction; FIG. 24(*c*) is intensity crosscut; FIG. 24(*d*) is phase crosscut; FIG. 24(*e-h*) show the mercury sulfide particles interacting with mineral oil at z=817 µm, where FIG. 24(*e*) is intensity reconstruction and FIG. 24(*f*) is phase reconstruction; FIG. 24(*g*) is intensity crosscut; and FIG. 24(*h*) is phase crosscut;

FIG. 25(*b*) is phase reconstruction; FIG. 25(*c*) is intensity crosscut; FIG. 25(*d*) is phase crosscut, FIG. 25(*e-h*) shows the mercury sulfide particles interacting with pump oil at z=1990 µm, where FIG. 25(*e*) is intensity reconstruction and FIG. 25(*f*) is phase reconstruction; FIG. 25(*g*) is intensity crosscut and FIG. 25(*h*) is phase crosscut;

FIG. 26(*b*) is phase reconstruction; FIG. 26(*c*) is intensity reconstruction crosscut; and FIG. 26(*d*) is phase reconstruction crosscut;

FIG. 27(*b*) is compiled intensity reconstruction for iron oxide and titanium oxide mixture; FIG. 27(*c, d*) are intensity and phase reconstruction crosscuts for a PSL particle at z=2098 µm; FIG. 27(*e, f*) are intensity and phase reconstruction crosscuts for an iron oxide particle at z=3525 µm; FIG. 27(*g, h*) are intensity and phase reconstruction crosscuts for a titanium oxide particle at z=3525 µm; FIG. 27(*i*) is 3D plot of PSL movement over time; and FIG. 27(*j*) is 3D plot of iron oxide and titanium oxide mixture movement over time;

FIG. 28(*b*) is compiled 3D plot of the oil droplet movement over time; and FIG. 28(*c, d*) are intensity and phase reconstruction crosscuts for a dynamically moving oil droplet in the same sample;

FIG. 29 shows automated detection and identification of oil droplets in a flowing suspension by Stingray software, with results from the software produce object IDs as the images on the left;

FIG. 30(*b*) is phase reconstruction; FIG. 30(*c*) intensity reconstruction crosscut; FIG. 30(*d*) is phase reconstruction crosscut; FIG. 30(*e*) is intensity reconstruction; FIG. 30(*f*) is phase reconstruction; FIG. 30(*g*) intensity reconstruction crosscut; and FIG. 30(*h*) is phase reconstruction crosscut;

FIG. 31(*b*) is phase reconstruction; FIG. 31(*c*) intensity reconstruction crosscut; FIG. 31(*d*) is phase reconstruction crosscut; FIG. 31(*e*) is intensity reconstruction; FIG. 31(*f*) is phase reconstruction; FIG. 31(*g*) intensity reconstruction crosscut; and FIG. 31(*h*) is phase reconstruction crosscut;

FIG. 32(*b*) is phase reconstruction; FIG. 32(*c*) intensity reconstruction crosscut;

FIG. 32(*d*) is phase reconstruction crosscut; FIG. 32(*e*) is intensity reconstruction; FIG. 32(*f*) is phase reconstruction;

FIG. 32(g) intensity reconstruction crosscut; and FIG. 32(h) is phase reconstruction crosscut;

FIG. 33(b) is phase reconstruction; FIG. 33(c) intensity reconstruction crosscut;

FIG. 33(d) is phase reconstruction crosscut; FIG. 33(e) is intensity reconstruction; FIG. 33(f) is phase reconstruction; FIG. 33(g) intensity reconstruction crosscut; and FIG. 33(h) is phase reconstruction crosscut;

FIG. 34(b) is phase reconstruction; FIG. 34(c) intensity reconstruction crosscut;

FIG. 34(d) is phase reconstruction crosscut; FIG. 34(e) is intensity reconstruction; FIG. 34(f) is phase reconstruction; FIG. 34(g) intensity reconstruction crosscut; and FIG. 34(h) is phase reconstruction crosscut;

FIG. 35(b) is phase reconstruction of mixture; FIG. 35(c) is intensity reconstruction crosscut of titanium oxide particles in mixture; FIG. 35(d) is phase reconstruction crosscut of titanium oxide particles in mixture; FIG. 35(e) is intensity reconstruction crosscut of mercury sulfide in mixture; and FIG. 35(f) is phase reconstruction of mercury sulfide in mixture;

FIG. 36(b) is phase reconstruction; FIG. 36(c) is magnified phase reconstruction; FIG. 36(d) is intensity crosscut; and FIG. 36(e) is phase shift crosscut;

FIG. 37(e, f) Intensity and phase reconstructions of nickel oxide, with FIG. 37(g) intensity, and FIG. 37(h) phase shift crosscuts;

FIG. 38(b) phase reconstruction of elemental mercury; FIG. 38(c) Intensity, and FIG. 38(d) Phase across the crosscut of elemental mercury particles; FIG. 38(e) Intensity reconstruction of mercury oxide; FIG. 38(f) Phase reconstruction of mercury oxide; FIG. 38(g, h) Intensity and phase shift across the crosscut of mercury oxide particles;

FIG. 39(e, f) Intensity and phase reconstructions of benzene coated mercury oxide, with FIG. 39(g) intensity, and FIG. 39(h) phase shift crosscuts;

FIG. 40(b) is phase reconstruction; and FIG. 40(c) is intensity crosscut, FIG. 40(d) is phase crosscut;

FIG. 41(c, d) Intensity and phase shift crosscuts; FIG. 41(e, f) Intensity and phase reconstructions of MS2 bacteriophage and mercury oxide particles; FIG. 41(g, h) Intensity and phase shift crosscuts;

FIG. 42(b) is intensity reconstruction of mercury sulfide and PSL at z=640 μm; FIG. 42(c) is EDS of mercury sulfide and PSL; FIG. 42(d, e) are intensity reconstruction crosscuts for PSL and mercury sulfide respectively; FIG. 42(f) is S/TEM of decanethiol-coated mercury sulfide; FIG. 42(g) is intensity reconstruction of decanethiol-coated mercury sulfide z=3550 μm; FIG. 42(h) is EDS of decanethiol-coated mercury sulfide; and FIG. 42(i, j) are intensity reconstruction crosscuts of decanethiol-coated mercury sulfide.

DETAILED DESCRIPTION

A novel integrated digital in-line holographic microscope coupled with a flow tube (Nano-DIHM) was used to characterize particle phase, shape, morphology, and dimensions in a broad particle size range from the nanoscale to microscale. For the first time, we demonstrate the successful application of Nano-DIHM for nanosize particles (≤200 nm) in dynamic systems, such as an aerosol, without the use of optical traps. The technique allows observation of moving particles in three-dimensional space and simultaneous measurement of each particle's dimensions.

The technology described herein contains three main components: Flow tube systems (both in air and water); a DIHM unit; and an automation and deep learning unit (artificial intelligence). These different sections will be discussed in further detail below.

Figure 1:
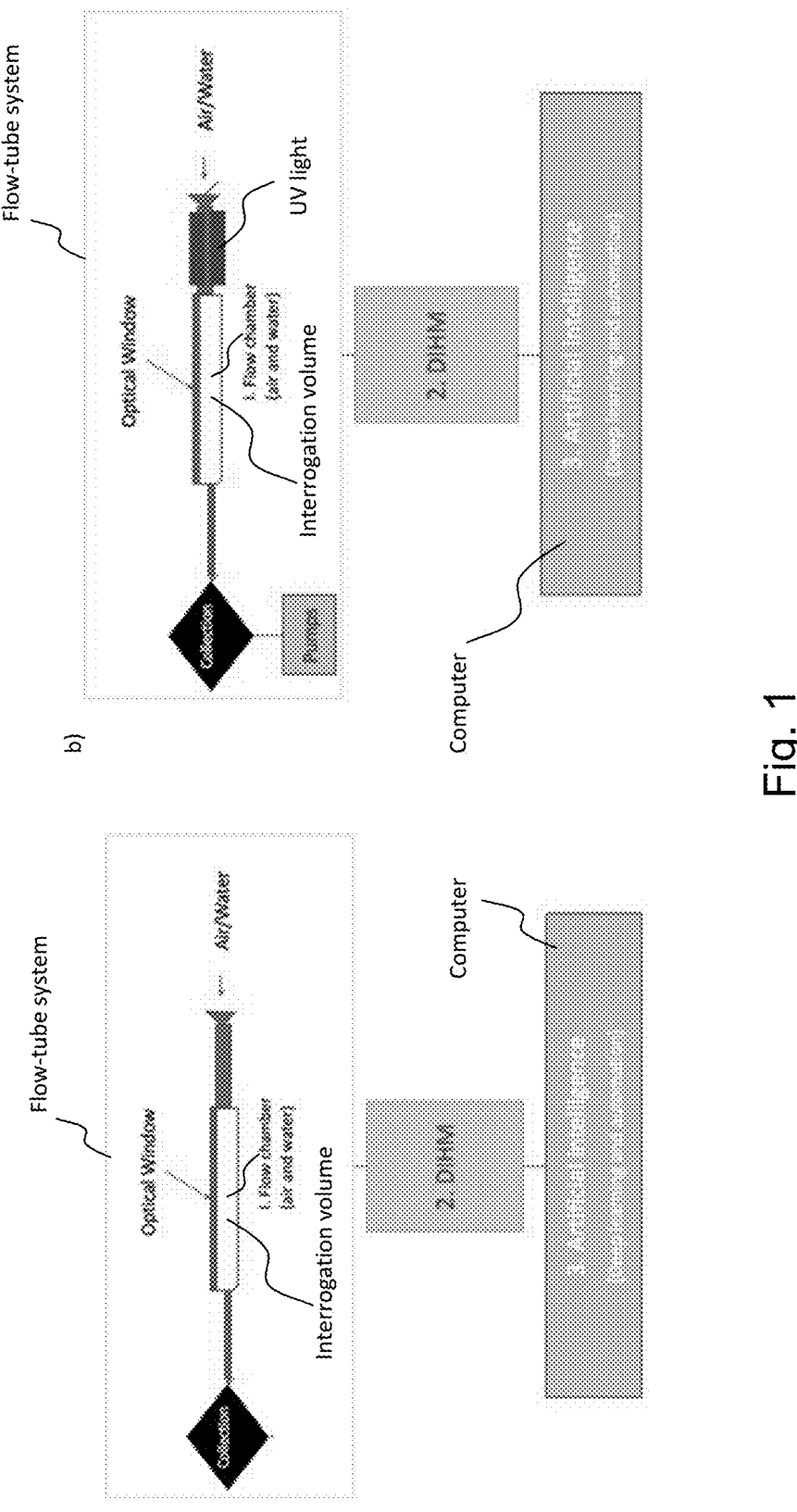
FIG. 1 is a schematic showing examples of the Nano-DIHM technology, including a flow-tube, a DIHM and an artificial intelligence unit.
Figure 2:
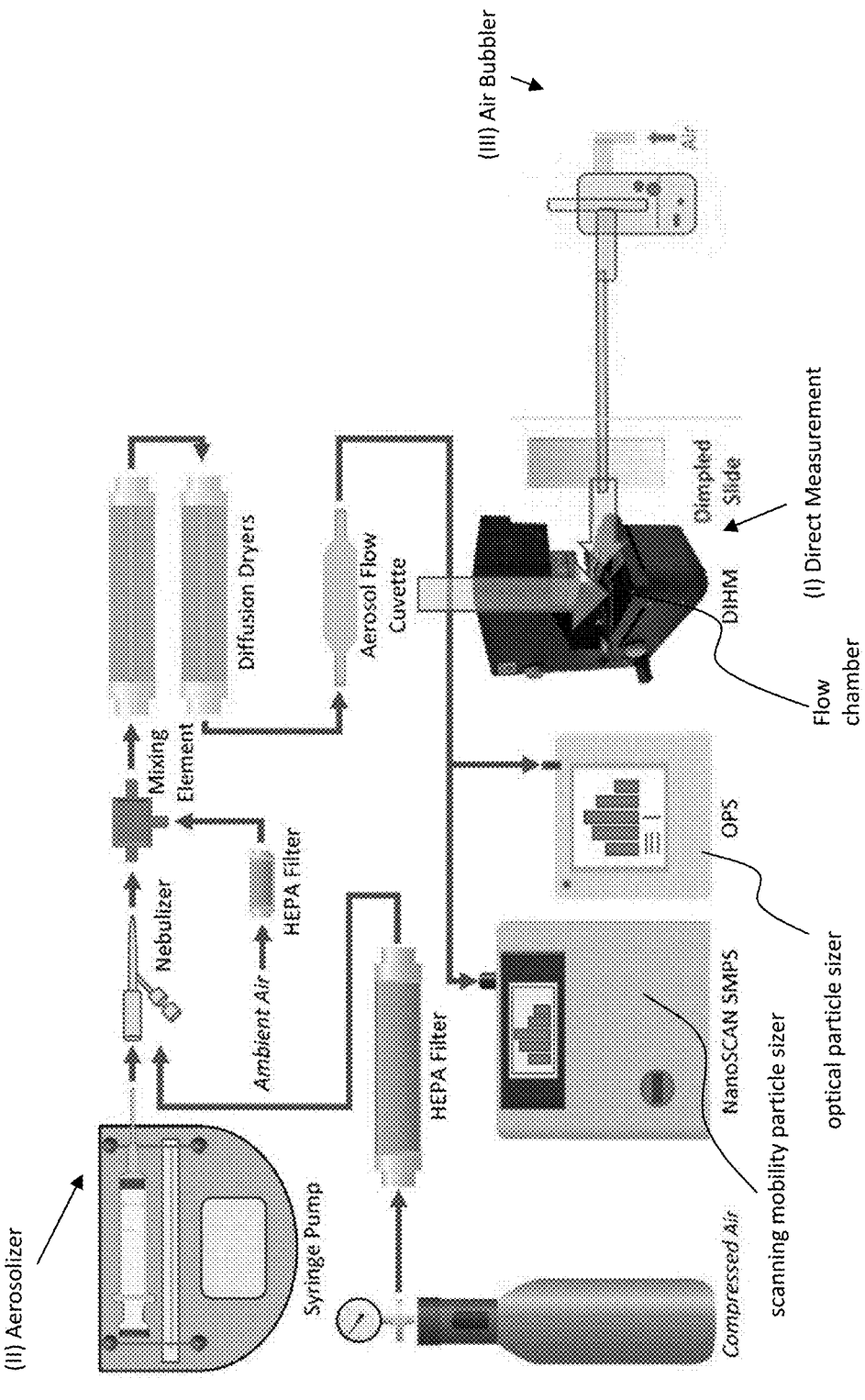
FIG. 2 is a schematic showing the different flow chambers and types of aerosolized methodologies to be used with the Nano-DIHM technology.

In FIG. 1, a simplified schematic of flow-tubes used for air and water is shown. A few types of flow tubes in air and water have been used (made of Quartz; volumes <1 ml), which were tested for two methods of operations: a) Pressure driven flow: High-pressure air or water from the inlet pushing it into the chamber, which goes out. b) Pumping driven flow: The usage of pumps to suck air and water through flowing the flow tube, which was used for most analyses. The flow tube has an inlet and an outlet. Accordingly, when the medium is circulated within the flow tube, the medium circulates from the inlet to the outlet in a directional moving flow FIG. 2. illustrates a simplified schematic of different configurations for: (I) Direct Measurement of particles in air and water. In addition to direct measurements in air and water, we used two different types of aerosolized methodology: (II) Aerosolizers (on the top left, FIG. 2) & (III) Air bubbler for various particles which were studied (FIG. 2 and Table 1 below). Air bubblers were used to mimic breathing and coughing flow velocities, while aerosol sizers have been used to higher velocities to assure aerosolization of materials. In Table 1 below, some of the experimental conditional and fluid flow (air and water) are provided. Note that although the focus was dynamic system, we used several solid particles of different sizes (deposition) and show that the technique is adequate for their observation (Table 1). The collection interface in FIG. 1 allows collecting the materials prior to pumping out. It allows further complementary physicochemical, as well as microbiological analysis. The various setups in this innovation indicate that this technology can be used as a portable detector, as part of integrated sensors or as breath analyzers.

We have used the innovation for various types of single particles and clusters, being homogeneous and heterogeneous, without and with coatings, and with different viruses and viral parts, as will be discussed in relation to Table 1, and FIGS. 3-11 described here below.

Several sample matrices have been tested: for instance, ambient air, water, snowmelt water, polystyrene latex spheres (PSL), synthetic materials such as zinc oxide (powder, <60 nm particle size, Sigma-Aldrich, Inc. Ontario, Canada) and iron oxide (iron (III) oxide, nano-powder, <50 nm particle size, Sigma Aldrich Inc. Ontario, Canada).

TABLE 1

| Sample matrix and corresponding flow rate in flow chamber | | | |
| --- | --- | --- | --- |
| Sample matrix | SSD (mm) | Flow rate (L/min) | Hologram size (pixels) | Camera pixel size (μm) |
| PSL (air) | 5 | 1.7, 0.7 | 2048 × 2048 | 5.5 |
| Snow meltwater (air) | 5 | 1.7, 0.7 | 2048 × 2048 | 5.5 |
| Ambient air | 5 | 1.7, 0.7 | 2048 × 2048 | 5.5 |
| Ambient air | 5 | Trapped | 2048 × 2048 | 5.5 |
| Snow meltwater | 5 | Stationary | 2048 × 2048 | 5.5 |
| PSL (liquid) | 5 | Stationary | 2048 × 2048 | 5.5 |
| 100-fold PSL (liquid) | 5 | Stationary | 2048 × 2048 | 5.5 |
| PSL + Iron oxide (liquid) | 5 | Stationary | 2048 × 2048 | 5.5 |
| Glycerin + oil (liquid) | 5 | Stationary | 2048 × 2048 | 5.5 |
| Zinc oxide (powder) | 5 | Stationary | 2048 × 2048 | 5.5 |
| Iron oxide (powder) | 5 | Stationary | 2048 × 2048 | 5.5 |

In the above table, the term trapped means that the flow of air was blocked using a 5 T-clip. The PSL (liquid) sample matrix refers to the original colloid solution of PSL spheres. The 100-fold PSL (liquid) sample matrix refers to a solution of 100 UL of the original colloid solution of the PSL spheres mixed with 10 mL of Milli-Q water. Milli-Q water refers herein to filtered water.

For in situ real-time measurements of ambient aerosols, an electrically conductive tube of ~122 cm was used to direct the ambient air through the gas flow cuvette placed on the stage of the DIHM instrument. The outflow (1.7 L/min) from the cuvette passed to the scanning mobility particle sizer (SMPS) and the optical particle sizer (OPS) (FIG. 2). The coupling of the SMPS and the OPS with the DIHM allowed determining the aerosol size distribution of the particles imaged by DIHM in real time.

Digital in-line holographic microscopy involves a two-stage process. At the first stage, holograms are recorded. At the second stage, the reconstruction of holograms is performed, yielding a visualization of the object(s). With the current setup, holograms were recorded using the 4Deep Desktop Holographic Microscope. The numerical reconstruction of the holograms was performed using the Octopus software package, version 2.2.0.

Several factors were used for accurate identification of airborne particles, including airborne viruses. They included size, shape, morphology (including interfacial morphology), refractive index, intensity and phase images. As described below, several cutting-edge technologies were also used to validate observations including high resolution scanning/ transmission electron microscopy (S/TEM) as well as aerosol sizers (SMPS and OPS), which confirmed the size and morphology of particles identified, including airborne viruses.

We performed experiments on a virus (MS2 bacteriophage) which is not dangerous for humans, as well as SARS-COV-1 RNA fragments. We have also experimented with different coverage of these entities and their mixtures at different conditions.

Figure 3:
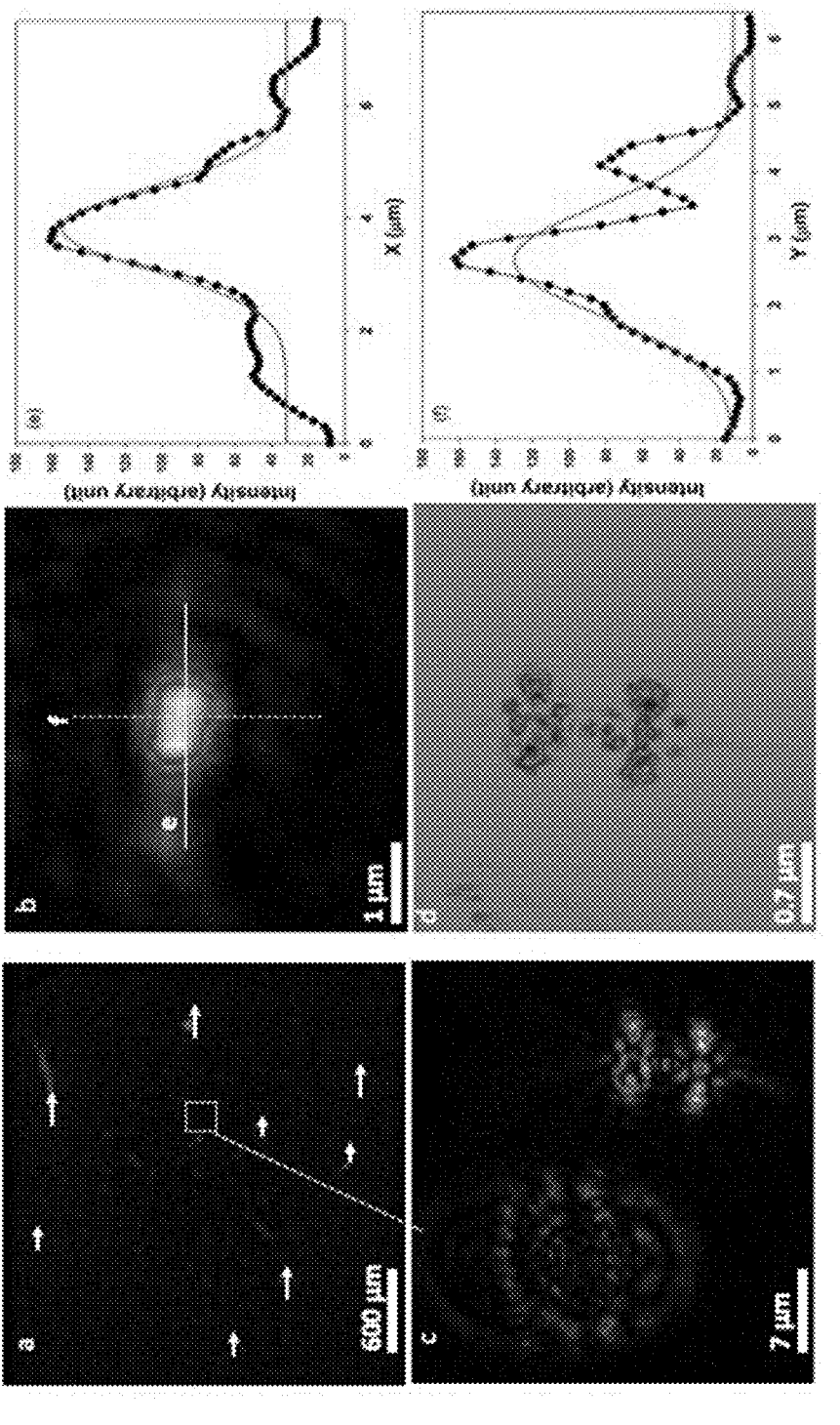
FIG. 3 is an example of images and plots of real-time in situ observation of the MS2 Bacteriophage model virus in air.
Figure 4:
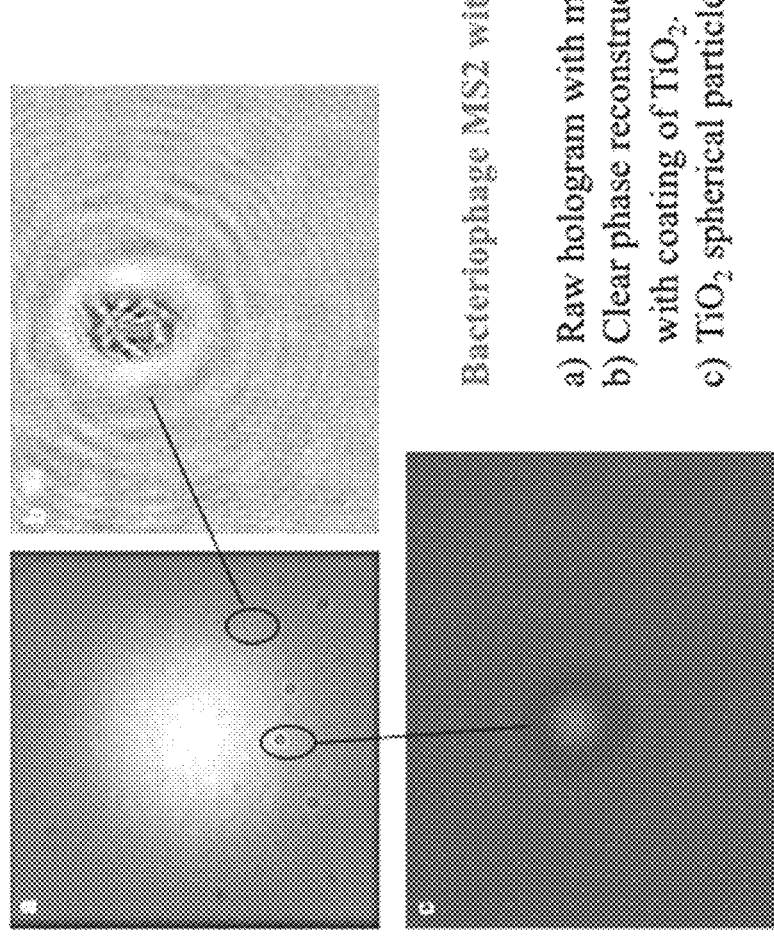
FIG. 4 is an example of holograph and phase reconstructed images of the MS2 Bacteriophage model virus with $TiO_2$ and of $TiO_2$ alone.
Figure 5:
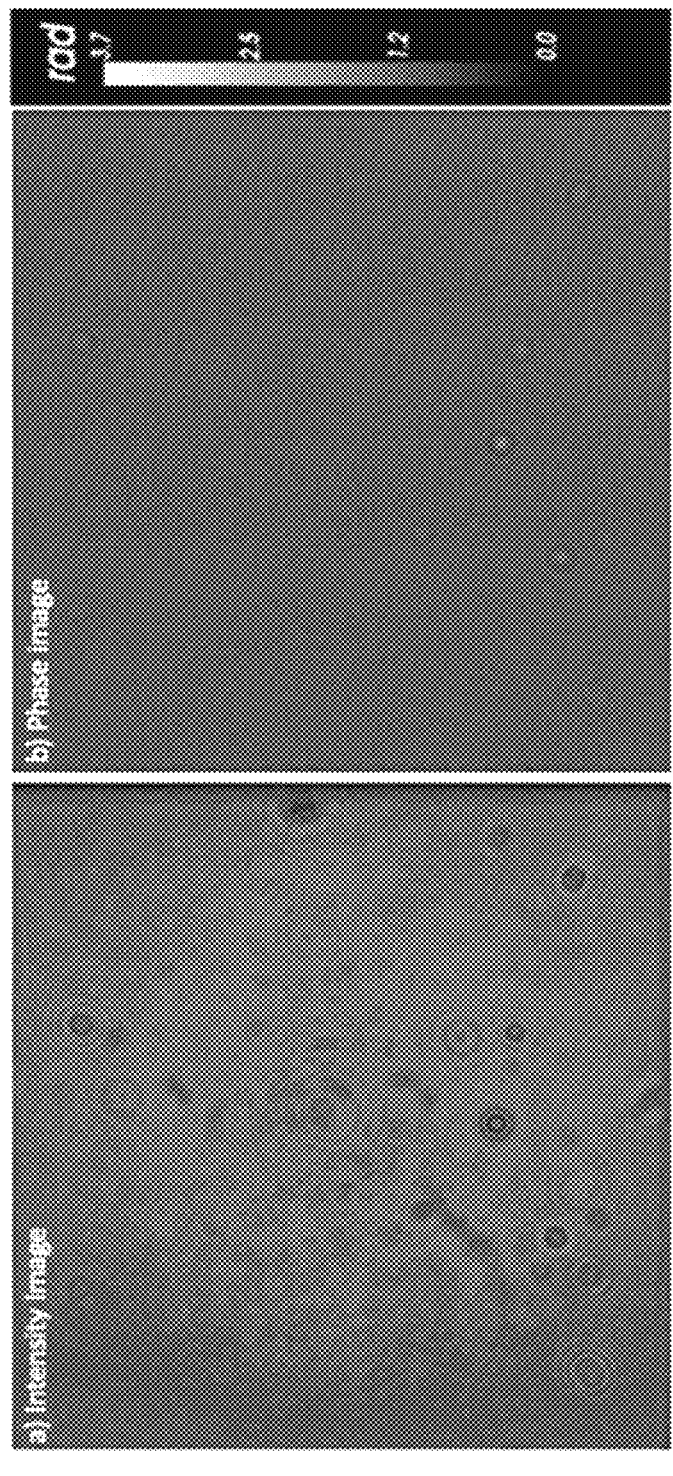
FIG. 5 is an example of intensity and phase reconstructed images of airborne MS2 Bacteriophage model virus with $TiO_2$ and water.
Figure 6:
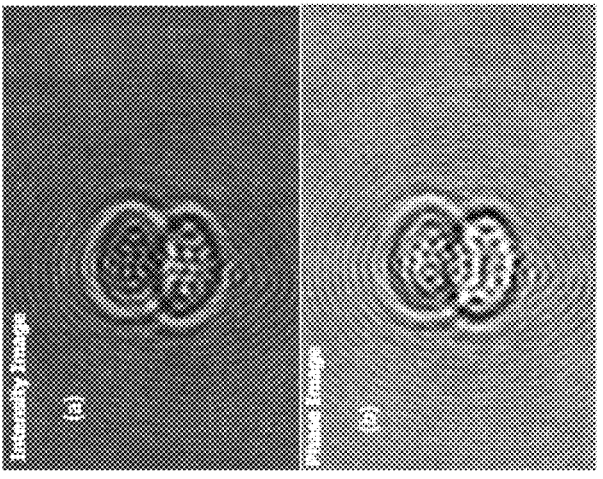
FIG. 6 is an example of zoomed in intensity and phase reconstructed images of the same conditions as FIG. 5 showing particle shape and morphology.

Airborne MS2 Bacteriophage virus: Shown in FIGS. 3-4 are the results of MS2 bacteriophage virus in air in situ and real time. Airborne viruses are speculated to be attached to particles, as shown FIG. 4 showing (a) a raw holograph, (b) clear phase reconstructed of MS2 bacteriophage with $TiO_2$ coating, (c) $TiO_2$ spherical particles alone, where it is shown that both viral and $TiO_2$ oxides can be distinguished alone, as well as when there are connected or coated. Intensity and phase images clearly reproduced the similar particle shape and morphology. Phase images indicate various interfacial morphology and phase. This is perhaps best seen in FIG. 5 showing airborne MS2 with $TiO_2$ and Milli-Q water where different materials are distinct and can be deciphered in both phase and intensity reconstructions, and in FIG. 6 showing intensity and phase images that reproduce the particles shape and morphology where the phase image indicates various interfacial morphology and phase.

Since we had developed already the capability to observe other particles from the virus in air, we aimed to evaluate multiple coatings in air. We aimed to understand if the existing technology is capable of identification of the virus from water and particle coatings on the same particles. In addition, we will be able to see two or multiple viral agglomerate in dynamic manner in real time, as shown in FIGS. 5-6. Hence the alteration of size, shape and morphology of viruses can also be obtained as a function of time.

Figure 7:
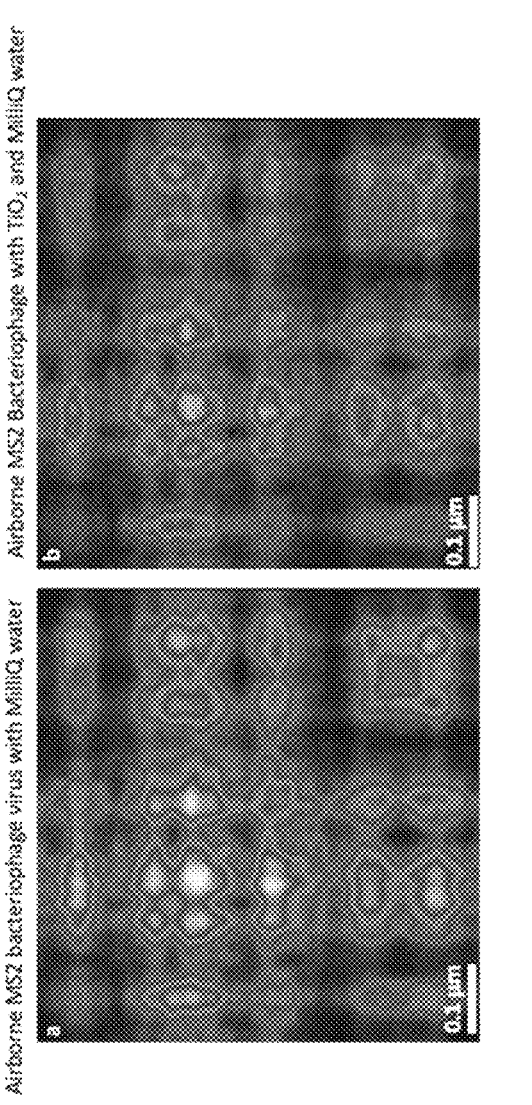
FIG. 7 is an example of airborne nanoparticles of MS2 bacteriophage in air with water and with water, in the presence of $TiO_2$ particles.
Figure 8:
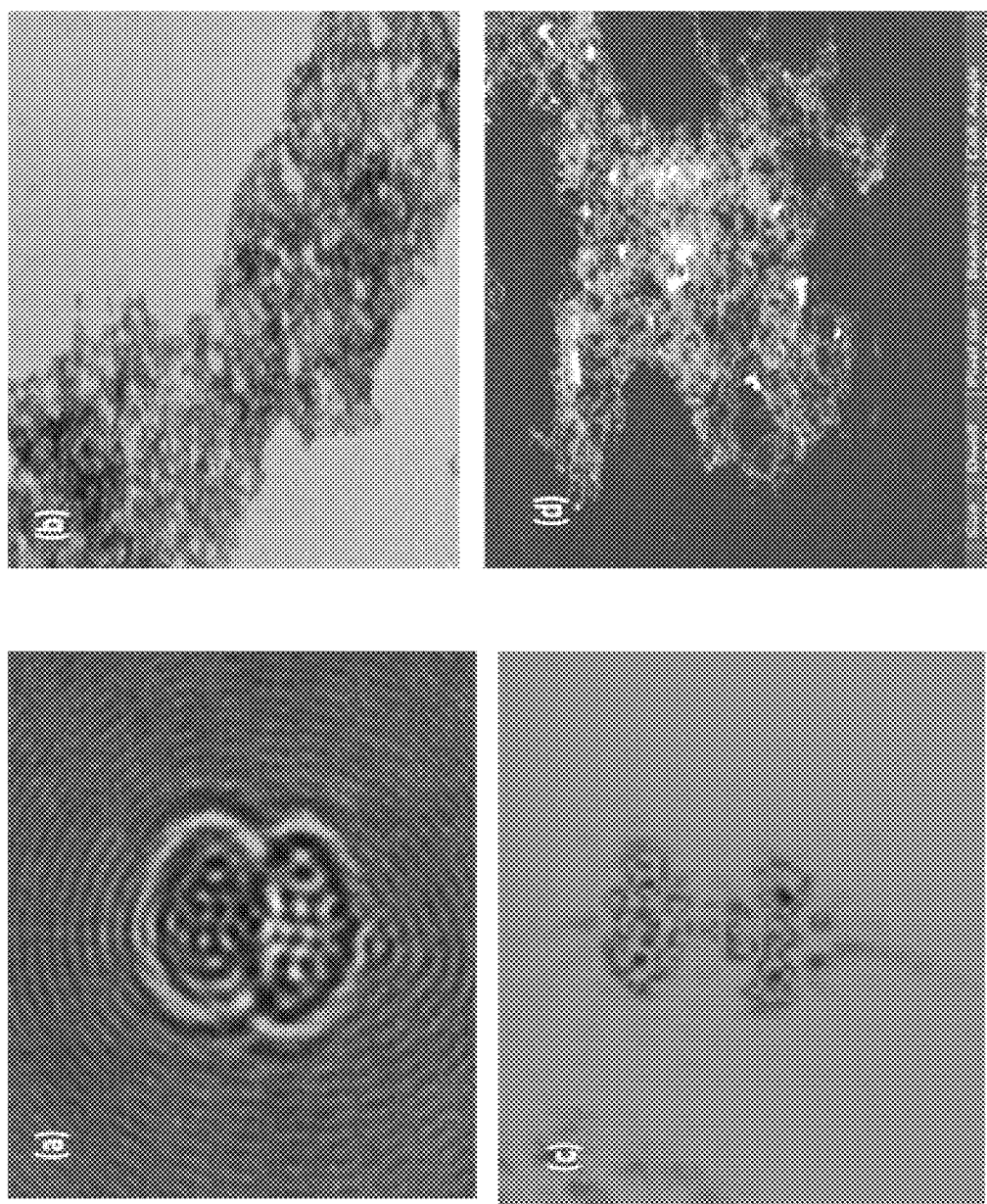
FIG. 8 is an example of Nano-DIHM images taken in the same water sample in real time and comparison STEM and TEM example images of corresponding samples.
Figure 9:
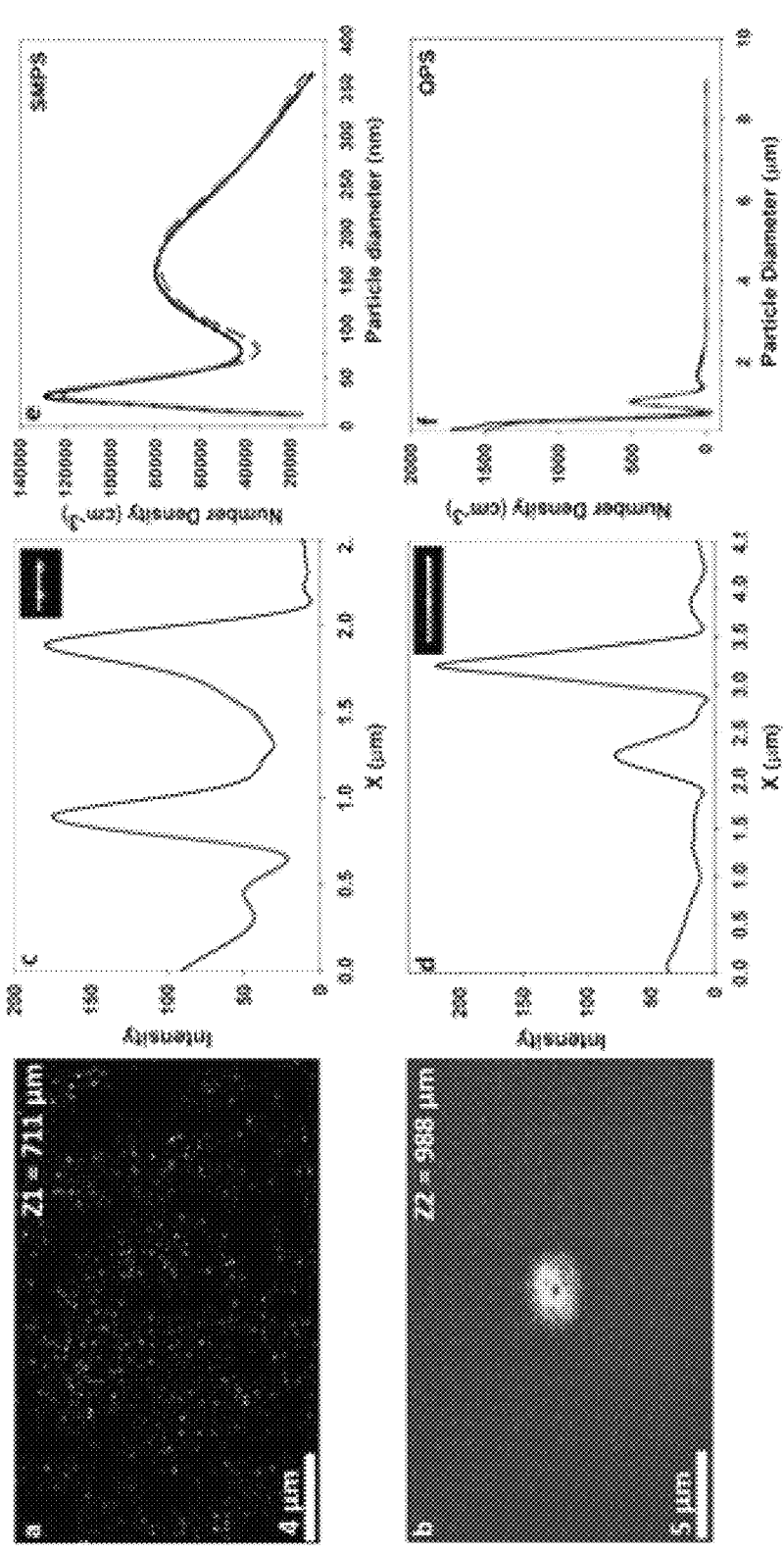
FIG. 9 is an example of Nano-DIHM images and plots of observation of microplastic (PSL) particles in the air and in water, and example of plots of the size distribution of PSL particles measured by the SMPS and OPS.

Airborne MS2 bacteriophage virus nanoparticles: Depicted in FIG. 7, we clearly show that the airborne virus, MS2 bacteriophage, can be detected at nanometer scales. Moreover, we are able to demonstrate the formation of agglomeration and its 4D evolution of images. FIG. 7-9, further discussed below, clarifies that using the technology, we are able to observe all three materials in air and in real time. Note that as this technology is 4D (3D+time), one can see the evolution of particles.

Confirmation of viral identification via Nano-DIHM in water with S/TEM: Illustrated in FIG. 8, DIHM images (a and c) taken in the same water samples in real time, is similar to high resolution S/TEM images of the same samples (b and d). Note they are not the same sample. Yet, the subsamples to take images are from the same solution batch. Size and morphological data are similar, confirming the accuracy of DIHM. The major difference between two technologies is that DIHM can be operated in situ, in moving medium, herein water, whereas S/TEM is non-in situ and it is not in real time, and thus unable to observe and quantify further transformation processes.

Detection of emerging particles including microplastic in water and in air: This technology has been shown to be able to detect various materials, in addition to bioaerosols such as viruses. The bioaerosol can include airborne microbes, living or dead, and remnants of biological activities. FIG. 9 shows an example regarding microplastics in air and water. FIG. 9 shows a reconstruction of the intensity information for microplastic (PSL) particles in the aerosol phase. (a) is the PSL particle distribution at the depth Z1=711 μm; (b) is the PSL particle distribution at Z2=911 μm. (c, d) are intensity profiles of PSL particles across the particle crosscut. The inserted black box in panels (c, d) is the crosscut across the particles. In (c), the Nano-DIHM determined the particle sizes along the crosscut through particles with diameters of 200 nm and 225 nm expressed as full width at half maximum (FWHM). In (d), a Nano-DIHM visualization of a spherical particle with a 215 nm diameter is depicted. (e, f) are the size distribution of PSL particle aerosol measured by the SMPS and OPS. The dashed red lines and the black lines correspond to the two repeats of the experiments. The particle size distribution obtained by the Nano-DIHM agreed with particle size distributions measured by the SMPS and the OPS in (e,f).

Figure 10:
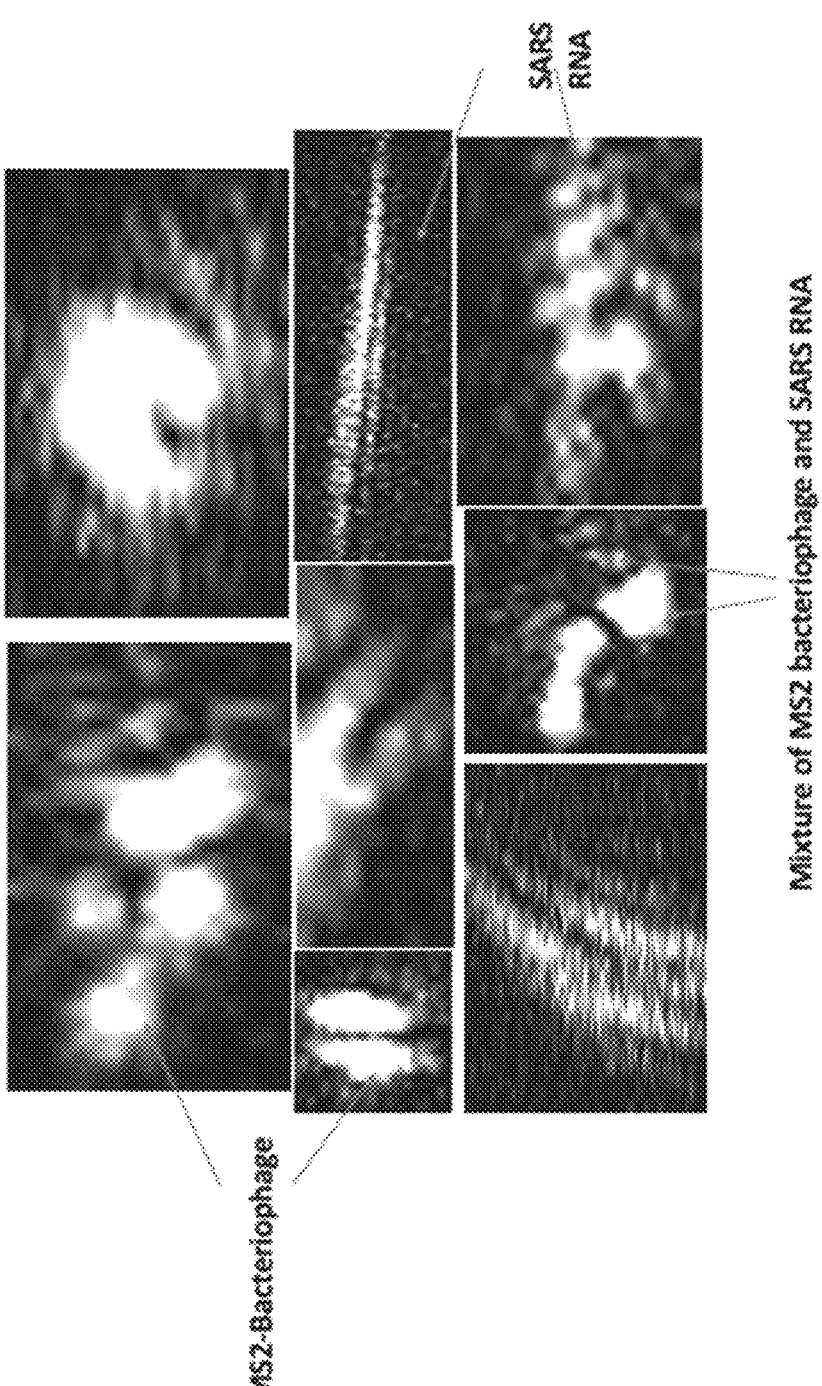
FIG. 10 is an example Nano-DIHM images of MS2 Bacteriophage and SARS deactivated (RNA), being distinguishable from one another.

The Nano-DIHM has the capability to distinguish viruses and other virus RNAs. As shown in FIG. 10, we have shown that using Nano-DIHM, one can differentiate between a virus (MS2 bacteriophage) from RNA of another virus (SARS-COV-1).

Figure 11:
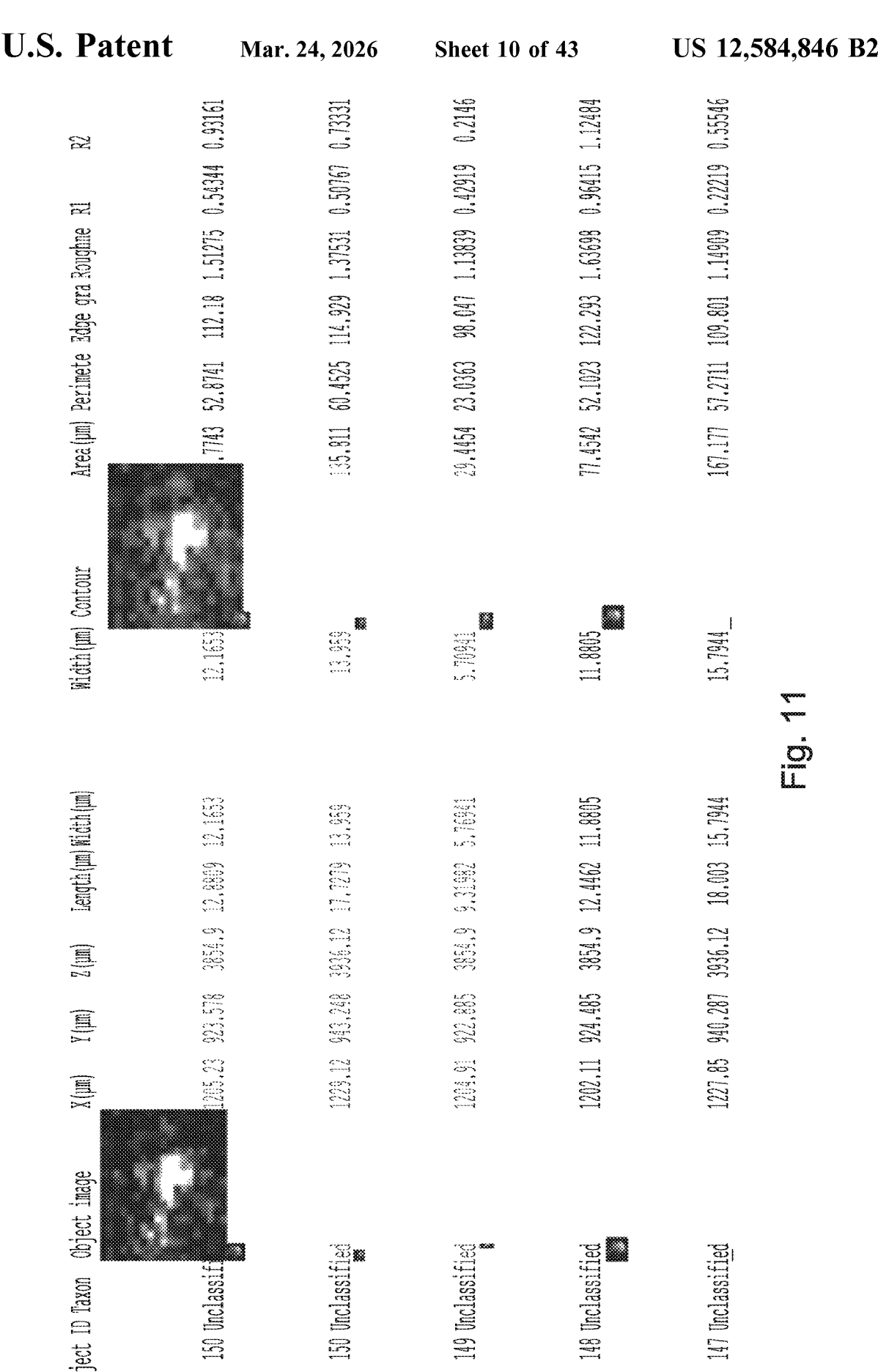
FIG. 11 is an example of reconstructed images from the Nano-DIHM technology in an exported file, of which a portion is shown.

This section provides a summary of operating processes and hologram analysis that have been considered. An example of automation results is given in FIG. 11, showing an example of fast and automated reconstruction of large volume of images made with a computer.

The Nano-DIHM can be operated in-person or remotely. Only sample preparation/injection requires in person handling, while the rest of the analysis can be conducted remotely. If the air or water in-situ sampling is used, remote sensing can be done in a continuous manner remotely. This technology can also be readily coupled to various optical sizers or other aerosol collection units.

Once the Nano-DIHM turns on, and the moving air or water flows through the flow-tube within the optical detection path of Nano-DIHM holder, or the static sample has been placed at the sample holder of Nano-DIHM, the sample holder position regarding the camera can be movable in X, Y and Z-direction by automatic controlling the motorized stage of Nano-DIHM, remotely. This allows optimizing the recording conditions of the holograms. All recording parameters can be adjusted automatically based on the mode of operation of Nano-DIHM, for example, auto mode or manual mode.

As shown in FIG. 1, one of the three pillars of this innovation is automation and deep learning. The Octopus and Stingray software were used to achieve the automation. At the same time, we built a library and big data for various airborne and waterborne particles of various sizes, along with biological entities such as MS2-bacteriophage and viral entities such as RNA particles.

The Octopus software is used for recording and manual reconstruction of holograms. Octopus cannot be used to reconstruct multiple holograms at the same time. Thus, we have been training the Stingray software to automatically reconstruct holograms in real time online or offline to obtain the information of objects based on their size, refractive index, morphology, and phase. The automation of Stingray software has been optimized and altered based on the 1) optimization of intensity, 2) reconstruction position (Z) in both plane and depth, 3) burst interval time while recording the holograms and 4) frame rate of CMOS/CCD camera.

Data from several different particles in different matrices such as Bacteriophage MS2, Polystyrene latex sphere (PSL), Iron oxide, Zinc oxide, Titanium oxide and ongoing real-time matrices in airborne, aqueous medium and solids have been developed. To identify materials/compositions mentioned above but not limited, we identified/estimated the threshold intensity values ($100\pm10$ arbitrary units), which is one of the main input parameters to identify the time-dependent morphology, size, refractive index and roughness of the objects.

For virus detections such as MS2 or irradiated MS2, the whole volume scanning is required to obtain complete information of structure/morphology, size, and refractive indexes. To reconstruct the whole volume, the depth of reconstruction position (number of planes) must be specified.

The number of planes in the z-direction is identified based on the target of particle size from nanometers to several micrometre size particles, and consists of a large number of planes within the volume reconstruction. The results obtained, for instance, the characteristics of Bacteriophage MS2, polystyrene latex sphere (PSL), Iron oxide, Zinc oxide, Titanium oxide have been stored as a whole to construct the library for further improvement of Stingray software.

As the data acquisition and building of the library increases, there is an improvement of resolution, detection and reconstruction. As such, future viruses or any biological or particulate entities, will be effectively and efficiently detected, by building up further on the currently constructed dual platform: (a) The Library (big data), and (b) Optimized and improved software and operation procedures.

In some embodiments, the method and system described herein can be used as a sensor for the detection of particles. More specifically, the method and system can be fully automated for viruses and any other type of particles can be airborne or waterborne, for instance. The method and system can be operated in a remote manner using cellphone or AI/any computing units, to name a few examples. The detection and tracking can have a resolution ranging in the order of the millisecond in some embodiments. As a sophisticated physicochemical 4D tracking equipment, the method and system described here can provide very high imaging resolution as many as high end electron microscopy, with the added of being in-situ and real-time for air, water, solid and heterogeneous, as well as the stationary analysis too, as regular non-in-situ unit.

The method and system described herein can detect particles in an improved range including, but not limited to, nanometers to several centimeters, for instance. Indeed, the method and system described herein can detect particles from nanometer to centimeter scale, which makes it relevant well beyond air or water pollution, to medicine, pharmacology, weather processes, ice nucleation, agriculture, environmental management, optics, climate change, kinetics, dynamics, etc. Major contribution and demonstration on various examined particles including nano-plastics, microplastic and plastic pallets. One of the software component can detect plastic from non-plastics in water.

In some embodiments, optical chromatography can be performed using the method and system described herein. Indeed, distinguishing some plastic particles of a first plastic type from other plastic particles of a second plastic type. For instance, particles of polyethylene, which are about half of all plastic waste, can be distinguied from other types of particles.

In some embodiments, the method and system described herein can be used as a sensor for oil spills from nm to larger scales in water, air, soil/solid, as such it can be used for oil detection. In some embodiments, the method and system described herein can be used to detect emerging contaminants. In some embodiments, mercury can be detected and tracked, and some experiments have shown that various emerging metals and rare metal can be detected as well. In some embodiments, the method and system described herein can be used to feciphering complex particles in air and water by nano-DIHM. In some embodiments, the software can be modified to include classifiers for partial and full automation. The development of the software led to ground-up coding software that allowed to go to a few nanometer while improving the surface information, and accuracy of data. In some experiments, the method and system described herein can deciphering complex particles from each other in a yes or no identification manner, for instance. In some embodiments, detection one of a few particles amongst numerous particles in complex and simple matrices. Automated detection is currently millisecond with a regular laptop computer, however, with advance coding, various superior computing, storage, accessibilities, networking, and additional capabilities, it can be much faster in future.

The method and system described herein is a three fold innovation that allows to do 4D tracking of particles from nm to micrometers, simultaneously, as well as single and multiple particle observation. Our proposed system is based on the combination of procedures that we are provided below, as well as a flow tube and collectors, for further analysis, that allow dynamic analysis as well as stationary. It shows how we measure the micro and nanometer size and cluster of particles by using Nano-DIHM, in both stationary and dynamic modes.

It was found satisfactory to shorten the distance between the pinhole and the camera. In some embodiments, the holograms are recorded near the pinhole and bring the camera closer to the quartz flow tube cuvette or quartz microscopic slide (nearly touched each other). For Nano-DIHM, the shorter the source-to-sample distance, the higher the magnification, and hence a higher resolution ($\leq$200 nm) was achieved.

It was found satisfactory to enlarge the field of view of the camera. In some embodiments, this experimental configuration is possible because the Octopus software capable to record the hologram in the size of 2048×2048-pixel with a pixel size of 5.5 $\mu$m. Hence, we achieved a larger field of view (~40 mm$^2$), which, allows tracking both single-particle and multiple particles. Another advantage of the current experimental setup shown in FIG. 8(*a*) (slightly different from original version) is that the single pinhole can work with multiple virtual illumination sources. Thus, we do not need multiple illumination sources to record the hologram.

It was also found satisfactory to increase the precision by the addition of third deconvulation: The Octopus/Stingray software was used to reconstruct the recorded holograms. We included the third deconvulation to the existing software of Octopus. Note that the original software is based on published and patented algorithm which can effortlessly achieve the lateral resolution on the order of half-wavelength ($\lambda$/2) of source and depth resolution on the order of one wavelength ($\lambda$). It was found that a further improvement was to achieve a higher resolution by using one or more deconvolutions routines during the reconstruction. For instance, during the reconstruction of the illumination system (pinhole) and the reconstruction of the finite numerical aperture of the recording screen (CCD/CMOS). Implementing an instant 3D-deconvolution routine in our reconstruction method allowed us to reach the desire resolution ($\leq$200 nm), in some embodiments. In these examples, each reconstruction has at least three deconvolutions steps. In some embodiments, the reconstruction can include more than three deconvolution steps. For instance, hundred deconvolutions steps can be performed in some embodiments.

Increasing precision was also possible by finding the plane where the phase/intensity image is most accurately focused. Thereby, if we are aimed to measure the PSL for 200 nm size, as an example, the plane must be within 0.01 micron. Otherwise, the dots will be only a few pixels and do not look like quality images. For that reason, increasing the precision with 0.001 in Octopus software allowed us to achieve high resolution. Finally, we accurately focus on blurred objects by adjusting reconstruction position (z) to up to three decimal places (0.001).

Reducing the effective wavelength was also found to be beneficial. For instance, recording holograms in an aqueous medium reduced the effective wavelength from $\lambda$=405 nm to ~300 nm. It means visible wavelength laser behaves as an ultraviolet range laser. It is to note that by changing the distance of pinhole and camera, with a field of view of 1.1 cm2, we are capable of viewing up to 16 mm particles diagonally. Hence the range of detection is now using nanoDIHM is from a few nm to a few mm levels, allowing not only nano- and micro, but also larger particles, at the same time (i.e., nanometer to millimeter size).

In some embodiments, we measured the nanosized particles by implementing the combination of experimental and numerical approaches and modified the software precision by 3rd digit. This document provides the recovery of the absolute refractive index in the mixed solution from microscopic oil type F mineral oil and glycol. The optical path lengths and get refractive index change within an accuracy of 0.001 on the submicrometer (nanosize) length scale. Using a detector with more than 8 bit resolution can push this accuracy even further. Please note that another promising additions of this technique is to measure the time-dependent changes, e.g., in situ viruse transformations, or uptake processes, surface microphysics, ice nucleation, heterogeneous reactions, material surface stability evaluation, active site determination, porosity of surfaces, change of acidity, buble formation and burst in ocean, etc.

In some embodiments, the 2D reconstruction is performed on a plane perpendicular to the optical axis to find the object, which is equivalent to a single focus image taken in a conventional compound microscope. Due to the larger field of view provided by the Nano-DIHM setup, many particles can exist in a single plane; thus, multiple particles can focus on a given reconstruction value (Z). The 3D information of the object was obtained by scanning the whole sample volume by performing the 3D reconstructions. The 3D reconstruction was performed by reconstructing the hologram on a number of planes at various distances (Z) from the sources to sample volume (Providing the X, Y and Z information). A critical advantage of Nano-DIHM is that a single 2D hologram can, in reconstruction, produce a 3D image of the objects therein without loss of resolution. Effective pixels for a particular size particle. The crosscut is an instant procedure to obtain the size of interested particles. The crosscut represents the center of the particles, and the full-width half-maximum (FWHM) refers to the size of the particle. The particle size was determined using the Kirchhoff Helmholtz equation's Gaussian distribution. The crosscut method also provided the idea of threshold values to choose to obtain the particles size distribution within the sample volume (because intensity distribution among all the particles was not the same due to their shape and size and the nature of chemical identity). Thus, in Nano-DIHM, we never really measure the pixel size vs intensity, but it is more likely the effective pixels for a particular size particle.

In determining a boundary of a particle in the processed images, it was found that some additional procedures that allow us to better obtain information on morphology and surfaces alike. In some embodiments, the 2D, 3D or 4D perimeter or boundary is determined by transforming the co-coordinates system. During the reconstruction process, the intensity distribution in the transformed coordinate system is interpolated on an equidistant point grid, and Fast-Fourier-Transforms are used to compute the result. It is mainly because different sizes and shape particles are exited; thus liner coordinate system does yield accurate results. Please note we have provided all wave functions. We are building up the library with reference materials. For instance for various airborne viruses, we are now able to perform their classification by clicking yes and no, distinguishing between virus and no virus, with resolution 32.5 ms for recording and 1 minute for obtaining final results. Note that this can be improved with smart computing system in future. Hence nano-DIHM acts as a sensor and a sophisticated research tool for physicochemical transformation of air and waterborne viruses. As the library data adds, the software gets smarter, and by doing so, we are and will ber even better able to tag different types of particles. For example micro and nanoplastics, metals, black carbon, etc. Again, we would use nano-DIHM as a sensor or a sophisticated research tool to obtain physicochemical properties such as size, shape, morphology, surfaces, uptake processes, phase of particles, optical intensity, refraction indices, optical path length of individual and ensemble of particles, etc.

In some embodiments, we aim to evaluate the impact of common aerosols such as metal oxides ($TiO_2$, $Fe_2O_3$, $ZnO$), organic molecules (alpha-pinene, honey, olive oil), synthetic materials (glycerine and plastics such polystyrene latex) and other bioaerosols and their remenants such as their RNA or proteins. We performed experiments on natural oils, secondary organic compounds and some other organic particles. This way, we have enlarged the data reference library. It provides improved detection of separating different types of particles. For instance viruses from other organic particles, but it also made more rapid the detection. Bigger the library means quicker detection, and improved accuracy. This approach allowed us to: (a) improve nano-DIHM as a sensor; (b) provide more insightful physicochemical characteristics such as improved surface and phases to distinguish processes for example in case of viruses to follow transmission processes, and do experiments with probes on lung surfaces in future.

In some embodiments, it was found convenient to photolyze particles using UV A and/or UV B exposure, for instance. In these embodiments, the particles can be flowed into the interrogation volume in three ways of circulation: (a) aerosolize them, (b) bubbling procedure (also used as personal breathing module); (c) on the stationary manner on slide. Since UVA is available at surface levels, we performed some experiments to evaluate likely scenario in the lower troposphere. We used also UVB that can not be at the surface (Irradiation filtering from the upper atmosphere to the lower troposphere), as a reference. We noticed that upon UVB radiation, there are some breakage of viral entities, but it is not much. With UVA, we did not see any significant changes. The whole idea was to provide a basis for the usage of nano-DIHM observation aboard low flying satellites and other aerial vehicles. Note that the automation now allows to transfer the data using cell-phone or other remote sensing methods.

Example 1—Advancing the Science of Dynamic Airborne Nanosized Particles Using Nano-DIHM In-situ and real-time characterization of aerosols is vital to several fundamental and applied research domains including atmospheric chemistry, air quality monitoring, or climate change studies. To date, digital holographic microscopy is commonly used to characterize dynamic nanosized particles, but optical traps are required. In this study, a novel integrated digital in-line holographic microscope coupled with a flow tube (Nano-DIHM) is demonstrated to characterize particle phase, shape, morphology, 4D dynamic trajectories, and 3D dimensions of airborne particles ranging from the nanoscale to the microscale. The flow tube can be portable in some embodiments. We demonstrate the application of Nano-DIHM for nanosized particles (≤200 nm) in dynamic systems without optical traps. The Nano-DIHM allows observation of moving particles in 3D space and simultaneous measurement of each particle's three dimensions. As a proof of concept, we report the real-time observation of 100 nm and 200 nm particles, i.e. polystyrene latex spheres and the mixture of metal oxide nanoparticles, in air and aqueous/solid/heterogeneous phases in stationary and dynamic modes. Our observations are validated by high-resolution scanning/transmission electron microscopy and aerosol sizers. The complete automation of software (Octopus/Stingray) with Nano-DIHM permits the reconstruction of thousands of holograms within an hour with 62.5 millisecond time resolution for each hologram, allowing to explore the complex physical and chemical processes of aerosols.

In-situ and real-time characterization of airborne particle (aerosol) size, phase, and morphology is vital to several fundamental and applied research domains, including atmospheric chemistry and physics, air quality, climate change, and human health. Aerosols are diverse and are emitted from anthropogenic or natural sources. Aerosols undergo physicochemical transformations in the atmosphere on a wide range of spatial and temporal scales. Aerosols can contain biological particles such as bacteria and viruses. Airborne Severe Acute Respiratory Syndrome Coronavirus 2 (SARS-COV-2) virion-containing aerosols are significant in the COVID-19 transmission.

Nano-objects that comprise nanomaterials refer to matter dispersed into individual objects with one or more external dimensions, or an internal structure, on a scale from 1 to 100 nm. The most abundant airborne particles in the atmosphere are nanosized (<200 nm diameters). Nanosized particles have a large surface-to-volume ratio. They can be photoreactive and serve as cloud condensation nuclei or ice nuclei. Nanoparticles are also involved in coagulation and phase transition processes, which are vital to understanding aerosol-cloud interactions. Prior to this study, to our knowledge, the phase of nanoparticles has never been determined in situ in dynamic ambient air.

There has been significant progress in in-situ aerosol analysis during the last decade, including in-situ analysis of nanoparticles in air. Yet, no existing technique allows the determination of airborne particles' phase in situ and in real time; and so in-situ phase determination, despite its importance, remains a key challenge. There are various real-time aerosol characterization techniques, including in-situ optical/laser or condensation-based and electron mobility analysis. However, these techniques fail to provide information on the behaviour or dimensions of aerosols. Offline analysis following the collection of aerosols using impactors, impingers, precipitators, and filters is often more informative yet does not provide real-time data or information regarding aerosol dynamics.

Significant advances in microscopy during the recent decades have enabled researchers to observe individual nanoparticles, using techniques such as near-field optical microscopy, super-resolution microscopy, atomic force microscopy, electron microscopy and other more recently developed imaging techniques. Among them, Scanning Transmission Electron Microscopy (S/TEM) enables acquiring accurate information on particle phase and morphology in stationary mode. Bright-field and dark-field optical microscopy provide two-dimensional information on particles, albeit in a limited depth interval within samples. A challenge with conventional light microscopy methods is that these methods work in fixed imaging planes, which precludes determining aerosol dynamics, phase, and 3D morphology of aerosols. However, the 3D structure information can be obtained using Fourier ptychography, optical diffraction tomography or by scanning the whole sample/particle volume using confocal imaging. All these existing microscopy techniques have significant advantages, yet they cannot track moving particles in situ or in real time, precluding their application to dynamic media, such as air.

Here, we provide an alternative approach of Nano-DIHM. The Nano-DIHM consists of a holographic microscope and a gas flow tube that allows airborne particles to pass through the imaging volume of the DIHM and exit or circulate inside the volume, allowing observation of single particles or ensembles of particles in real time. Nano-DIHM directly acquires data on interference patterns of the incident and scattered light with a light-sensitive matrix, without any lenses or objective. The recorded interference pattern referred to as a hologram is numerically reconstructed using an Octopus/Stingray software based on a patented algorithm to recover the object information. To date, digital holography setups could merely characterize particles held in electrodynamic or optical traps or particles deposited on a substrate. Note that optical trapping of airborne particles requires optical tweezers, trapping only a single particle confined to the field of view. The Nano-DIHM has a larger field of view up to several square centimetres (~1.27 cm$^2$, 2048×2048 pixels, 5.5 μm each pixel size). In this study, the Nano-DIHM field of view of up to ~40 mm$^2$ enables observation of moving objects, in contrast to conventional optical microscopy that uses lenses and has smaller fields of view (a few microns). Until now, investigations of airborne particles by DIHM have been confined to relatively large particles (>1 μm). We show that Nano-DIHM can detect nanosized objects in 2D and 3D space for dynamic (air), aqueous (water) and solid (powder) media. We were able to track individual airborne nanoparticles directly and quantify each particle's dimensions in situ and in real time. The Nano-DIHM enabled us to record 6D spatial motion of aerosol particles (3D for the position of each particle in 3D space) and the dimensions of each particle as it is orientated in 3D space. A critical advantage of Nano-DIHM is that, during reconstruction, a single 2D hologram can produce a 3D image of the objects without any loss of resolution. The Octopus/Stingray software allows real-time or offline reconstruction with a temporal resolution on the order of milliseconds (62.5 ms), and it can be improved to microsecond-scale temporal resolution, depending on the framerate of the camera.

We demonstrated that the developed Nano-DIHM detects single and cluster aerosols in situ and in real time, in dynamic and stationary media such as air, water and heterogeneous matrices. We further performed intercomparison of the aerosol size distribution measured using a Scanning Mobility Particle Sizer (SMPS) and an Optical Particle Sizer (OPS) and S/TEM with the observation made by the Nano-DIHM. The SMPS and OPS can only measure particle size distributions and cannot track particle position in space or individual particle dimensions in 3D, in contrast to Nano-DIHM. In the following section, we demonstrate: 1) the observation of airborne PSL particles (100 nm and 200 nm) and their dynamic trajectories, 2) the detection of the 100 nm and 200 nm PSL particles in colloid solution deposited on a microscope slide, 3) distinguishing the PSL and mixed metal oxide nanoparticles, 4) semi-automation of the software (Octopus/Stingray), which allows the reconstruction of thousands of holograms within an hour and 5) the observation of ambient particles in the air and snow in real time and in situ. Finally, the demonstration of the accuracy of measurement of refractive index is presented. The experimental parameters for each experiment are given in Table 1. More details are provided in the Methods section.

One of the significant limitations of optical microscopy, including digital holography, is overcoming the diffraction barrier of the system to detect nanosized objects with visible wavelengths. To mitigate this challenge, recently, different experimental and numerical focusing approaches have been developed. In this study, an ensemble of three routines is used to overcome the diffraction barrier: (1) keeping a minimum distance between the pinhole and the sample, (2) numerical reconstruction using Octopus/Stingray software based on Kirchhoff-Helmholtz transform to achieve the high resolution, and (3) several holograms are formed in an aqueous medium (water), and thus the wavelength of the laser is reduced from λ=405 nm to ~300 nm, which creates favourable conditions to achieve the high resolution. More details are provided in the Methods section. We thereby successfully demonstrated the first-time in-situ real-time observation of airborne nanosized objects using the Nano-DIHM (FIGS. 1-4) and validated the results using aerosol sizers.

Figure 12:
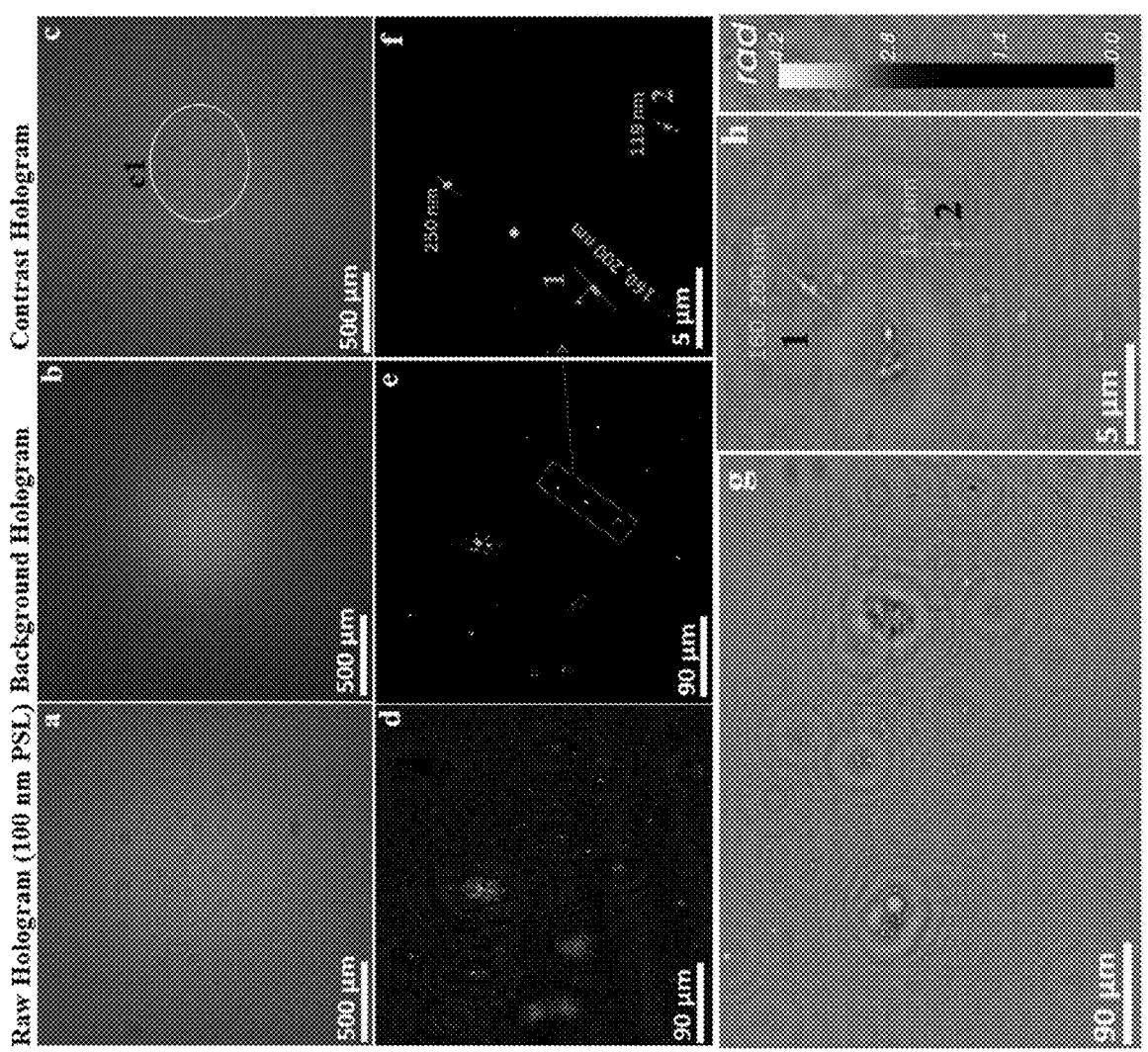
FIG. 12 shows a reconstruction of the intensity information for 100 nm PSL particles in the aerosol phase, with FIG. 12(a) Raw hologram recorded for airborne PSL particles.

The Nano-DIHM effectively resolved the size and shape of airborne nanosized PSL particles with dimensions ranging from nano- to microscale. FIG. 12(a-h) and FIG. 13(a-c), provide information on the aerosolized 100 nm PSL particles, and FIG. 14(a-i) provide information on the 200 nm aerosolized PSL particles. The PSL particle size and spherical shape determined by the Nano-DIHM matched the standard PSL particles' specifications (standard diameter, 101±7 nm) for 100 nm and 200 nm PSL (standard diameter, 188±4 nm). The size data also aligned with the results of simultaneous analysis of the aerosol size distribution in the outflow from the Nano-DIHM optical cuvette performed using the SMPS and the OPS instruments, measuring the aerosol size distribution in the particle size range from 10 nm to 10 μm).

Examples of intensity and phase reconstructions for the 100 nm PSL spheres in the moving air are depicted in FIG. 12(a-h). The raw hologram in FIG. 12(a) was recorded for the airborne PSL spheres, which carried the information of phase, size, and shape, while the background hologram (FIG. 12(b)) was recorded without PSL particles and only dry air purified used with three HEPA filters, leading to a particle-free spectrum, and the contrast hologram (FIG. 12(c)) is a result of subtraction of the background hologram from the raw hologram. Subtracting the background from the raw hologram removes the possible contamination due to the source (pinhole imperfections) and the object holder (a cuvette or microscope slide). Thus, this process significantly improves the reconstruction of an image, as discussed in numerous publications. The reconstruction of the cropped area (c1) in FIG. 12(c), as displayed in FIG. 12(d), is of interest. FIG. 12(e) is an example of high-resolution images of FIG. 12(d); this high resolution is achieved by performing deconvolution and in-focus reconstruction, thus enhancing image quality, and reducing noise. FIG. 12(f) is a zoomed-in area of FIG. 12(e), revealing information on nanosized objects and their shape.

Phase reconstruction of the identical hologram exemplified in FIG. 12(g, h) yields the replicate size and shape of airborne PSL particles as intensity images (FIG. 12(e)). The particle size determined by the Nano-DIHM along the crosscut through particle 1 is 160 nm and 200 nm, and 119 nm through particle 2 (FIG. 12(f and h)), expressed as the full width at half maximum (FWHM). The Nano-DIHM successfully recovered the particle images within a lateral dimension of ~200 nm in agreement with the previous study, which stated the lateral resolution is achievable on the scale of a half of the wavelength (λ/2). The diameters of the PSL spheres determined by the Nano-DIHM vary from nano- to submicron-scale and are validated by the SMPS and the OPS data for the same samples. The 100 nm airborne PSL particle size determined by the Nano-DIHM agreed well with the particle size simultaneously measured using the SMPS and the OPS. During the numerical reconstruction process, many particles can be in focus at a given Z value. Previous literature has shown similar results at a given Z value, and many particles were detected. For example, it was showed that several particles could be detected at a particular Z value.

Figure 13:
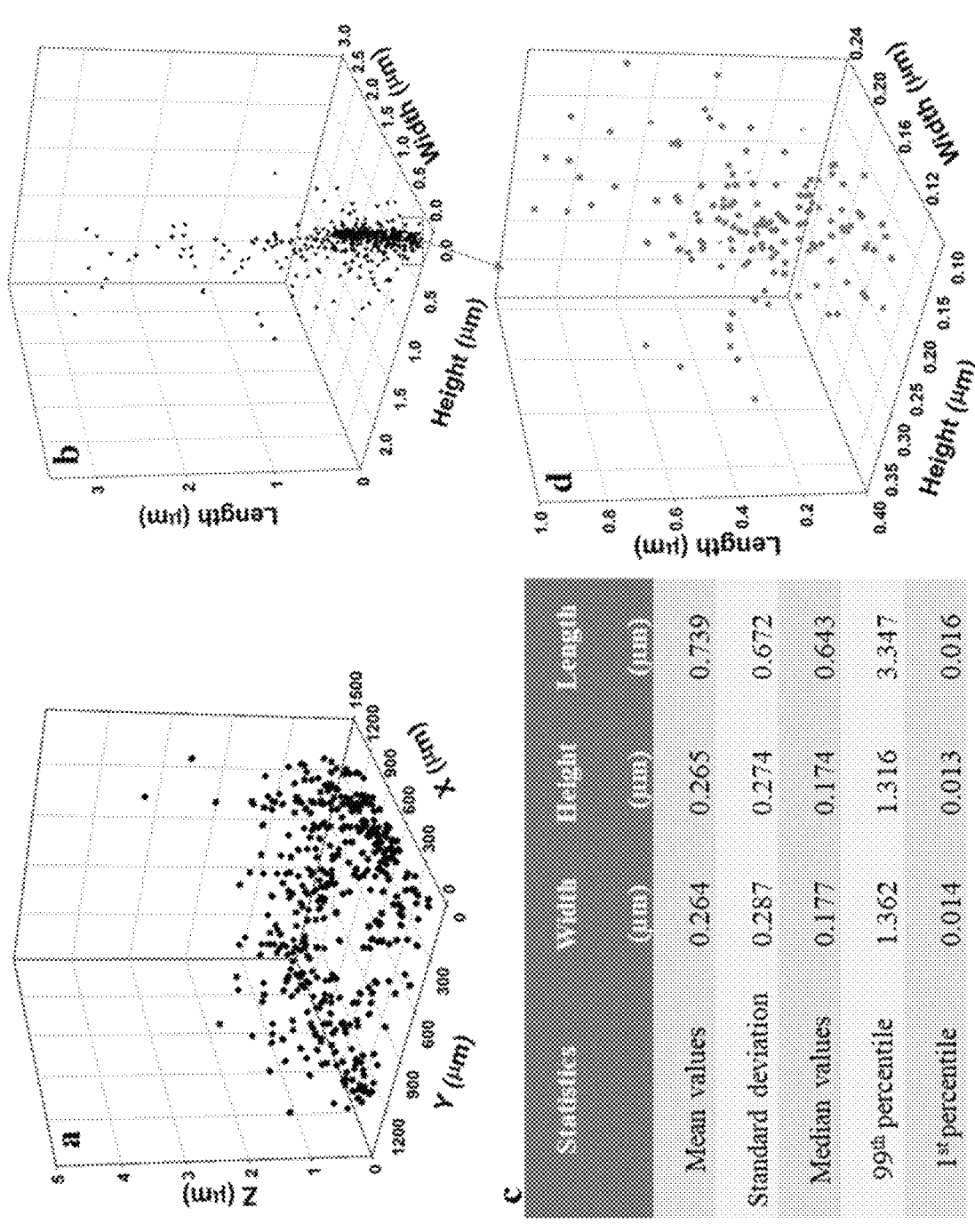
FIG. 13 shows 3D size distribution of 100 nm PSL spheres in the aerosol phase, with FIG. 13(a) the orientation of PSL particles.

FIG. 13(a, b) displays the 3D orientation/position of particles and the individual dimensions (width, height, and length) of PSL aerosol particles. The median values of the width, height and length determined by the Nano-DIHM are 177 nm, 174 nm, and 672 nm, respectively. The 1$^{st}$ percentile of the observed particle dimensions is 14 nm (width), 13 nm (height), and 16 nm (length), which is evidence that Nano-DIHM can be used for nanoparticle measurements. Furthermore, the SMPS size distribution of airborne PSL particles exhibits a good agreement with the width and height of particles observed by the Nano-DIHM and suggests that the most abundant PSL particle size peaks between 100 nm and 160 nm.

Figure 14:
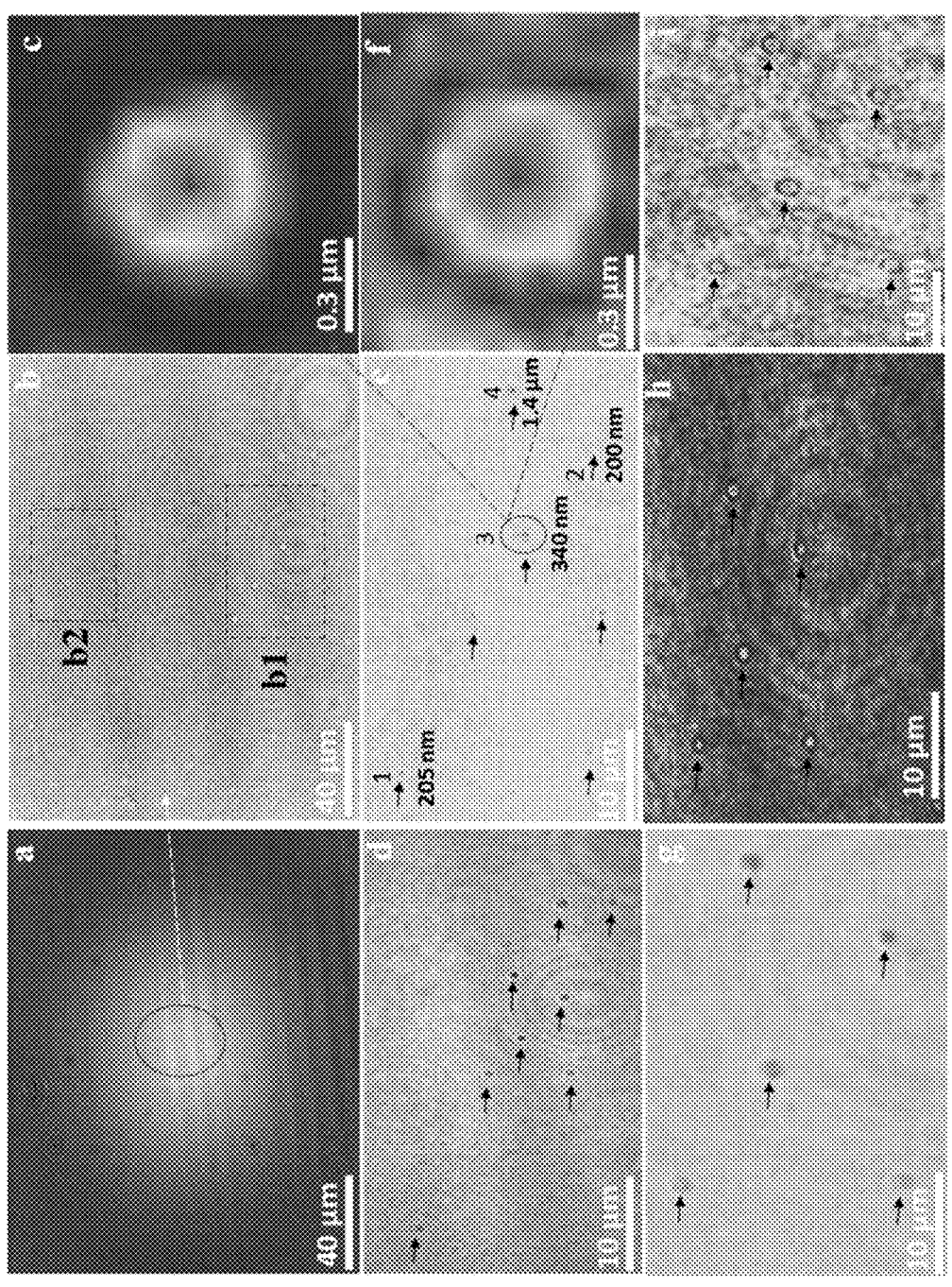
FIG. 14 shows holographic reconstruction of 200 nm PSL airborne particles, with FIG. 14(a) raw hologram.

Another confirmation for positive observation of 200 nm airborne PSL particles measured in real time in situ by Nano-DIHM is shown in FIG. 14. The intensity and phase reconstructions of airborne PSL particles are displayed in FIG. 14(a-i). Nano-DIHM reveals the ~200 nm particles as well as particles of larger diameter ~1.4 μm (FIG. 14(e)). Additionally, intensity and phase profiles through the cross-cut of the PSL particles were determined for the ~400 nm, ~500 nm, and ~2 μm particles. Nano-DIHM and the SMPS/ OPS confirmed that the PSL spheres include a wide range of particle sizes ranging from 10 nm to 10 μm in the airborne state. The recovery of the shape and size information for a single PSL particle (FIG. 14(c, f)) unveils that Nano-DIHM can also be used for single-particle detection. The Nano-DIHM worked effectively not only for single aerosol particle detection but also allowed the multiparticle scanning of the total aerosol sample (FIG. 13(a-d)).

The median values of the width, height and length determined by the Nano-DIHM were: 319 nm, 319 nm, and 678 nm, respectively. The 1$^{st}$ percentile of the observed particle dimensions was 23 nm (width), 23 nm (height), and 15 nm (length). The length of the PSL spheres was observed to equal almost twice the width and height. It may be because two or more particles in different planes were closer than the depth resolution (362 nm); the Nano-DIHM could not distinguish them and observed them as a single particle. This limitation should be considered in future studies. We recommend the usage of further length correction methods along other routes to reduce or eliminate this limitation.

As seen, in both cases, the particle size distributions of the 100 nm and the 200 nm PSL spheres in the airborne state obtained by the Nano-DIHM agreed with the particle size distributions measured by the SMPS and the OPS. The observed size distribution of airborne PSL spheres obtained by both the Nano-DIHM and the SMPS and OPS was bimodal. This size distribution had a broader peak between 100 nm and 160 nm for the 100 nm PSL particles and between 150 nm and 300 nm for the 200 nm PSL (FIG. 13(n)) corresponding to the 150 and 300 nm, consistent with the particles' median dimensions determined by the Nano-DIHM (FIG. 13(c)).

The aerosolized Milli-Q water peak was observed by the SMPS and the OPS between 30 nm and 50 nm. At the same time, the following median values for the same water sample were observed by the Nano-DIHM: 41 nm (width), 43 nm (height). They aligned well with the SMPS and OPS measurements. The Milli-Q water peak at around 30 to 50 nm is typical of various aqueous dispersions and arises from condensed dissolved compounds in the solution or may arise during aerosolization. The median and mean particle dimensions varied within +5% from one hologram to the next during reconstructions of several holograms. This uncertainty likely arises during hologram reconstruction due to the input digital image data that includes noise during the recording process.

Figure 15:
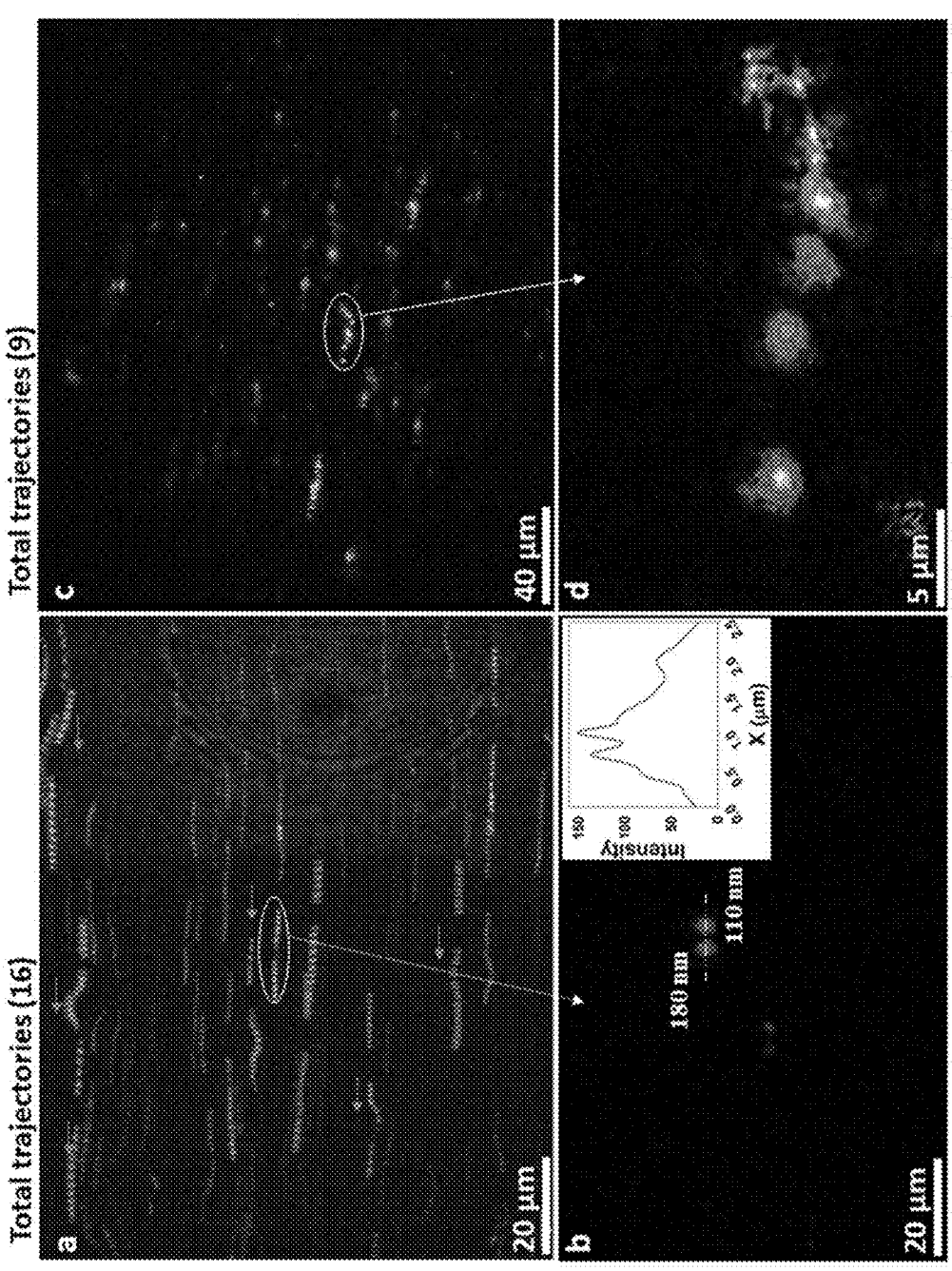
FIG. 15 shows trajectories of 100 nm airborne PSL particles in motion within the flow tube cuvette, with FIG. 15(a) sum of 16 holograms with 62.5 ms temporal resolution.

The dynamic 4D trajectories (3D positions and 1D time) of 100 nm PSL spheres are provided in FIG. 15(a-d). To obtain high-resolution trajectories of the airborne nanoparticles in this study, we used the following procedure: (1) A sequence of holograms was recorded at 16 fps. (2) The background contaminations were eliminated by subtraction of consecutive holograms, and (3) the resultant holograms were reconstructed at a given plane and summed to obtain the final trajectories (16 holograms summed in FIGS. 15(a) and 9 holograms summed in FIG. 15(c)). Subtracting holograms ensured that the dynamic range was not exceeded and only the object-related information (moving PSL particles information) was retained. FIG. 15(a and c) shows the sequential positions at successive recording times of the airborne 100 nm PSL particles contained in the sample volume in two reconstructions planes separated by 200 μm. FIG. 15(b) depicts the zoomed-in crop area of trajectories given in FIG. 15(a) to provide the confirmation of the size of 100 nm PSL airborne particles. Sixteen sequential positions clearly define the trajectory of airborne PSL particles (FIG. 15(a)), which moving in a random fashion confined to a plane parallel to the flow tube cuvette.

All the reconstructions of the holograms were performed at the same reconstruction distance (z) and then processed to create the Giff movies. In some embodiments, the dark red particles are in the focus of the reconstruction plane, while some of the particles (green/blue) are slightly out of focus at the exact reconstruction distances due to the finite depth of field of the objective. As seen in FIG. 15(a-d), some PSL particles are in the focus reconstruction plane, yet some are progressively out of focus, indicating that the motion direction also has a component perpendicular to the reconstruction plane. To overcome the out-of-focus reconstruction in-complete trajectories analysis, several reconstructions from the same hologram in many planes are necessary. As such, we demonstrated the ability of the Nano-DIHM to visualize particle trajectories.

To evaluate whether Nano-DIHM can determine shapes, size, and morphology of individual PSL spheres in an aqueous state, we investigated the same samples of 100 nm PSL and 200 nm PSL particles using Nano-DIHM (FIG.

Figure 16:
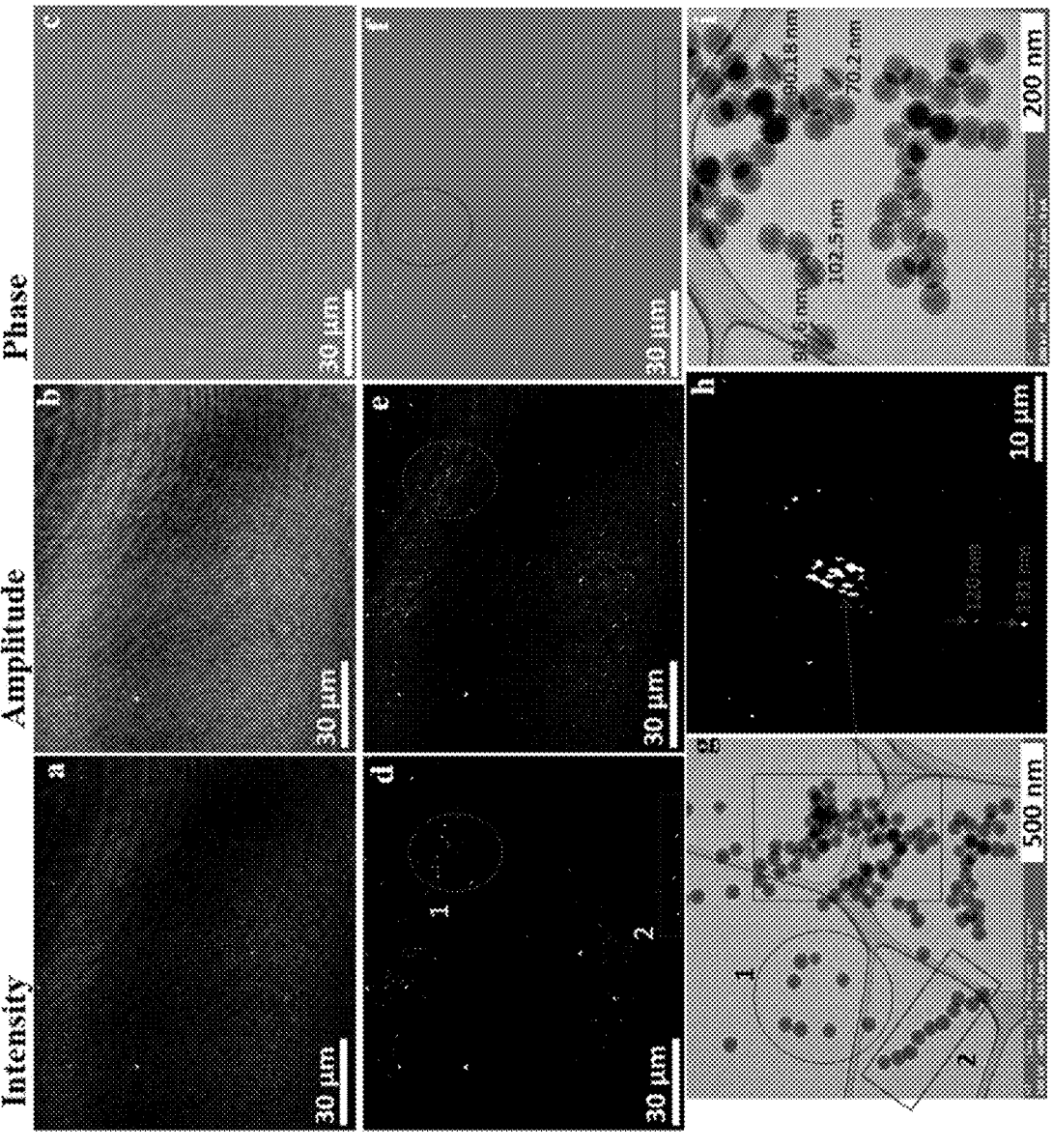
FIG. 16 shows holographic detection of 100 nm PSL particles deposited on a microscope slide, with FIG. 16(a-c) intensity, amplitude, and phase reconstructions at reconstruction distance Z=1353 μm.
Figure 17:
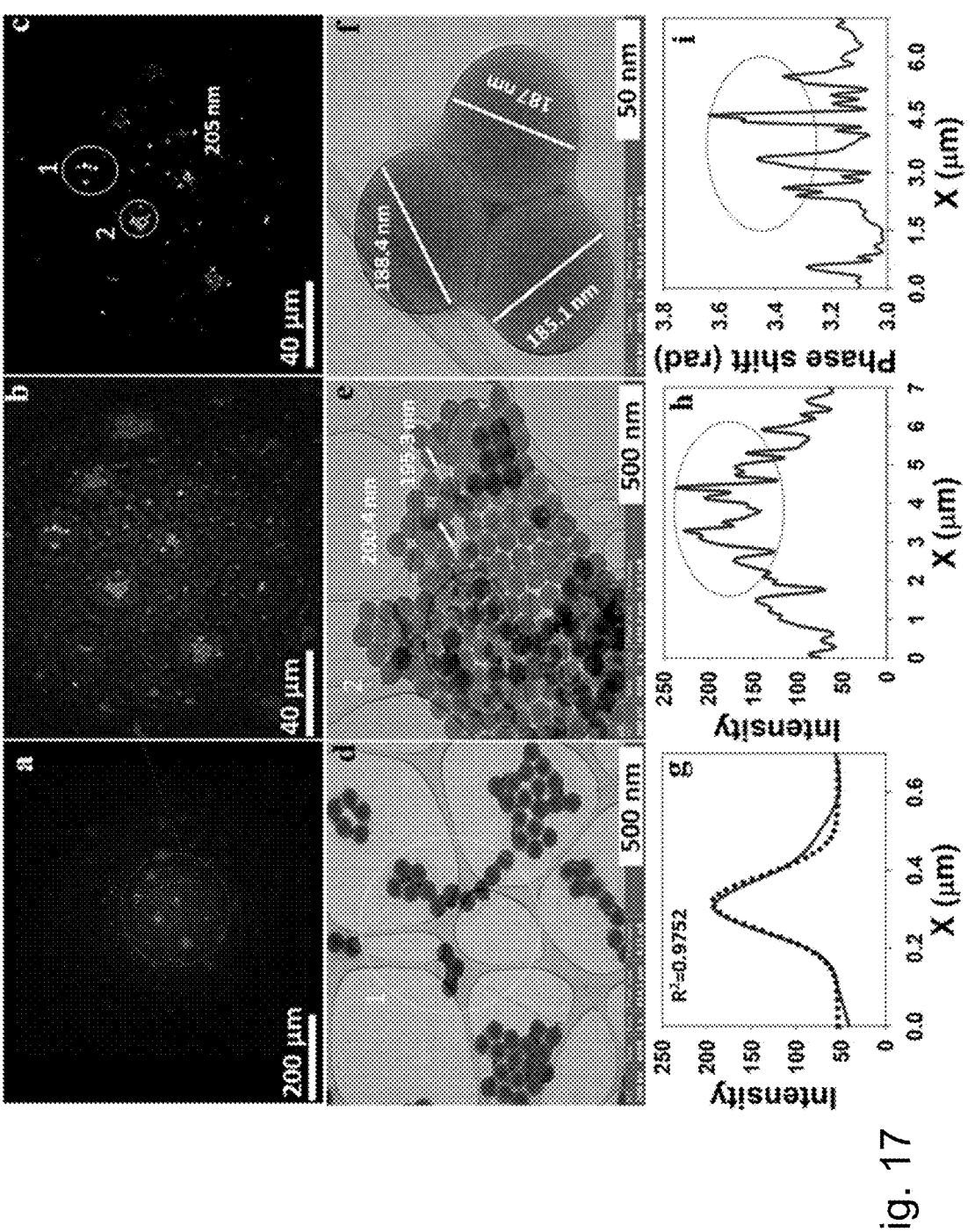
FIG. 17 shows holographic reconstruction of 200 nm PSL particles deposited on a microscope slide and their validation by S/TEM images, with FIG. 17(*a*) intensity reconstruction at 2318 µm.
Figure 17A:
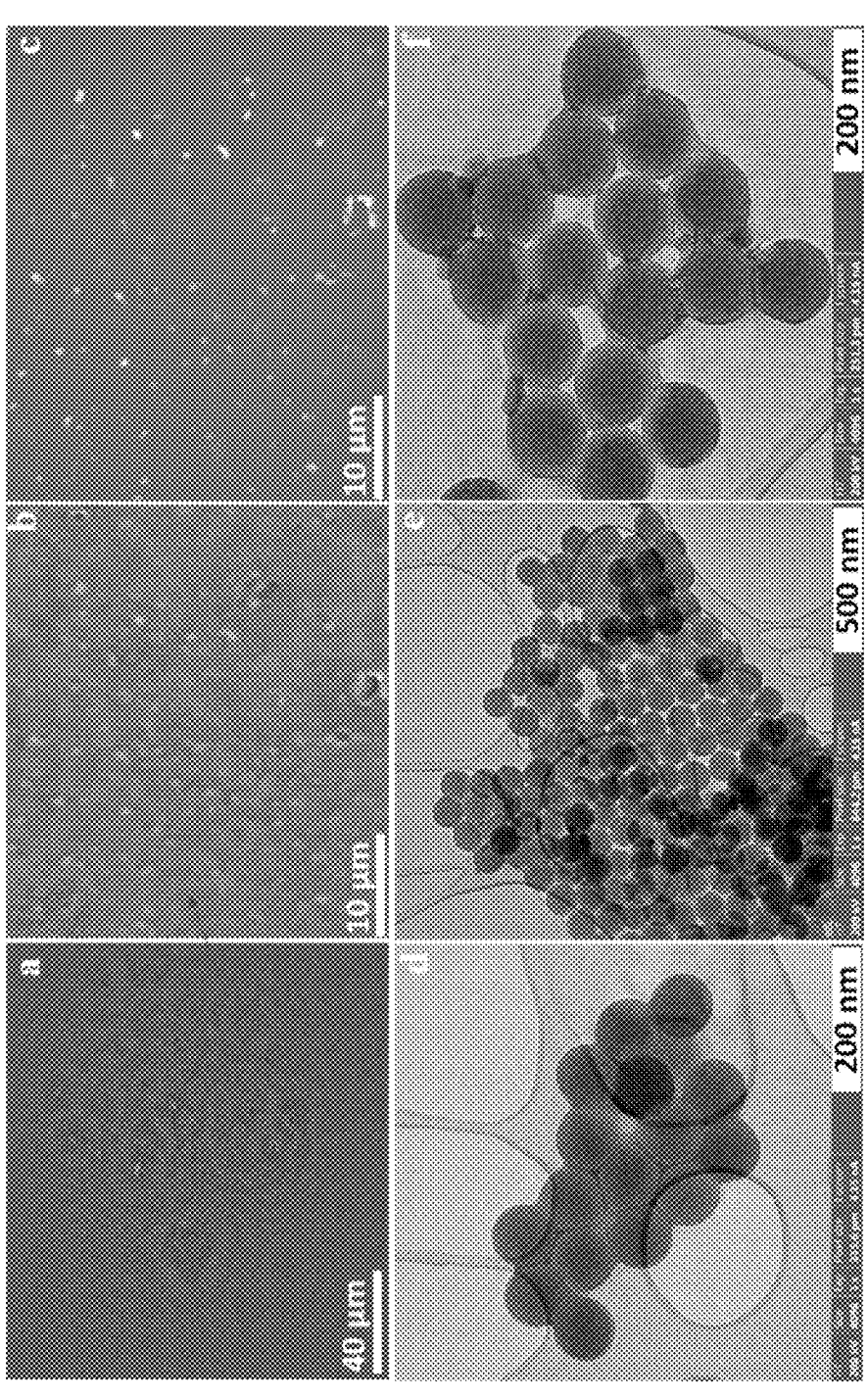
FIG. 17A shows a holographic reconstruction of 200 nm PSL particles deposited on microscopy slide and their validation by STEM images, with FIG. 17A(a) a phase reconstruction at 2352 µm, FIG. 17A(b) a zoomed in area of (a)

16(a-f) and FIG. 17(a-c)) and S/TEM (FIG. 16(i) and FIG. 17(d-f)). FIG. 16(a-f) shows the reconstruction of the holograms in all three modes: intensity, amplitude, and phase. FIG. 16(d-f) is a high-resolution image of FIG. 16(a-c) and illustrates the PSL size, shape, and phases. The red circles and rectangles marked in FIG. 16(d-f) highlight an example showing the consistency of the existence of 100 nm PSL particles in all three reconstruction modes and the alignment of these Nano-DIHM measurements with the particle size and shape determined by S/TEM (FIG. 16(g and i)).

As shown in the S/TEM images (FIG. 16(g)), the red circle 1 and rectangle 2 revealed the similarity to the PSL particle shape obtained by Nano-DIHM (FIG. 16(d-f)). The S/TEM image (FIG. 16(i)) confirmed that the PSL particle size ~100 nm is in a good agreement with the observed median values of PSL particle width (110 nm) and height (120 nm) obtained in 3D space by Nano-DIHM. Thus, the observations of PSL particle size and shape made by S/TEM and Nano-DIHM are well-matched with the size of the manufactured PSL spheres (standard diameter 101±7 nm). The energy-dispersive X-ray spectroscopy (EDS) data for PSL particles presented in FIG. 16(i) confirmed the PSL sample quality.

We also show another example of validation of particle size and their shape made by Nano-DIHM with S/TEM (FIG. 17). Here, we examined a 200 nm PSL particle deposited on a microscope slide. The size and shape determined by Nano-DIHM (FIG. 17(a-c)) are complemented with S/TEM images (FIG. 17(d-f)). In FIG. 17(c), circles 1 & 2 show PSL particles imaged by Nano-DIHM are parallel to images made by S/TEM shown in FIG. 17(d, e). The intensity response along the crosscut of the PSL particle shown in FIG. 17(g) indicates a single particle with a diameter of ~198 nm, which is similar to the size provided by the manufacturer (standard diameter 188±7 nm) and the size measured by the S/TEM (FIG. 17(e, f)). The S/TEM images (FIG. 17(e)) confirmed that PSL particles existed as agglomerates or clusters. The Nano-DIHM also confirmed the presence of agglomerates/clusters (FIG. 17(h, i). Although the Nano-DIHM identified the overall shape of particles, it did not decipher the precise cluster shape of particles as the S/TEM did. The Nano-DIHM thereby provides promising results to determine the phase, shape, and size of the particles, yet high-resolution electron microscopy is a valuable tool for determining the refined shape, at this stage, despite the lacking in-situ and real-time imaging capabilities that Nano-DIHM offers.

Figure 18:
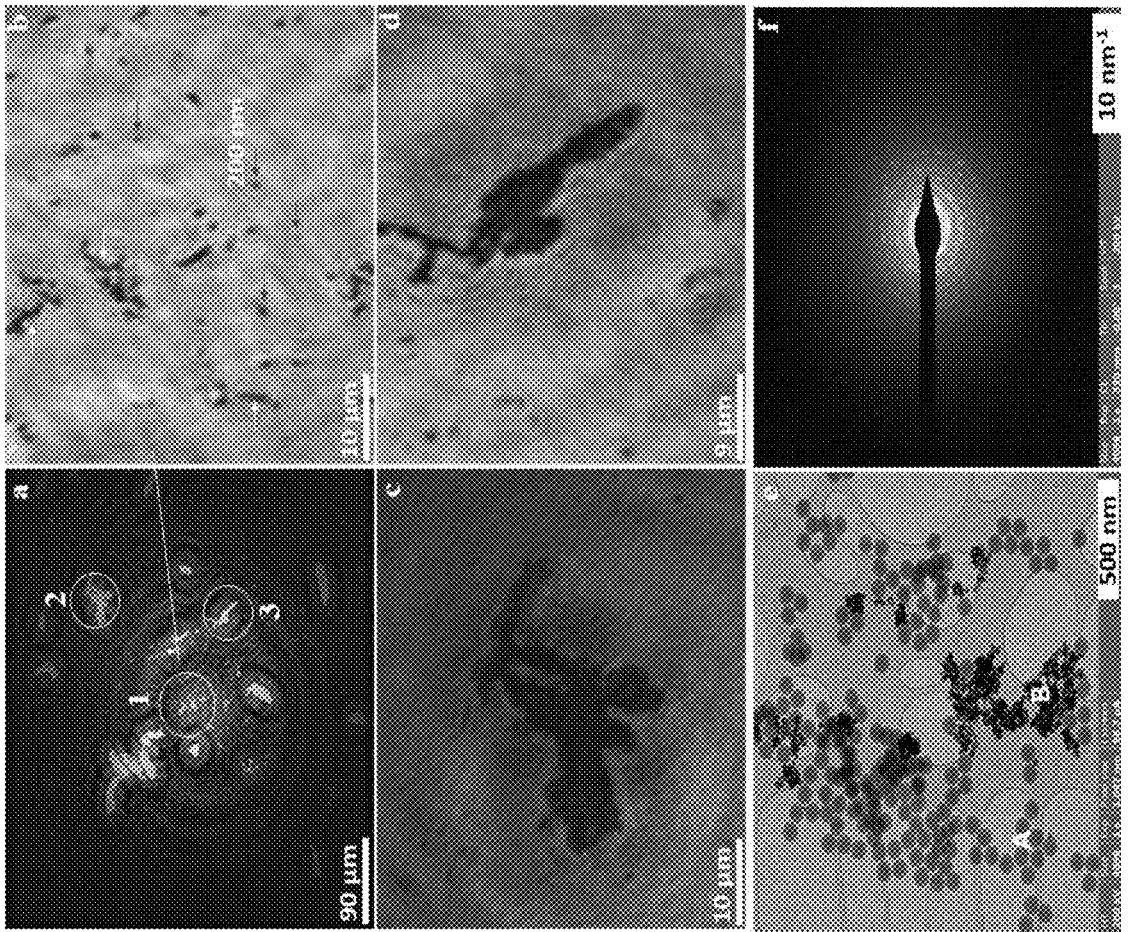
FIG. 18 shows holographic reconstruction of a mixed sample of 200 nm PSL particles and iron oxide nanoparticles deposited on a microscope slide and the validation by S/TEM images, with FIG. 18(*a*) Intensity reconstruction at 905 µm, FIG. 18(*b*) Zoomed-in area circle 1 of (a)
Figure 18A:
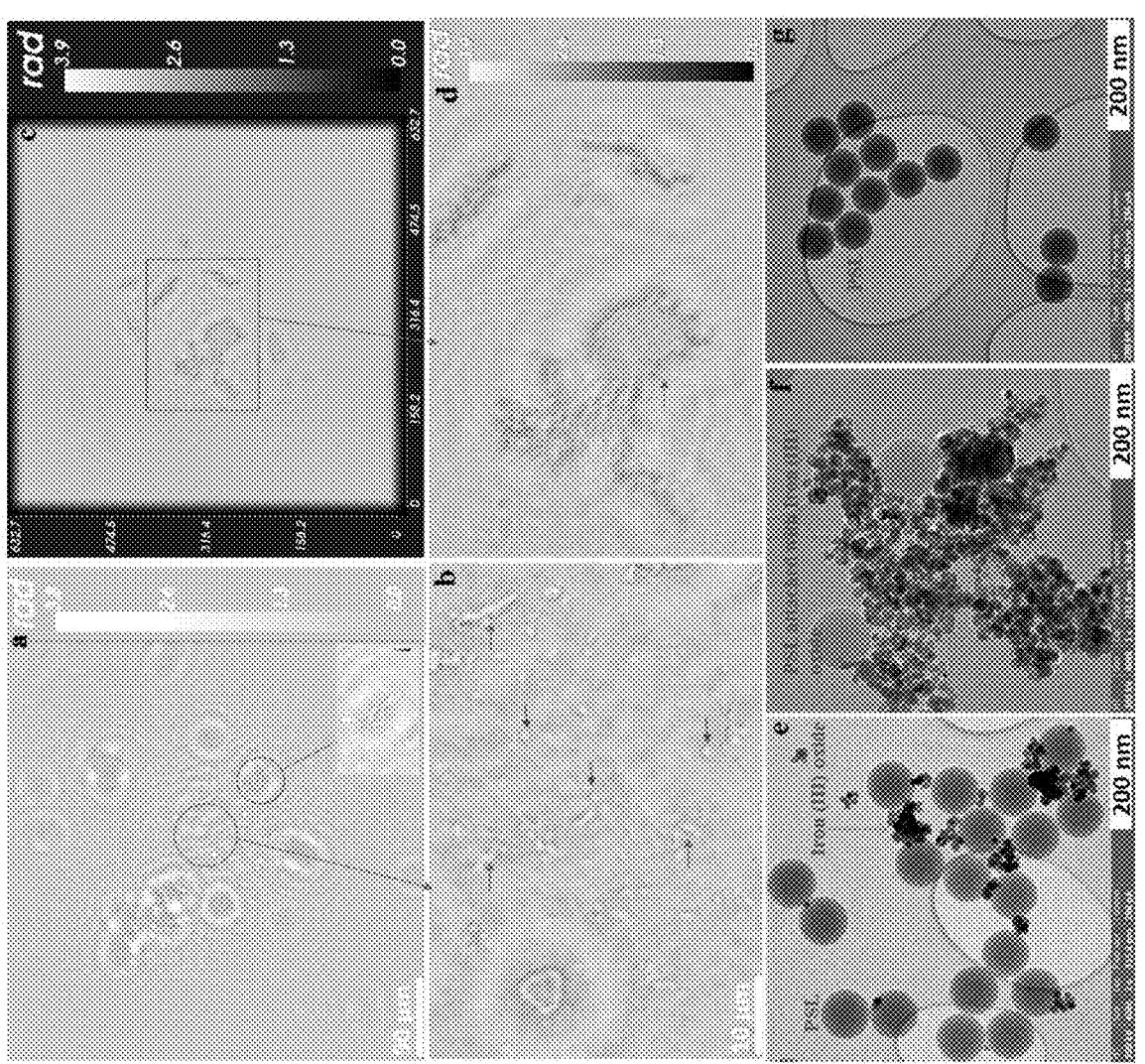
FIG. 18A shows 2D and 3D view of holographic reconstruction of a mixed sample of 200 nm PSL particles and iron(III) oxide nanoparticles (size <50 nm) deposited on microscopy slide and their validation by S/TEM images, with FIG. 18A(a) a 2D view of phase reconstruction at 925 µm.

The shape, size, and morphology of PSL and iron oxide particles within the mixed sample of PSL particles and iron oxide particles have been successfully determined using Nano-DIHM. FIG. 18(a) shows the reconstructed intensity image of mixed PSL and iron oxide particles on a microscope slide. The zoomed-in area in FIG. 18(a) is shown in FIG. 18(b-d). As depicted in FIG. 18(b), the red arrows indicate the PSL particles, and the white arrows show the iron oxide particles or the iron oxide particles to which PSL particles are attached. The mixture of the same samples was also analyzed using S/TEM. The S/TEM images (FIG. 18(e)) confirmed the size, shape, and morphology of the PSL and iron oxide particles determined by Nano-DIHM (FIG. 18(a-d)). The EDS data for Spot A and Spot B (FIG. 18(e)) confirmed the identity of the PSL and iron oxide particles. The Selected Area Electron Diffraction (SAED) pattern is shown in FIG. 18(f). High-resolution images in FIG. 18(c, d) (zoomed-in areas 1 and 2 in FIG. 18(a)) depicted the different sizes and shapes of iron oxide particles and confirmed the attachment of the PSL particles.

The phase reconstruction of the same samples shown in FIG. 18A. As discussed in this example, Nano-DIHM showed the capability to determine the size, shape, and morphology of the synthetic materials within the mixed samples and successfully distinguish the nanosized particles.

Figure 19:
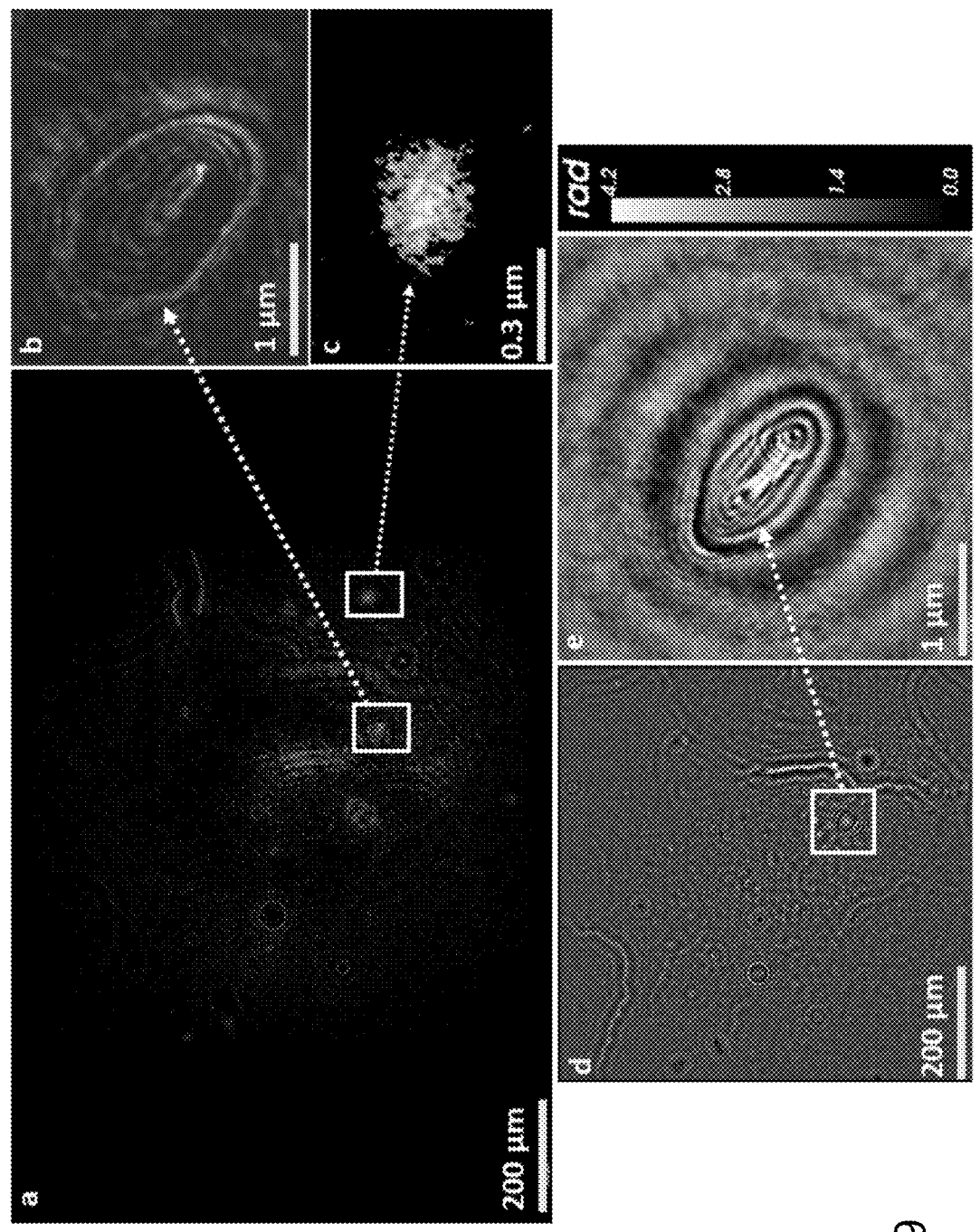
FIG. 19 shows hologram reconstruction for ambient air showing different airborne particles' sizes, shapes, and morphologies, with FIG. 19(*a*) intensity reconstruction of airborne particles.

FIG. 19 illustrates examples of the capability of the real-time analysis of ambient airborne particles using Nano-DIHM. For instance, the intensity and phase reconstruction of real-time Nano-DIHM measurements of particles in ambient air is shown in FIG. 19(a, d). FIG. 19(b, c) shows two selected areas of FIG. 19(a), identifying particles of two different sizes and shapes in the ambient air. The morphology of the particle in FIG. 19(c) confirmed the presence of agglomerates. It is noteworthy that while the intensity image in FIG. 19(b) does not indicate the particle's precise structure, the phase image of the same particle in FIG. 19(e) resolves the particle's structure and morphology clearly. The morphology of the particle in FIG. 19(b, e) suggests its biological origin. Particles with a similar morphology have been observed in previous studies using transmission electron microscopy, which supports this particle's organic or biological origin. Yet, further genomic confirmation will be required for the positive determination of airborne microbiological entities. We observed the changing phase shift of the particle in FIG. 19 (e) across crosscuts. Quantitatively, changing phase shifts of 2.4 to 4.2 radians were observed across particle crosscuts, suggesting the presence of multiple layers or particle heterogeneity.

This study demonstrates the first real-time acquisition of size, shape, phase, and morphology information for free-flowing spherical and non-spherical particles in moving air in situ using Nano-DIHM. The successful use of the developed technique was also demonstrated for non-gaseous environmental matrices: water samples from the ambient environment and solid synthetic materials (zinc oxide and iron oxide).

Nano-DIHM efficiently resolves the size and shape of PSL particles in moving air, demonstrating the newly developed technique's ability to describe aerosol dynamics with rapid sequential hologram acquisitions. The real-time dynamic trajectories of aerosols in atmospherically relevant conditions open the vast potential to investigate physicochemical properties of nanosized or micron-sized particles and their impact on climate and human health. Nano-DIHM successfully observed the original spherical shape and size of airborne PSL particles ~119 nm (FIG. 12(f)) in 2D space, while in 3D space, it detected nanoparticles ~10 nm ($1^{st}$ percentile). Previous studies suggested that in holographic microscopy, in the volumetric reconstruction (3D space), particles/objects can be localized within 1 nm in all three dimensions. Besides the detection of smaller particles, Nano-DIHM also determined the larger diameter particles (FIG. 14). The size distribution of PSL particles in the aerosol phase obtained by Nano-DIHM was validated by the SMPS and the OPS techniques.

In the ambient air, our results indicate that the Nano-DIHM technique can distinguish a broad range of particle sizes (nanosized to submicron-sized), resolving spherical, irregularly shaped particles and particles of varying morphology. The measurement of the real-time phase shift of ambient air particles was also achieved. The ability to accurately measure the real-time phase shift and the refractive index is significant in the characterization of ambient air particles. Furthermore, it allows distinguishing between particles of different compositions, liquid vs. solid particles, such as water droplets and ice crystals in real time and in situ. Nano-DIHM successfully recovered the phase and size of snow-borne particles, and S/TEM validated their morphology.

The Nano-DIHM accurately determined the refractive indices of moving aerosols in the gas phase. We determined the refractive indices of particles in a liquid suspension. The reconstructions at different crosscuts through particles validate that Nano-DIHM effectively distinguishes refractive index variations of 0.001. Such results are consistent with the past studies.

Prior to this study, only optical trapping techniques enabled refractive index measurements for aerosols. Accurate determination of the refractive index allows inferences about particle composition. For instance, optical chromatography has been previously used to identify the chemical composition of particles based on their size and refractive index. The combination of theoretical and experimentally measured refractive index values has also been used to distinguish particle types. The considerable improvement of the resolution and the lower size limit of particles amenable to analysis by Nano-DIHM opens a range of new applications for the technique in future by permitting real-time and in-situ measurements of the phase, size, shape, and refractive indices of particles.

The attained temporal resolution of 62.5 ms can still be improved to the level of microseconds through further optimization, such as changing the frame rate of image acquisition, the shutter speed, or using a detector with a higher resolution. Furthermore, the successful implementation of fully automated Stingray software with Nano-DIHM would allow the reconstruction of thousands of holograms within an hour's interval time, allowing the exploration of the aerosol's complex physical and chemical processes in the future. We have started to train the Stingray software. However, significant further progress is required. The ability of Nano-DIHM to visualize the motion of nanoscale and microscale particles in 3D space opens opportunities in multiple facets of fundamental and applied aerosol science. The capability of Nano-DIHM to probe aerosols in situ will allow exploring physicochemical processes under atmospherically relevant conditions.

The potential of Nano-DIHM in the atmospheric sciences is in the context of investigating the dynamics of phase transitions: particle freezing processes, and efflorescence and deliquescence in fine aerosol particles, which are poorly understood processes critical to unravelling the effects of aerosols on climate. Recent evidence shows that phase transitions in atmospheric particles are more complex than predicted earlier, and these processes can happen through multiple unknown pathways. We expect that the direct imaging of fast temporal changes in the morphology of particles with Nano-DIHM will prove invaluable for understanding the complex mechanisms of ice nucleation phenomena. Furthermore, the broad applicability of this new experimental technique is expected to open new directions in applied and fundamental particle research. Next-generation software and more advanced hardware will likely advance the performance of Nano-DIHM for remote and automated observation of complex matrices, such as planetary atmospheres.

Digital in-line Holographic Microscopy (DIHM) is a two-stage process. At the first stage, holograms are recorded. At the second stage, the reconstruction of holograms is performed, yielding a visualization of the object(s). With the current setup, holograms were recorded using the 4Deep Desktop Holographic Microscope. The numerical reconstruction of the holograms was performed using the Octopus software package, version 2.2.2.

Figure 20:
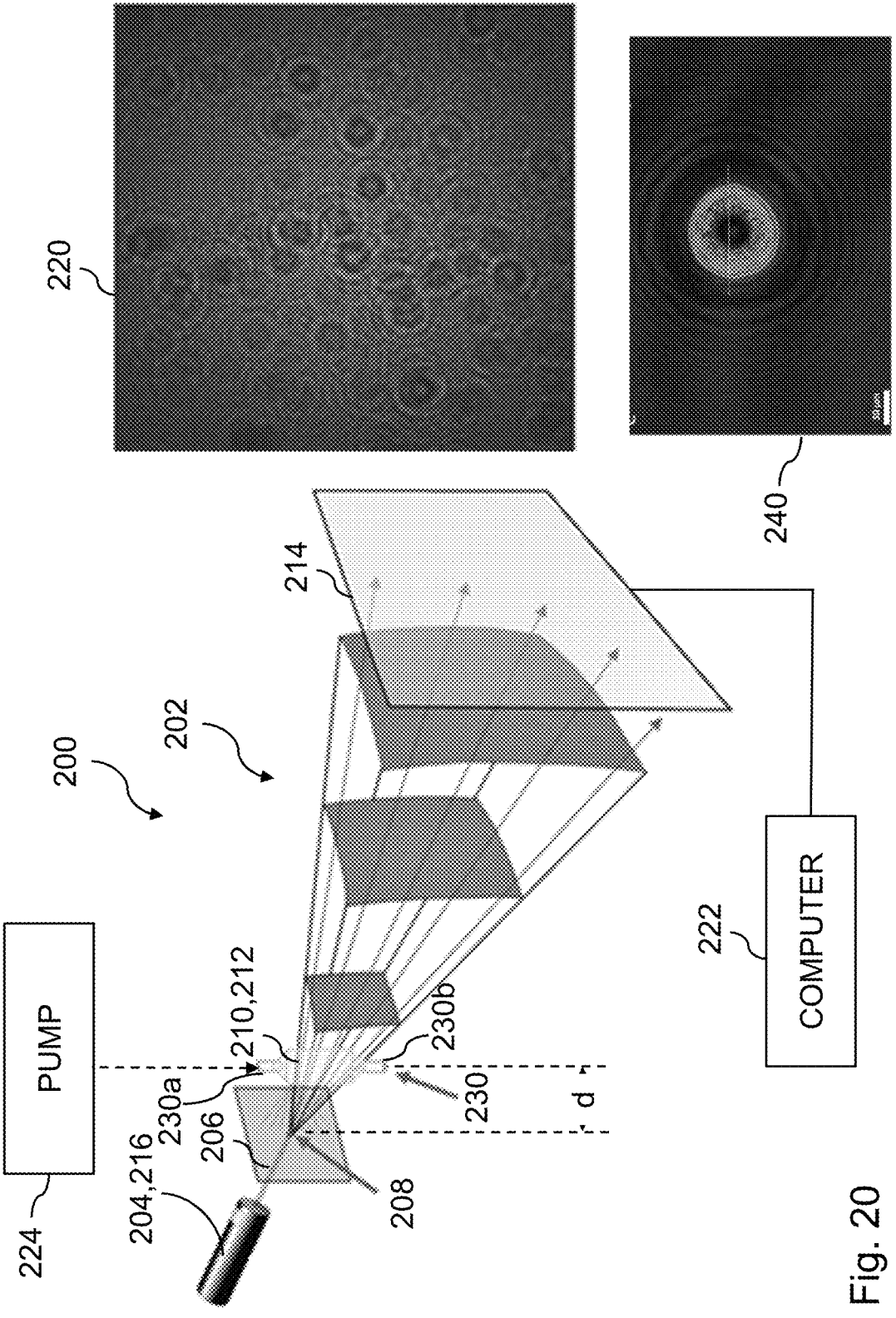
FIG. 20 is a schematic view of an example of a DIHM system and of a recorded hologram.

FIG. 20 shows an example of a system 200 for performing measurements using a digital in-line holographic microscope (DIHM) 202. The system 200 has a light source 204 propagating a light beam 206 through a pinhole 208, across a medium 210 including particles 212, and to a sensor 214. As depicted in this embodiment, the light source 204 is a laser source 216. With the sensor 214, holograms 220 of the particles are acquired. Each hologram 220 including scattering information concerning the particles. Using a computer 222 communicatively coupled to the sensor 214, a reconstruction 240 of the holograms is determined from the scattering information of the particles. The reconstruction carries information concerning shape, size, intensity and/or phase of the particles, and can be formatted into an image.

In some embodiments, the medium is a fluid. In such embodiments, the system 200 can further comprises a pump 224 or other fluid circulation device to circulate the fluid including the particles across the light beam 206, between the pinhole 208 and the sensor 214. In these embodiments, the pump 224 can circulate the fluid within a flow tube 230. As depicted, the flow tube 230 can have an inlet 230a and an outlet 230b forming a direction moving flow during the acquisition of the holograms. To do so, the sensor 214 has an exposition time which is below a given threshold time. For instance, the exposition time can be below 100 ms, preferably below 75 ms and most preferably below 65 ms.

In some embodiments, the fluid includes water. In these embodiments, it was found convenient to use a light beam having a wavelength within the visible range of the electromagnetic spectrum, ranging from 400 nm to 700 nm, for instance. In these embodiments, it was found preferably to use a wavelength of 405 nm. In this way, and due to propagation into water, and its refractive index, the effective wavelength changes to the ultraviolet range. Accordingly, UV-equivalent radiation can be obtained using light sources in the visible range, which are generally less expensive.

It is intended that, for particles having a dimension below one micrometer, the distance d between the pinhole and the medium is within 5 micrometers, preferably with 4 micrometers, and most preferably within 3 micrometers. Keeping such a small distance between the pinhole and the medium helps with the diffraction limit. In some embodiments, the sensor has a field of view of at least 25 mm$^2$, preferably at least 30 mm$^2$ and most preferably at least 40 mm$^2$. Enlarging the field of view of the sensor can help with resolution, in some embodiments. In some embodiments, the reconstruction is performed at a plurality of different planes extending between the pinhole and the sensor. The planes are perpendicular to an orientation defined by the pinhole and the sensor. The step of determining the reconstruction can include a step of identifying which of the reconstructions has a sharpness above a given sharpness threshold. In this latter step, one or more of the reconstructions can be deemed to have a satisfactory sharpness or contrast, for instance. In these embodiments, the planes are spaced apart by 0.01 micrometers or less from each other.

In some embodiments, the step of determining further includes determining dynamic information of the particles over a period of time. The particles can have a particle size of less than 100 microns, preferably less than 100 nm. In some embodiments, the medium including the particles is an aerosol. In these embodiments, the aerosol can be a bioaerosol. The bioaerosol can be a virus aerosol of airborne viruses. The bioaerosol can be a virus nanoparticle or microparticle aerosol, comprising airborne particles or droplets with a virus. In some embodiments, the aerosol includes microplastic particles. The particles can be biological particles containing biological material. In some embodiments, the step of acquiring the holograms is preceded by irradiating the medium with a secondary light source. The secondary light source can emit light in the ultraviolet range of the electromagnetic spectrum. The biological particles can be photolyzed when irradiated by the secondary light source.

The schematic of the DIHM is shown in FIG. 20. A laser (L) emits at the wavelength of λ=405 nm. The laser beam is focused on the pinhole (P) that has an aperture diameter approximately matching the wavelength of the laser source. The resulting wave illuminates object(s) under observation from a distance of a few micrometres from the pinhole, producing a highly magnified diffraction pattern, the hologram, on the screen (photosensitive matrix, model MV1-D2048-96-G2-10, Photonfocus AG 00140622, version 2.1). We used the CMOS matrix that allowed recording holograms that are 2048×2048 pixels (5.5 μm camera pixels), stored as digital images for subsequent reconstruction.

As shown in FIG. 20, the light emitted from the point source (the pinhole) propagates towards the screen and is scattered by the objects in its path, resulting in a hologram. The wave amplitude of the hologram at the screen, A(r, t), is given by Equation 1.

$$A(r,t)=A_{ref}(r,t)+A_{scat}(r,t) \tag{1}$$

where $A_{ref}$ (r, t) and $A_{scat}$(r, t) are the reference and scattered amplitudes, respectively. The intensity of the hologram recorded on the photosensitive matrix screen, I(r,t), is A(r,t)A*(r, t) and can be expanded to yield $$I(r,t)=A_{ref}(r,t)A_{ref}(r,t)+[A_{ref}(r,t)A_{scat}*(r,t)+A_{scat}(r,t)A_{ref}* \\ (r,t)]+A_{scat}(r,t)A_{scat}*(r,t) \tag{2}$$

In Equation 2, the first term is the intensity of the beam in the absence of a scatterer, and the last term is the intensity of the scattered wave. The second term in the square brackets in Equation 2 signifies the interferences between the reference and the scattered waves, referred to as holograms.

$$A_{scat}(r) = \frac{iA_{ref}}{r\lambda} \int \int I(r)\frac{\exp\left(ik\frac{rr'}{r}\right)}{|r-r'|}ds \tag{3}$$

Figure 21:
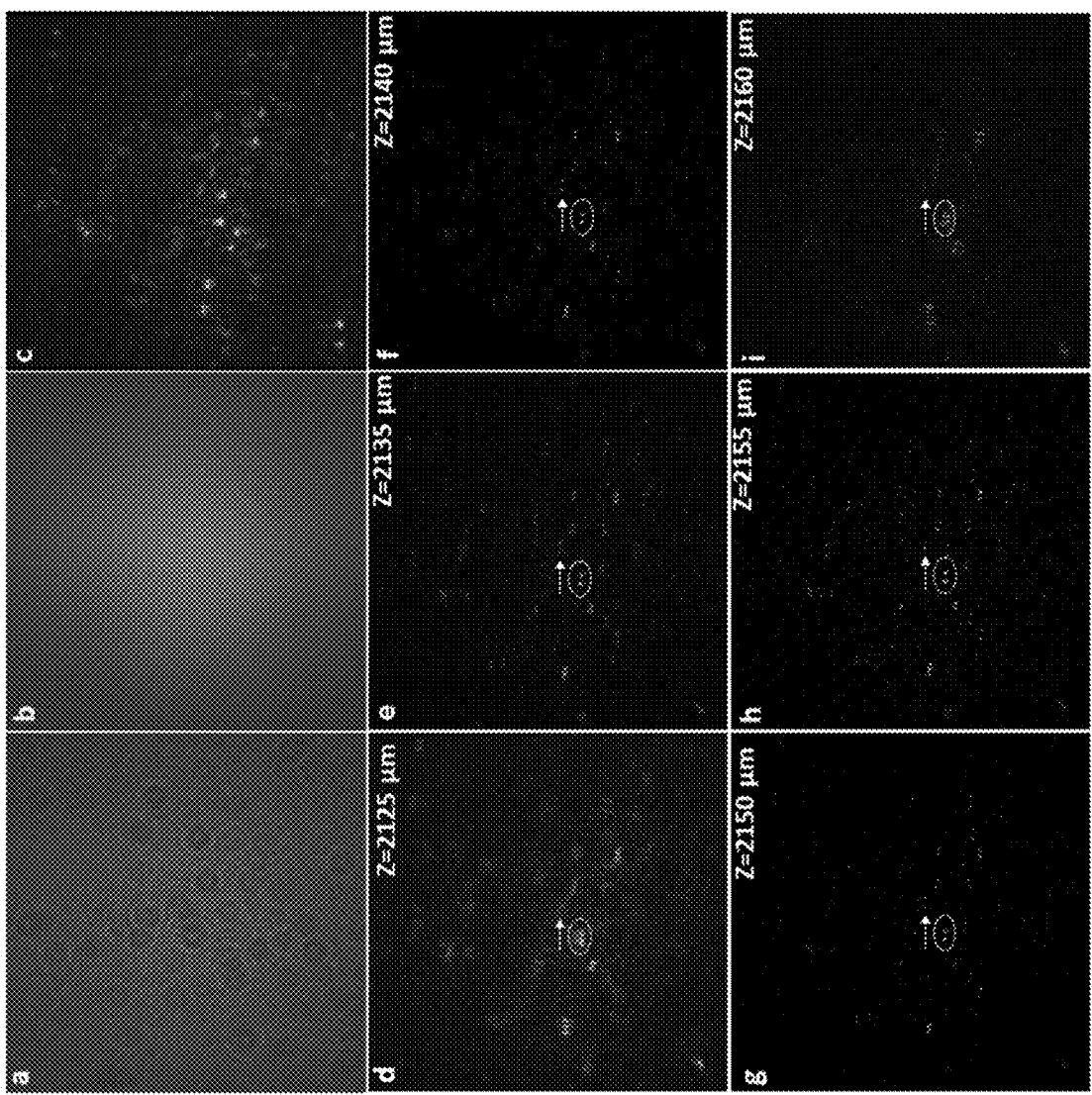
FIG. 21 shows intensity reconstruction at different depths of PSL particles on a microscopy slide, with FIG. 21(*a*) Raw hologram recorded with PSL particles.

The distance between the source (pinhole) and the camera sensor (screen) is ~5 mm, the wavelength of light is 405 nm, and the camera pixel size 5.5 μm. These are the input parameters for the reconstruction. No other information is required to retrieve images, which yield the position, orientation, and shape of the observed objects. The 3D morphology and the 3D position of the object(s) can be determined from the reconstructions at different image planes. The proper reconstruction position is essential to obtain sharp images (FIG. 21). As such, the reconstruction can be performed at a multitude of different planes extending between the pinhole and the sensor, with each plane being perpendicular to an orientation defined by the pinhole and the sensor. In these embodiments, the reconstruction can include a step of identifying which of the reconstruction(s) has(ve) a satisfactory or greater sharpness, or a sharpness above a given threshold. In some embodiments, the planes of the reconstructions can be spaced apart by 0.01 micrometers from each other. FIG. 21 shows that merely small changes of reconstruction position Z can significantly enhance image quality, including its resolutions. The aim was not to focus on the dimension of the particles. The reconstruction plane is defined as the plane between the laser source's focus and the camera sensor parallel to the YZ-plane. These distances are found manually by systematically changing the reconstruction positions, i.e., the distance between the focus of the laser and the reconstructed plane. The absolute dimensions of the observed object(s) in the reconstructed image are calculated during the resultant hologram's inversion. No further calibration is needed for the determination of the dimensions of the observed object(s). The mean values of background intensity along the different crosscuts of holograms are 8.05±6.56 arbitrary units. The background hologram was recorded with zero air. The air or aerosol exiting the gas cuvette is passed into the SMPS and the OPS. The data obtained with the SMPS and the OPS for zero air showed a particle count of fewer than 1 particle/cm$^3$.

Resolution of Nano-DIHM: Beyond the diffraction limit. The resolution of reconstructed DIHM images depends on the information recorded in the hologram. In turn, the information captured in the hologram depends on numerous factors, such as (1) the pinhole size, controlling spatial coherence and illumination cone; (2) the numerical aperture, given by the size and positioning of the recording photosensitive matrices, i.e., a CCD or a CMOS chip; (3) the pixel density and the dynamic range, controlling fringe resolution and the noise level in the hologram; and (4) the wavelength.

The lateral resolution is represented in terms of the geometric parameters of DIHM. The recording screen is perpendicular to the optical axis connecting the light source with the center of the screen. In some embodiments, the light source is a laser source. The lateral resolution of DIHM can be calculated using Equation 2. A detailed description of the lateral criteria of DIHM has been reported in previous studies. The holographic term in Equation (2) can be rewritten as $$|r2-r1| > \frac{\lambda}{2NA} \tag{4}$$

Where NA is the numerical aperture of the microscope, and it can be defined as:

$$NA = \frac{W}{2\left[\sqrt[2]{\left(\frac{d}{2}\right)^2 + (d)^2}\right]} \tag{5}$$

where W is the width of the screen and d is the distance between the point source and the screen. Depth resolution in holographic reconstruction is harder to achieve which improves with the increasing size of the screen. The depth resolution of the holographic microscope is given by Equation 6.

$$|r2-r1| \geq \frac{\lambda}{2(NA)^2} \tag{6}$$

The theoretical lateral resolution calculated for the setup used in this study was 271 nm, while the depth resolution was 362 nm. However, applying the experimental approach and the numerical process can bring a much lower resolution. In this study, these are the three processes used to overcome the diffraction barrier of the setup and detect the nanosized objects.

In this study, we do not need to add any additional physical objects, and there is no need for external filtering for the recording/reconstruction of holograms. The holograms were recorded near the pinhole and bring the camera closer to the quartz flow tube cuvette for dynamic mode or quartz microscopic slide for stationary mode. This configuration is possible because the Octopus software still allows us to record the hologram in the size of 2048×2048-pixel with a pixel size of 5.5 μm given the source to camera distance (5 mm). Hence, we achieved a larger field of view, allowing tracking both single-particle and multiple particles. The pinhole and the flow tube (cuvette) for dynamic experiments or microscopy slides for the stationary experiment nearly touched each other. In DIHM, the shorter the source-to-sample distance, the higher the magnification, and hence a higher resolution can be achieved. By using this process, the numerical aperture (NA) of the Nano-DIHM increases substantially (NA=0.7428) (Eqn. 3). Thus, following the steps below, the nano-DIHM resolution can go below this theoretical threshold and allow nano-size particle detection.

Keeping the cuvette near the source and bringing the camera to near the cuvette collectively increases the Nano-DIHM magnification. Previously, the only way to increase the resolution was by numerical approaches because the low numerical aperture was one of the major issues in achieving the high resolution in digital holography. Another advantage of the current experimental setup shown in FIG. 20 is that the single pinhole can work with multiple virtual illumination sources. Thereby, we do not need multiple illumination sources to record the hologram. To obtain such short distances, the sample flow tube is introduced between the pinhole and CMOS so that the sample is facing the pinhole, as illustrated in FIG. 20. The pinhole emits the light, and the bottom of the surface of the sample carrier will partially reflect this light to the pinhole. In turn, this light is reflected to the sample carrier, where it is partially reflected backward, multiple times. As a result, the light coming directly from the pinhole is superposed upon the reflected light, which appears to come from several virtual pinholes. This experimental recording process of holograms enabled us to overcome the diffraction barrier, allowing measurement of the nanosized particles ≤200 nm. Note that several studies using near-field optical microscopy have successfully captured the nanoscale objects, overcoming the diffraction limit of the optical system.

In digital holography, recent studies achieved detection of nanoparticles using an on-chip microscope where each nanoparticle served as a nucleus for self-assembled deposition of refractive materials (Polyethylene Glycol (PEG)-based solution) around each particle (nanolenses), thus increasing each particle's size and scattering cross-section, effectively helping it's the detection on a chip. Several theoretical numerical methods based on the deconvolution algorithm on the sensor chip and point source are used to detect the nanoparticles.

As the distance between the source and the sample gets shorter, the object vibrations and noise are getting more extensive due to the higher magnification. It blurs out the fine interference fringes and reduces the potentially achievable high resolution. Indeed, it is a challenge, and we agree with it. However, experimentally, to overcome this significant challenge and compensate for the vibrations and noise, a short-time acquisition sequence of the holograms and a thin sample carrier (compared to the distance between the pinhole and the image sensor) was used and recorded. Such numerical reconstruction methods with deblurring techniques have been demonstrated that in the motion-deblurring photo-image analysis permits achieving a higher resolution by a factor of 2 or more.

The Octopus/Stingray software was used to reconstruct the recorded holograms in this study. The software is based on a patented algorithm, which can effortlessly achieve the lateral resolution on the order of half-wavelength (λ/2) of source and depth resolution on the order of one wavelength (λ). Furthermore, as shown in detail elsewhere, a higher resolution was achieved using multiple deconvolutions routines during the reconstruction: (1) illumination system (pinhole) and (2) the finite numerical aperture of the recording screen (CCD/CMOS). Implementing an instant 3D-deconvolution routine in our reconstruction method allowed us to reach the desire resolution. The importance is that to find the plane where the phase/intensity image is accurately focused. Thereby, if we are aimed to measure the PSL for 200 nm size, as an example, the plane must be within 0.01 micron. Otherwise, the dots will be only a few pixels and do not look like quality images. For that reason, increasing the precision with 0.001 in Octopus software allowed us to achieve high resolution. Finally, we accurately focus on blurred objects by adjusting reconstruction position (z) to up to three decimal places (0.001).

The advantage of the deconvolution routines is to remove white noise from final reconstructed images and enhance the resolution by a factor of 2, as discussed in detail in previous studies. By employing the 3D-deconvolution routines, the out-of-focus signal is brought back to its scatterer, and the twin images are automatically removed as they are not part of the scattered wave. Thus, spatially well-localized parts of an object are recovered free from artifacts and noise-free. For example, Nickerson et al. in FIG. 16 shows how implementing the two-fold deconvolution mechanism removes the white noise from reconstructed images.

In addition to air, several holograms are formed in an aqueous medium (water), and thus the wavelength of the laser is reduced from λ=405 nm to ~300 nm.

The recorded holograms provided the information on the phase, size, and morphology of objects. The holograms were reconstructed using the Octopus software (version 2.2). The relative phase shift (rad) has been measured for the objects. Suppose the refractive index of objects is $n_{obj}$ and the refractive index of fluid or medium is $n_m$; the phase shift depends on the distance that light travels in each medium. In this study, the light with wavelength λ (405 nm) travelling a distance of t in the object, results in the relative phase shift given by $$\Delta\psi = (n_{obj} - n_m)\frac{2\pi t}{\lambda}. \tag{7}$$

Further, the optical path difference is:

$$OP = (n_{obj} - n_m)t = \frac{\lambda\Delta\psi}{2\pi}. \tag{8}$$

The crosscuts (phase shift vs. position of the object) through a phase reconstruction image of an object determine the optical path as a function of position within the objects. If the size of the particles/objects in the light propagation direction is known, the changing refractive index can be calculated from the measured phase shifts using Eq. (7). Otherwise, information on the refractive indices of the objects/particles and the medium allows determining the object/particle size in the light propagation direction (object height).

A NanoScan™ SMPS model 3910 (TSI Inc.) and an OPS model 3330 (TSI Inc.) were used to measure the real-time size distributions of airborne particles. The SMPS measures the size of the airborne particles in the range of 10 nm to 400 nm in terms of the electrical mobility diameter. The sampling flow rate of the SMPS was 0.75 L/min. The OPS determines the particle size distribution in a size range of 0.3 μm-10 μm in terms of optical diameter with a sampling flow rate of 1 L/min. A more detailed description of the SMPS and the OPS is provided elsewhere.

The experimental setup shown in FIG. 13 for measurement of airborne particles consists of the following components: the DIHM instrument, a gas flow cuvette (ES Quartz Glass, volume of 700 μL, path Length 2 mm), a microscope slide (Quartz Glass), the aerosol generator unit, and the aerosol sizers (SMPS and OPS). Each experiment has been triplicated (repeated thrice). During each repeat, we generally recorded 1000 holograms. The details of the aerosol generation unit and the particle sizers have been described elsewhere.

Several sample matrices have been tested (Table 1): ambient air, snow meltwater, aerosolized 100 nm and 200 nm size polystyrene latex spheres (PSL), a mixture of PSL with iron oxide powder, synthetic materials such as zinc oxide (powder, <60 nm particle size, Sigma-Aldrich, Inc. Ontario, Canada) and iron oxide (iron (III) oxide, nano-powder, <50 nm particle size, Sigma Aldrich Inc.). For in-situ real-time measurements of ambient aerosols, an electrically conductive tube ~122 cm in length was used to direct the ambient air through the gas flow cuvette placed on the stage of the DIHM instrument. The outflow (1.7 L/min) from the cuvette passed to the SMPS and the OPS. The coupling of the SMPS and the OPS with the DIHM allowed determining the aerosol size distribution of the particles imaged by DIHM in real time.

The original colloid solution of 100 nm PSL spheres (2% wt) was provided with a calibrated diameter of 101±7 nm, and the size of 200 nm PSL (10% wt) standard particles with a calibrated diameter of 188±4 nm, supplied by Sigma-Aldrich, respectively. The original colloid solution was diluted for aerosolization and imaging in the moving airflow stream by mixing 100 μL of the original colloid solution of the PSL spheres with 10 mL of Milli-Q water. The resultant solution was aerosolized using the aerosol generation unit (solution flow rate of 0.25 ml/minute) and passed through the gas flow cuvette installed in the DIHM instrument with a final flow rate of 1.7 L/minute.

We investigated the size and shape of the PSL spheres in the colloid solution of PSL standard particles and 1:100 mixtures with Milli-Q water at room temperature. In addition, the mixture of iron oxide nanoparticles and 200 nm standard PSL particles were analyzed by directly using DIHM. A 20 μL aqueous solution of PSL particles (100 nm and 200 nm) and mixed samples were deposited on the microscope slide to record the direct holograms by DIHM, respectively. Next, standard-size synthetic powder materials (zinc oxide and iron oxide) were imaged by DIHM directly on a microscope slide. To validate the size, shape, and morphology of the PSL, mixed samples and particles in the snow were visualized in the holograms and compared with the morphology visualized using S/TEM. Half of the liquid samples were analyzed by S/TEM at the Facility of electron microscopy at McGill University, and the remaining half samples were studied using Nano-DIHM. The S/TEM imaging techniques are discussed in our previous papers. The additional details of each experiment, such as sample information, flow rates, and the recording parameters of DIHM, are given in Table 1.

We evaluated the changing refractive index measurement of the suspended solution. Glycerin drops were prepared by adding 100 μl of glycerin (refractive index, 1.4729, Sigma-Aldrich, Inc.) to 1 ml of type F microscope oil (refractive index, 1.518 at 23° C., Olympus, immoil-f30cc, Tokyo, Japan). This mixture was then vortexed for 15 min, and a small sample of the resulting suspension was placed on a microscope slide. A previous study suggests that this method produced glycerin drops in the range of 1 μm to 10 μm in diameter.

An essential stingray software has been bought with the 4deep desktop holography microscope. The octopus software has been used manually to reconstruct the hologram, while stingray software can be automated to detect the objects for millions of holograms. Stingray can be used to analyze holograms both in real-time or offline. The first input is to train the stingray software by providing the recording conditions of holograms (hologram size, camera pixel, source to sensor distance); the second is to optimize the intensity of the holograms or find the threshold intensity values. We used a grayscale and maximum intensity with 250 arbitrary units.

Based on the threshold value of intensity, Stingray will start looking to detect the objects. The main issue is to identify the threshold values of intensity. For that, we used octopus software for hundreds of hologram reconstructions and estimated the best threshold values. Here are some consequences if we choose high or low threshold values, such as a high threshold, for example, 200, which means that the pixel's intensity has to be 200 or more for that pixel to be detected by the software. Thus, a low threshold (ex: 10) would allow many pixels to be detected, while a high threshold (ex: 200), would let fewer pixels be detected. For that, we started with a low threshold (for example, 50) and worked our way up to a higher threshold until we find optimized conditions. The major advantage of fully automated Stingray software is to distinguish the round vs randon shaped particles along with time dependent morphology, roughness and orientation of objects. However, the size obtained by stringray software required further correction. Currently, we are in the process of building the library for different kinds of samples and establishing the size correction methods (Manuscript in under preparation).

Example 2—a Novel Dynamic Technique, Nano-DIHM, for Rapid Detection of Oil, Heavy Metals, and Biological Spills in Aquatic Systems Numerous anthropogenic and natural particle contaminants exist in diverse aquatic systems. Yet, their environment fates are widely unknown. We coupled a flow tube with a digital in-line holographic microscopy (nano-DIHM) technique for aquatic matrices, for in-situ in real time analysis of particle size, shape, and phase. Nano-DIHM enables 4D tracking of particles in water and their transformations in three-dimensional space in real-time. We demonstrate that nano-DIHM can be automated to detect and track oil spills/ oil droplets in dynamic manner, in moving waters. We provide evidence that nano-DIHM can detect MS2 bacteriophage as a representative biological-viral material, and mercury-containing particles alongside other heavy metals (e.g., Ni, Ti, and Fe) as common toxic contaminants. The nano-DIHM shows the capability of observation of combined materials in water, characterizing the interactions of various particles in mixtures, and particles with different coatings in a suspension. The observed sizes of the particles and droplets ranged from ~1 μm to 200 μm. We herein demonstrate the ability of nano-DIHM to characterize and distinguish particle-based contaminants in water, and their interactions in both stationary and dynamic modes with a 62.5 millisecond time resolution. The fully automated software for dynamic in-situ and real-time detection of contaminants will be of global significance such as oil. A comparison is also made between Nano-DIHM and established techniques such as S/TEM for their different capabilities. Nano-DIHM can provide a range of physicochemical information in stationary and dynamic modes, allowing life cycle analysis of diverse particle contaminants in different aquatic systems and serve as an effective tool for rapid response for spills and remediation of natural waters.

The natural waters of the world are the source of life for all living entities, humans included. Yet humanity is the primary source of a wide-range of contaminants into the increasingly limited natural waters, whether they be ground waters, streams, rivers, or oceans. Many current global health and environmental issues are associated with water quality problems. Approximately 30% of renewable freshwater is used by industry and municipalities, which results in a large amount of contaminated wastewater containing numerous micropollutants of varying concentrations. A large amount of water comes into contact with agricultural or urban areas, resulting in water runoff entering natural water systems. This runoff can contain anthropogenic chemicals such as pesticides and naturally occurring materials such as heavy metals, biological matters, various oils, and metalloids. There arises the immediate need for development of in-situ and real-time technologies to detect and classify these contaminants to evaluate a wide range of physicochemical characteristics that allows understanding their environmental fate in aquatic systems, and a more effective approach to remediation of natural waters.

A major concern in the modern world of advanced transportation and shipping, is the abundance of oil and gasoline spills into water systems. The increased demand results in an increase in yearly oil spills and related incidents, causing increasing damage to the ecosystem and the environment. The physical and chemical characteristics of oil and associated petroleum products consist of a multitude of toxic components which directly or indirectly effect wildlife in aquatic systems and climate. Oil that is suspended in water systems can cause aggregation with other suspended particulate matter. One mechanism for this aggregation is referred to as droplet type. An individual droplet or group of droplets is suspended in a water system, and gets surrounded by micron sized particles. Understanding the contaminated layer of petroleum products on bodies of water is important for future remediation processes, and imaging techniques could be beneficial for potential remediation technology applications.

These suspended particles can have varied compositions, which includes additionally toxic compounds of interest, such as the group of heavy metals and metalloids with a relatively high density. Some examples of common heavy metals are copper, zinc, titanium, nickel, iron, lead, and mercury. In addition to regular household waste streams, copper is primarily from pesticides, fertilizers, and electronics, zinc originates from mine tailings and industrial processes, titanium is from industrial waste, nickel is produced from industrial effluents and batteries, iron is from various industries, and lead is from petrol combustion and insecticides. Heavy metals are toxic to humans, and as concentrations increase they can cause harm to plant life.

Mercury is one of the primary toxic chemicals in aquatic environments among the other heavy metals and can be released into the environment during anthropogenic processes; primarily the combustion of fossil fuels, mining processes, and industrial processes, as well as natural sources such as forest fires. The distribution of these toxic compounds can be influenced by natural environmental surfaces such as bodies of water, or airborne particulates. Despite international interest on mercury in the environment, there are still important questions to be answered on the subject of interactions of mercury compounds with gaseous pollutants, aerosols, and nanoparticles, and how mercury species and mercury-containing aerosols may interact with various environments.

In the current age of the global COVID-19 pandemic, there is growing interest in the properties of virus-containing aerosols and their interactions with other environmentally relevant particles and compounds. SARS-COV-2 and several respiratory viruses can be transmitted through the air as aerosols, produced during speech, coughing, sneezing, etc. These virus aerosols, like other aerosols, can be deposited onto various surfaces, including water in the environment, where they can interact with other particles and compounds. It is of interest to image these virus containing aerosols to be able to study their properties and how they interact with other compounds and particles in their aerosol form.

In this example, we use a newly developed application of digital in-line holography (nano-DIHM) designed for airborne particles, and adapt it for applications in water, allowing measurement of the size, shape, intensity, phase, and interactions of significant nano/micro-particle contaminants of global natural water systems. This methodology provides an edge over S/TEM (Scanning/Transmission Electron Microscopy) for imaging water suspended particulates, as it allows for liquid (stationary) and in-situ dynamic measurements (flowing water). The current work demonstrates the use of this methodology for measuring heavy metal oxides, mercury containing particles, oil contaminants, and virus particles and their various interactions within aquatic matrices. This is done both as a stationary suspension sample on a microscopy slide, and as a dynamic flowing suspension with a flow-tube cuvette. We show advancements towards fully automated real-time in-situ detection of contaminants of global significance such as oil spills in oceans, seas, lakes, and rivers During all experiments, several compounds and chemicals were used. The mercury containing compounds including $HgCl_2$ (≥99.5%), $HgBr_2$ (≥99.5%), $HgO$ (≥99.0%), $HgS$ (≥99.0%), and $HgSO_4$ (≥98.0%) were all purchased from Sigma-Aldrich, Oakville, Canada. All the metal oxide compounds $Al_2O_3$, $CuO$, $PbO$, $NiO$, $TiO_2$, $ZnO$, and $Fe_3O_4$ were all purchased from Sigma-Aldrich, Oakville, Canada. The bacteriophage MS2 samples were produced by ZeptoMetrix and purchased through Cedarlane, Burlington, ON. The oil used during oil experiments was Inland 45 vacuum pump oil, and SKC mineral oil. All suspensions made during sample preparation were made using ultrapure Milli-Q water to remove any interference from particulates and compounds.

Figures 22, 23:
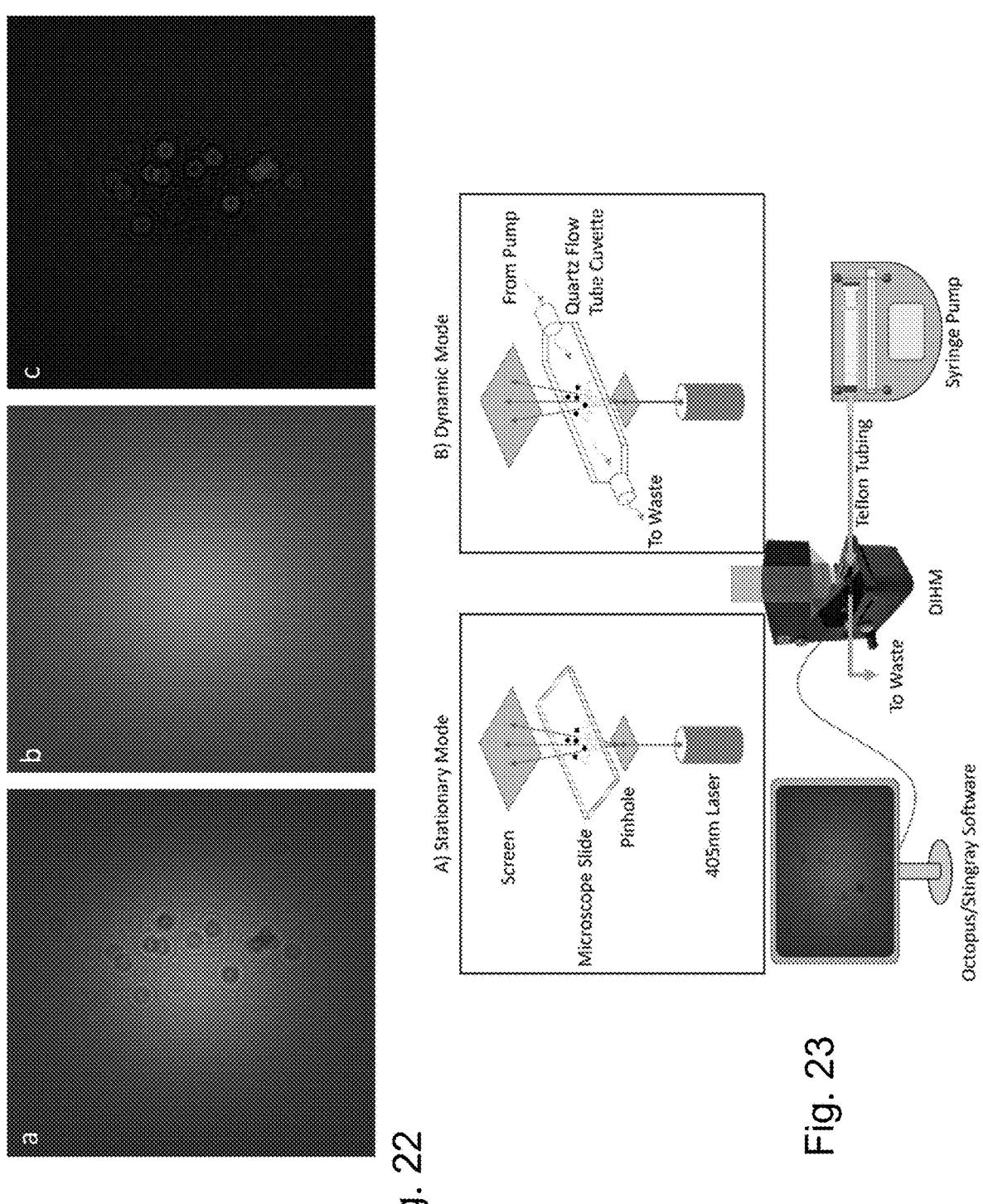
FIG. 22 shows raw holograms subtraction of titanium oxide in suspension, with FIG. 22(*a*) is raw hologram.
FIG. 23 shows an schematic of experimental setup, showing different sample holders for a stationary mode in FIG. 23(*a*) and a dynamic mode FIG. 23(B), with a syringe pump connected only in the dynamic mode.

A more detailed description of the digital in-line holographic microscope with flow tube system (nano-DIHM) setup, method of operation. A brief description is provided in the current work here. DIHM, as a method, is composed of 2 main processes. These being the initial recording of the hologram of a given sample, and then the numerical reconstruction of the recorded hologram which allows us to obtain the object information, including size, shape, phase, and morphology. FIG. 22 illustrates an example of raw holograms before reconstruction. In this study, a 4Deep Desktop Holographic Microscope was used to record images, and the Octopus/Stingray software package, version 2.2.2 was used for the reconstruction process. Octopus software is typically used for recording holograms and manually reconstructing specific hologram results. Stingray software is primarily used to process large numbers of holograms and can be trained to automate detection of specific particles.

FIG. 22 provides an example of a raw recorded hologram (FIG. 22($a$)) before subtracting the raw background hologram (FIG. 22($b$)) to obtain the resulting hologram used for reconstruction (FIG. 22($c$)).

The principle of operation for recording holograms is generally composed of 3 main components. The first is the light source, which in this case is a laser (L) with a wavelength of 405 nm. The next component is the pinhole (P), which is located between the light source and the sample holder and is of a size such that its diameter is closely matching the wavelength of the light source. The light wave passing through the pinhole then illuminates the sample placed in the holder. To observe the submicron-sized particles, the sample can be within a few micrometers of the pinhole yet can be millimeters away from the pinhole when looking at larger particles or groups of particles. For instance, for particles having a dimension below one micrometer, a distance between the pinhole and the flow tube is within 5 micrometers, preferably with 4 micrometers, and most preferably within 3 micrometers. For larger particles, the distance between the pinhole and the flow tube can be within a few millimeters. Once the light wave has interacted with the object, it produces a magnified diffraction pattern on the screen (photosensitive matrix, model MV1-D2048-96-G2-10, Photonfocus AG 00140622, version 2.1).

The scattered light wave reaching the screen, and the consequent hologram, has an amplitude, A(r, t), and intensity, I(r, t). The amplitude is shown in Equation (9), $$A(r,t)=A_{ref}(r,t)+A_{scat}(r,t) \tag{9}$$

where $A_{ref}(r, t)$ and $A_{scat}(r, t)$ are the reference and scattered amplitudes, respectively. The intensity is given in Equation (10), $$I(r,t)=A(r,t)A^*(r,t) \tag{10}$$

The intensity equation can be expanded, as shown in Equation (11), $$I(r,t)=A_{ref}(r,t)A_{ref}^*(r,t)+[A_{ref}(r,t)A_{scat}^*(r,t)+A_{scat}(r,t) \\ A_{ref}^*(r,t)]+A_{scat}(r,t)A_{scat}^*(r,t) \tag{11}$$

where the first term represents the intensity of the wave without scattering from an object, the third term represents the intensity from only the scattered wave, and the second term describes the interferences between the first and third terms. This larger second term is what describes the resulting holograms.

Once recorded, a hologram can be reconstructed using the Octopus/Stingray software by inputting the following parameters: The distance between the pinhole and the screen, the wavelength of the light source (405 nm), and the camera pixel size (5.5 μm). One of the primary parts of this process is to find the plane in which the observed object is in focus. This is primarily achieved by adjusting the reconstruction position (z) to accurately focus on the object.

We have performed the experiments on both solid powder samples as well as samples of a suspension in water. Both sample types are stationary and utilize a quartz glass microscopic slide as the sample holder. This is demonstrated in part A) of the schematic in FIG. 23. For solid powder samples, a portion of the compound, such as metal oxides, was lightly deposited across the surface of the microscopic slide. Nano-DIHM was used for imaging.

FIG. 23 provides a schematic of the experimental setup, detailing the primary components of the DIHM and how the different modes of operation require different sample holders. In principle, if natural environmental sampling was desired, the Teflon tube going to waste could be replaced with a tube going to a peristaltic pump. This would pull water from a desired sample location through the quartz flow tube cuvette for measurement, rather than using a syringe pump.

For the measurements of suspensions in water, suspensions of the given analyte were first made. To be consistent across all samples, suspensions were all made as 1 g/L. This concentration produced a high enough concentration of particles to easily observe them using nano-DIHM but was not so high that it blocked all light or only produced very large aggregates. Once the suspension was made, a micropipette was used to extract 20 μL to place onto the microscopic slide. Once placed, a cover slide was used to spread the sample into a thin layer.

The same samples prepared for stationary measurements were used for flow experiments. The quartz flow tube cuvette (volume of 700 μL, and a path length of 2 mm) was used to circulate the samples. This is demonstrated in part B) of the schematic in FIG. 23, Supporting Information. The flow tube cuvette is then placed in the sample holder of the DIHM. The sample suspension was placed in a syringe and injected by using a GenieTouch syringe pump. The syringe was then connected to the flow tube by Teflon tubing. The set pump rate of the suspension was 0.25 mL/min. Holograms were then recorded as the particles flowed through the flow tube to image particle dynamic trajectories.

The Stingray software allows for the automated processing of thousands of holograms, essentially limited only by the processing capacity of the computational power of the computer. As an example, several hundred holograms were used to train the software. The Stingray software can be utilized in both offline and online mode, where it can analyze a series of holograms after they have been recorded or analyze holograms as they are recorded in real-time respectively.

The first information the software needs for training is the recording conditions used, which includes the hologram size, camera pixel size, and source to camera distance. The next significant parameter needed is the threshold intensity value. This threshold value is the minimum pixel intensity that will be recognized by the software to be identified as the desired particle. To determine this value, the Octopus software is first used to reconstruct several holograms manually. When focussed on the desired particles in the hologram, the threshold value can be adjusted until it is the value required to just identify the desired particles. This provides a good approximate starting point for training the software and can be adjusted in various iterations to optimize the results. For example, a low threshold value would allow too many pixels to be detected and hinder differentiating different particles, and a high threshold value would cause too few pixels to be detected and may prevent the desired particle from even being detected.

Once the threshold value has been optimized, the Stingray software can be trained to detect and classify the particles through many iterations of analysis on multiple holograms.

The outcome results consist of the particle information including 3D sizes, surface area, surface roughness and shape. This process can be used on both stationary and flowing samples.

Sample preparation for S/TEM analysis is a simple process requiring deposition of the analyte particles onto an appropriate support grid. In our case, the support grid is a 400 mesh Cu grid from SPI (SPI supplies, west Chester, PA, USA). The sample containing TEM grids were then analyzed using a high-resolution FEI Tecnai G2F20 S/TEM microscope with a field emission gun (FEI Company, Oregon, United States), at the Facility for Electron Microscopy Research (FEMR) at McGill University. The field emission gun transmission electron microscope (FEG-TEM) possesses high brightness and coherency, allowing for nanometer-sized areas of the studied object to be focused on by large electron probe currents. A charge-coupled device (CCD) camera in this system can magnify an image by 1 million times. Energy-dispersive X-ray spectroscopy (EDS) is another useful capability of the gun, which allows for determining elemental composition of studied particles. Further details of TEM analysis have been explained in previous works.

We demonstrate the use of Nano-DIHM for detecting, classifying, and imaging particles in water, in-situ in real-time. In this study, we measured the particles in both the aqueous phase, and synthetic material powders. We demonstrated our results in dynamic mode (aqueous suspension passes through flow tube cuvette) and in stationary mode (aqueous suspension or dry powder deposited on microscopic slide). Finally, we present our results into four primary categories, based on the type of metal/oil/organic contaminant. 1) The first category consists of oil-particle interactions, as these are associated with the most devastating single spill events 2) The second results category presents heavy metals, 3) Here we focus on mercury containing particles and their interactions with other particulates and soluble materials, and 4) The samples of a biological nature, such as MS2 bacteriophage as a representative bio-organic materials. This is important due to the current global pandemic and the interest in the behavior of viral containing aerosols.

Figure 24:
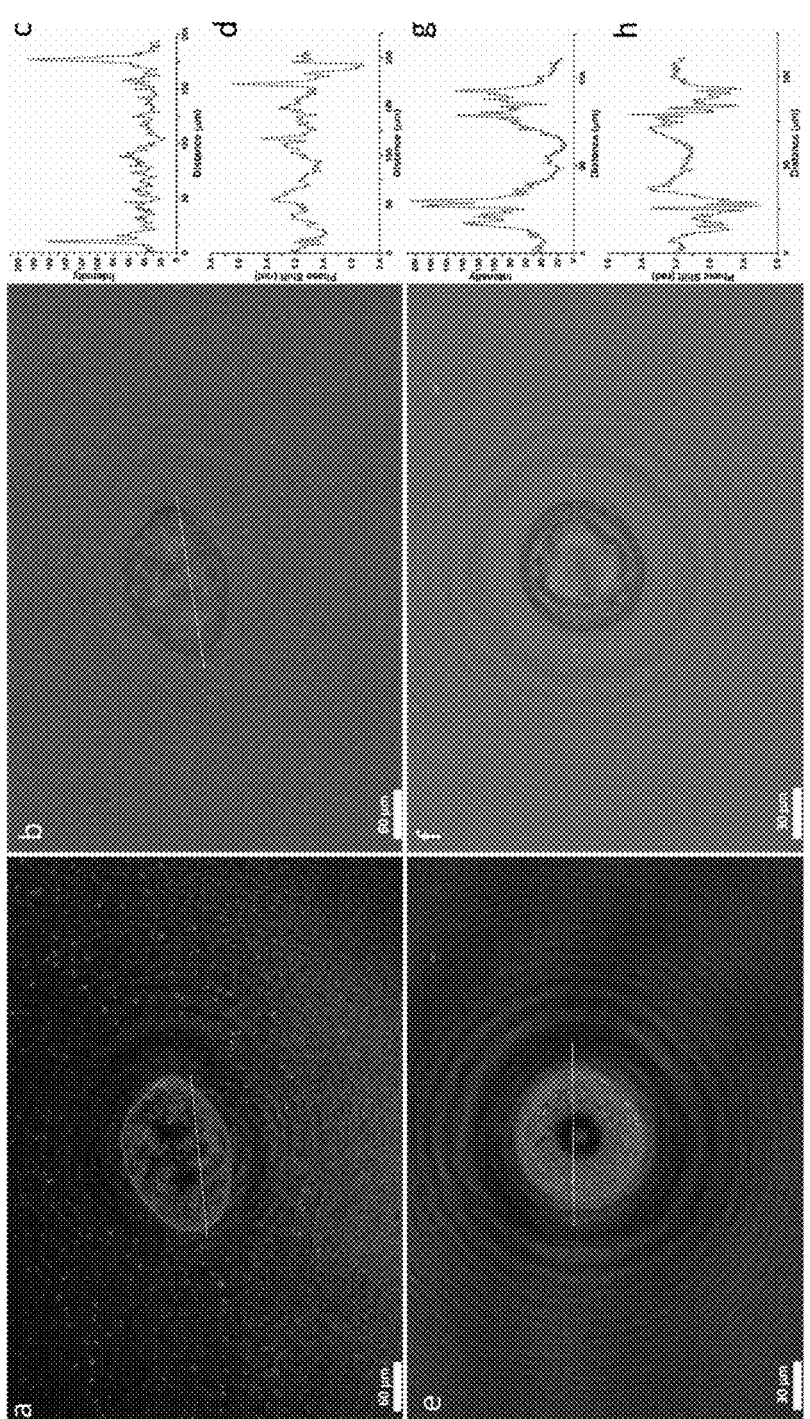
FIG. 24 shows reconstruction information for titanium oxide particles interacting with pump oil (a-d) at z=3209 µm, with FIG. 24(*a*) is intensity reconstruction.

One of the most dominant and harmful coatings seen in water systems in the modern world is oil. The removing of oil from the environment where it is spilled relies on particle-oil interactions which is a long-term process and a challenging task. The interaction of oils (pump oil and mineral oil) on metal (titanium oxide and mercury sulfide) particles shown in FIG. 24. As an example, FIG. 24(*a-d*) presents the interaction of vacuum pump oil (Inland 45) with titanium oxide particles. The intensity reconstruction of oil coated titanium oxide particles is shown in FIG. 24(*a*), and the phase reconstruction of the same particles is shown in FIG. 24(*b*). The intensity and phase reconstruction crosscuts of oil coated titanium oxide particles are shown in FIG. 24(*c*, *d*). The interaction of mercury sulfide particles with mineral oil is shown in FIG. 24(*e-h*). The intensity and phase reconstructions of oil coated mercury sulfide particles is shown in FIG. 24(*e*, *f*). The intensity and phase reconstruction crosscuts are shown in FIG. 24(*g*, *h*). Additional reconstruction results for oil-containing mixture are shown in FIGS. 25 and 26, Supporting Information.

The oil droplets form readily detectable shapes that interact with other particles in suspension in two primary ways. The first is to collect particles on the surface of the oil droplets, and the second is to trap particles within the oil droplets. When particles are collected on the surface of the oil droplet, the resulting intensity reconstruction shows a much sharper peak on the edges while the interior of the droplet is roughly background. This is shown in FIG. 24(*c*), as compared to the intensity reconstruction information for the case with particles trapped in the interior of the oil droplet, as shown in FIG. 24(*g*). These patterns make oil droplets readily distinguishable from other particles of a comparable size, because of the structure. As such, it is possible to utilize Nano-DIHM in real-time to sample natural waters and detect the presence of oil droplets in the environment.

Figure 25:
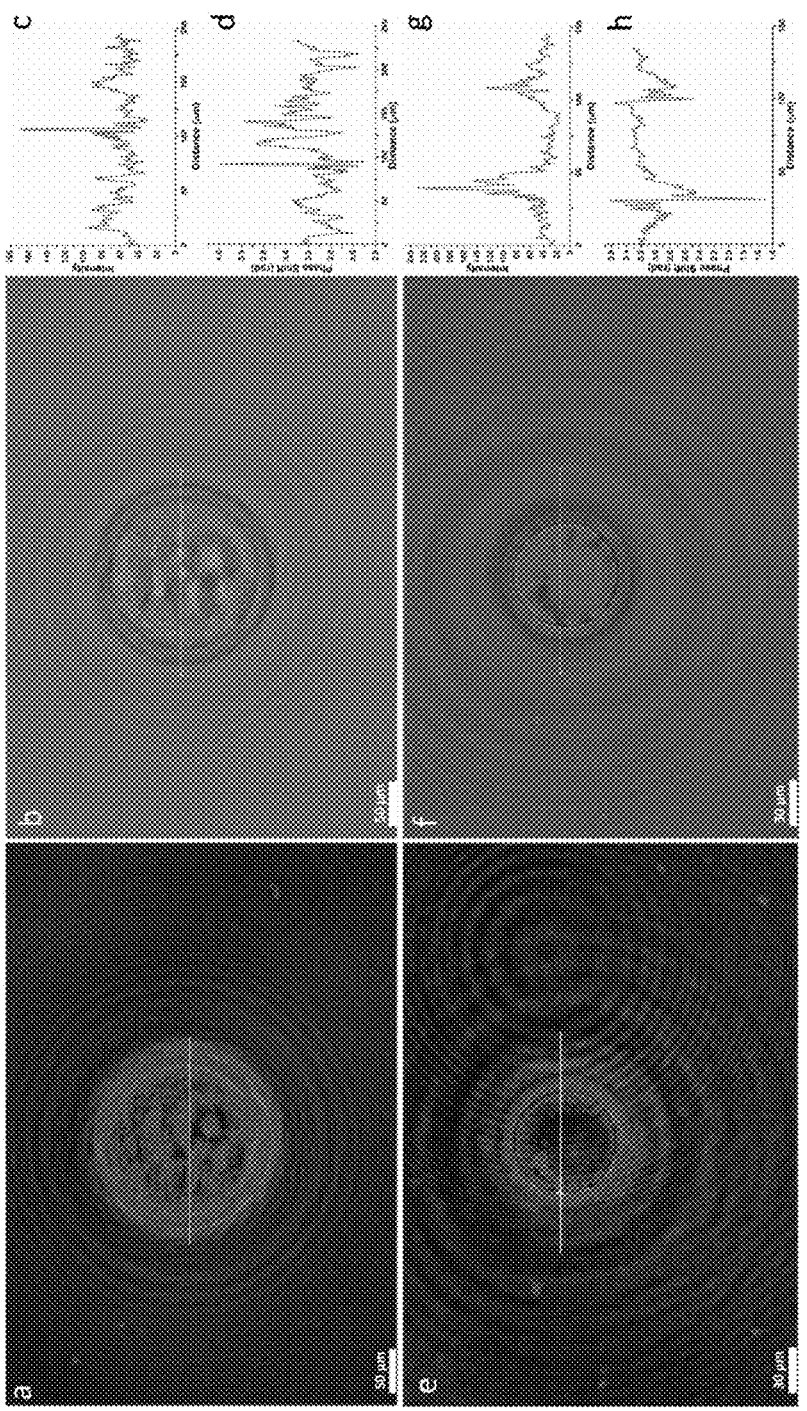
FIG. 25 shows reconstruction information for titanium oxide particles interacting with mineral oil (a-d) at z=1938 µm, with FIG. 25(*a*) is intensity reconstruction.

FIG. 25(*a-d*) presents the interaction of mineral oil (SKC) with titanium oxide particles. The intensity reconstruction of oil coated titanium oxide particles is shown in FIG. 25(*a*), and the phase reconstruction of the same particles is shown in FIG. 25(*b*). The intensity and phase reconstruction crosscuts of oil coated titanium oxide particles are shown in FIG. 25(*c*, *d*). The interaction of mercury sulfide particles with vacuum pump oil (Inland 45) is shown in FIG. 25(*e-h*). The intensity and phase reconstructions of oil coated mercury sulfide particles is shown in FIG. 25(*e*, *f*). The intensity and phase reconstruction crosscuts are shown in FIG. 25(*g*, *h*).

Figure 26:
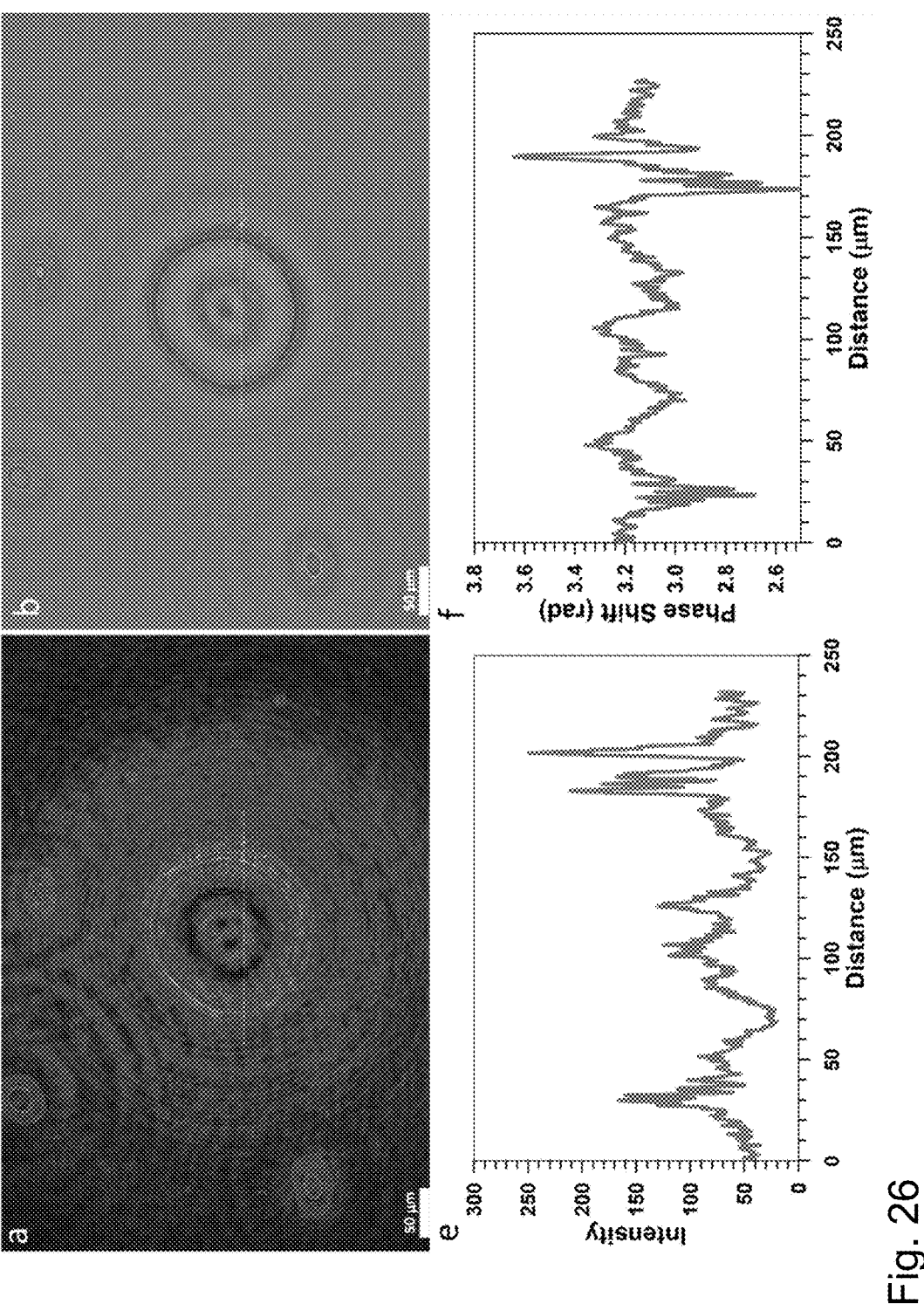
FIG. 26 shows reconstruction information for decanethiol coated mercury sulfide particles mixed with oil in suspension at z=1957 µm, with FIG. 26(*a*) is intensity reconstruction.

The intensity reconstruction of the mixture of oil, mercury sulfide, and decanethiol is shown in FIG. 26(*a*), and phase reconstruction of the mixture is shown in FIG. 26(*b*). The intensity and phase reconstruction crosscuts of the mixture are shown in FIG. 26(*c*) and FIG. 26(*d*) respectively. The purpose of this additional experiment was to observe the effects of an additional soluble coating on the particles before the oil was introduced to the sample.

Here we demonstrate the dynamic trajectories of oils drops in Milli-Q water obtained by Nano-DIHM. A number of these reconstructions are compiled into a single image to demonstrate the trajectory of the particles (FIG. 28(*a*)). FIG. 28(*b*) provides a 3D plot showing the movement of particles with respect to time. FIG. 28(*c*, *d*) show intensity and phase shift crosscut information for one of the droplets observed. We also provide dynamic trajectories of PSL particles as a proof of concept, and a mixture of iron oxide and titanium oxide to demonstrate a mixture given in FIG. 27.

Figure 27:
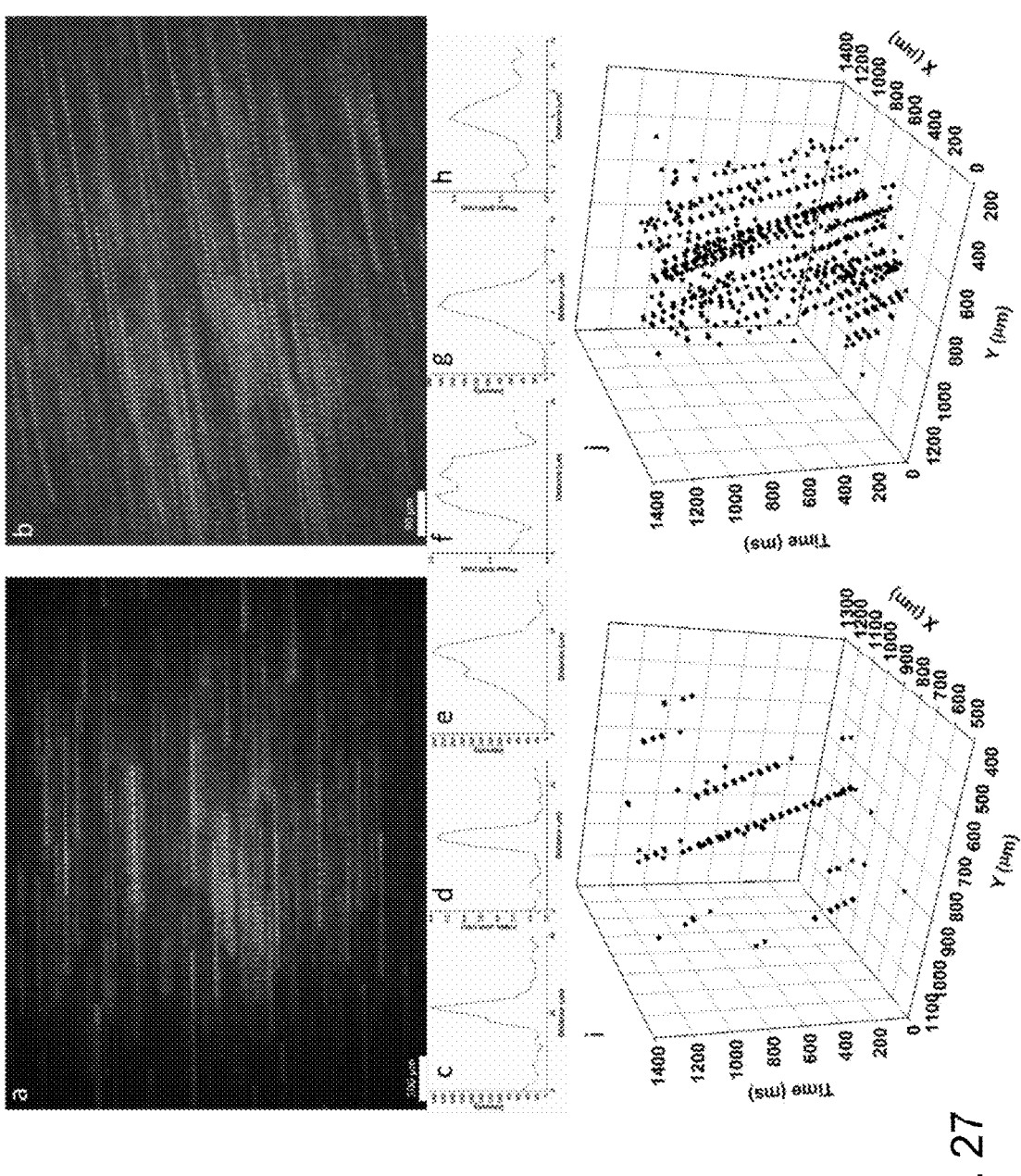
FIG. 27 shows reconstruction information for flowing particles in water, with FIG. 27(*a*) is compiled intensity reconstruction for PSL.
Figure 28:
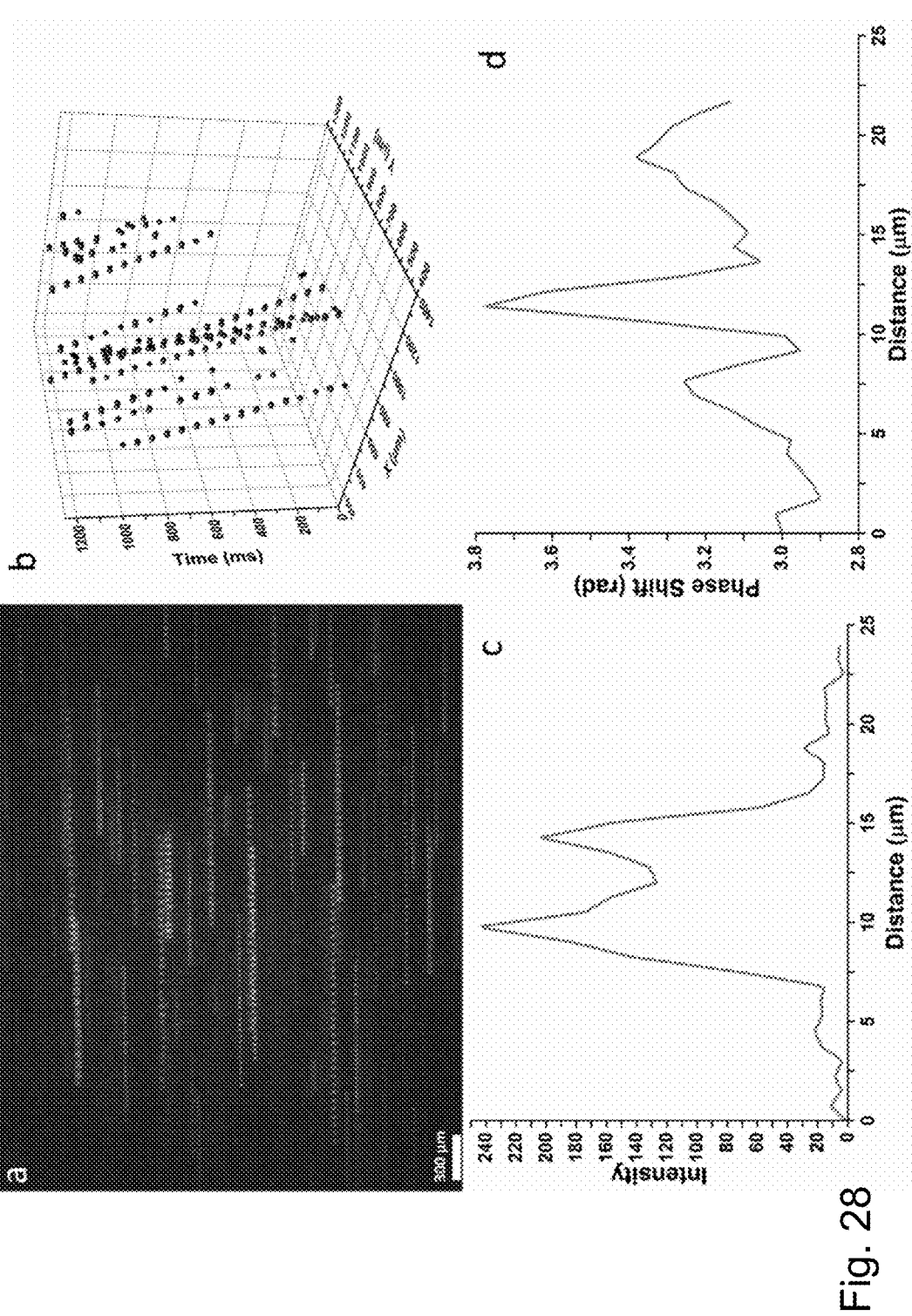
FIG. 28 shows reconstruction information for flowing pump oil droplets in water, with FIG. 28(*a*) is compiled intensity reconstruction for 32 holograms at z=4920 µm.

The two examples used in FIG. 27 are flowing suspensions of PSL, as a baseline experiment with uniform particle sizes, and a mixture of iron oxide and titanium oxide. The compiled intensity reconstructions of the moving PSL and metal oxide particles are displayed in FIG. 27(*a*) and FIG. 27(*b*) respectively. Representative intensity and phase reconstruction crosscuts of PSL particles are given in FIG. 27(*c*, *d*), iron oxide particles in FIG. 27(*e*, *f*), and titanium oxide in FIG. 27(*g*, *h*). 3D plots showing the movement of particles with respect to time are shown in FIG. 27(*i*) for PSL particles and FIG. 27(*j*) for the iron oxide and titanium oxide particle mixture.

To further facilitate real-time detection, the Stingray software has been trained for detection, classification, and characterization of oil droplets in flowing samples. In this case the training was done using 300 holograms over 200 iterations to achieve an accuracy of more than 99% for identifying oil droplets in a mixture with metal oxides. As an example, FIG. 29 shows the ability of this automated software to detect and identify the oil droplets from a heterogeneous sample (oil and iron oxide in water) and the oil droplet physical properties such as size, shape, and surface morphology for some identified particles. These example particles are just a few from hundreds identified by the automated process. The accuracy may decrease depending on the complexity of the sample matrix, especially if there are other particles or droplets with very similar characteristics to the oil droplets. To overcome this issue, a larger library of multiple samples matrices is required.

In this example, we show the capability of Nano-DIHM to record and get information of several metal oxides particles in Milli-Q water. We have used several metal oxides including aluminum oxide, copper oxide, iron oxide, lead oxide, nickel oxide, titanium oxide, and zinc oxide. These compounds were chosen because they are typically the most concentrated emerging metal contaminants in the environment, which are associated with modern technologies.

Figure 30:
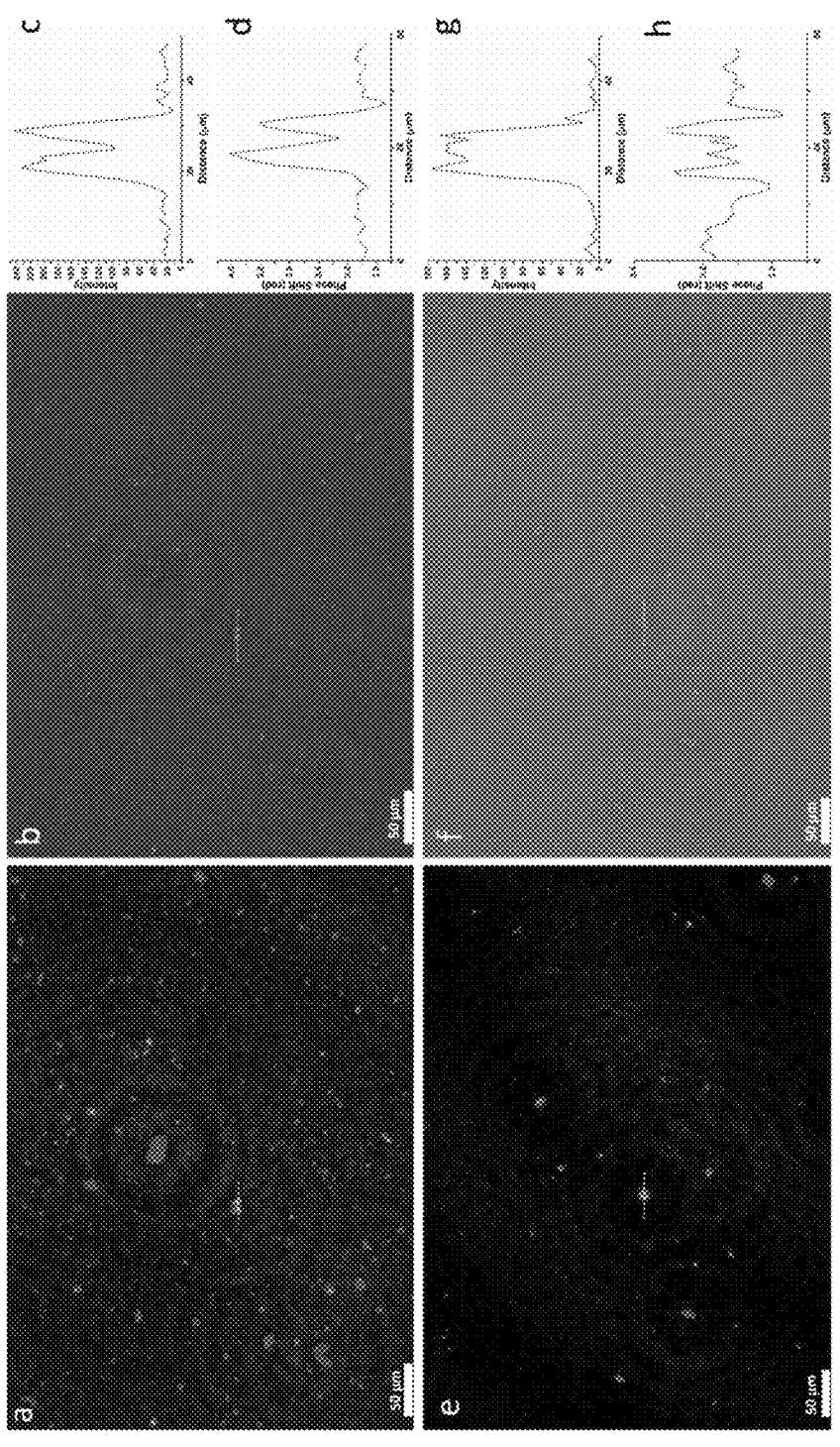
FIG. 30 shows reconstruction information for aluminum oxide suspension at a plane z=2421 µm for FIGS. 30(*a-d*), and copper oxide suspension at z=2543 µm for FIGS. 30(*e-h*), with FIG. 30(*a*) is intensity reconstruction.
Figure 31:
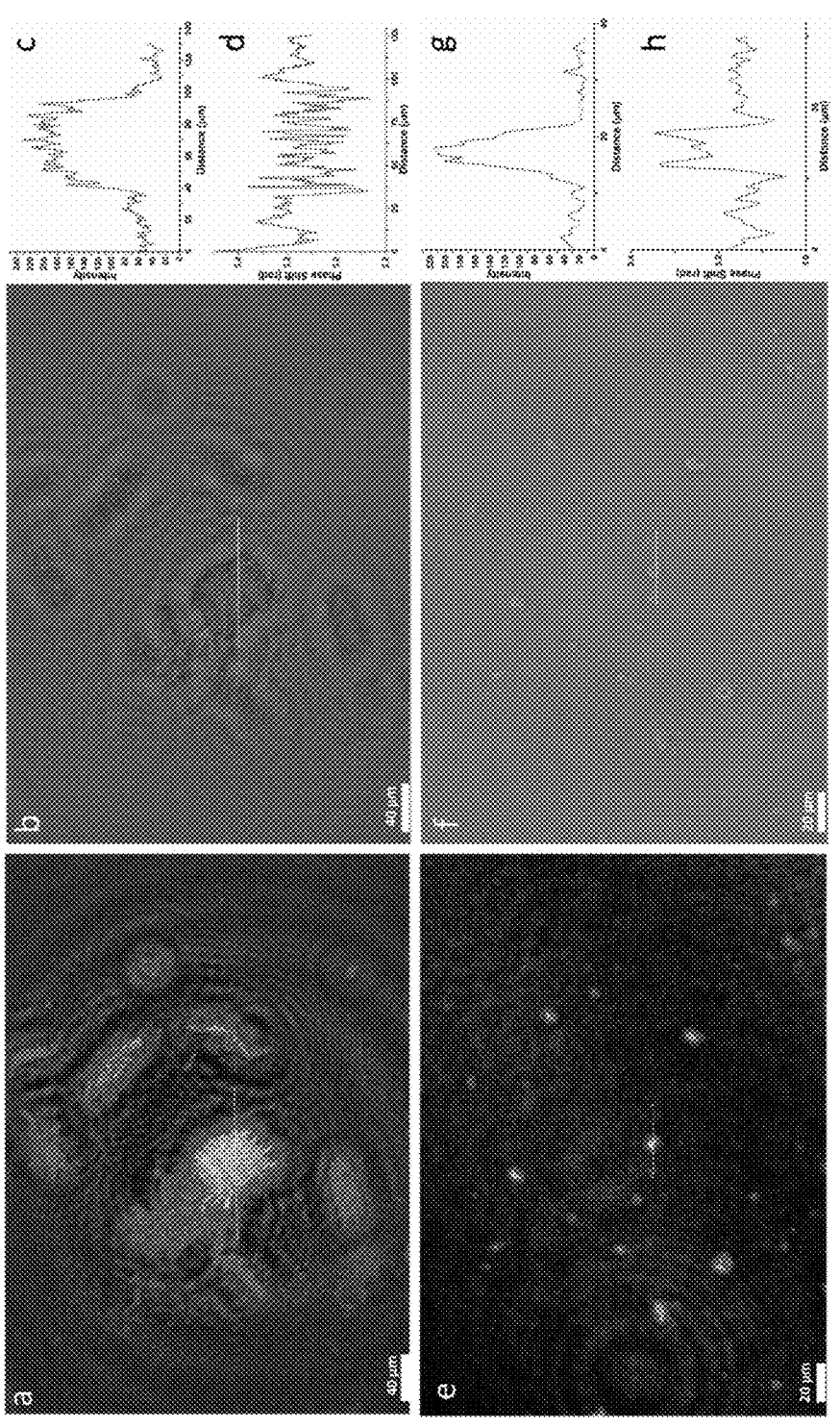
FIG. 31 shows reconstruction information for iron oxide suspension at z=655 µm for FIGS. 31(*a-d*), and zinc oxide suspension at z=2556 µm for FIGS. 31(*e-h*), with FIG. 31(*a*) is intensity reconstruction.

The Nano-DIHM resolved the size and shape of the stationary metal oxide particles and clusters, which typically ranged in size from 1 µm up to 100 µm. The technique has been shown to be capable of observing nano-sized particles in water, which is demonstrated in FIG. 36. As an example, FIG. 37 shows the object information of titanium oxide and nickel oxide particles suspended in Milli-Q water. FIG. 35, demonstrates the distinguishing of metal oxide from mercury sulfide within the same suspension while other metal oxide particles in water are depicted in FIGS. 30 and 31. Additionally, the reconstruction information of dry powder metal oxides is provided in FIGS. 32-34.

FIG. 30(*a*) is the intensity reconstruction of aluminum oxide suspension, while FIG. 30(*b*) is the phase reconstruction. FIG. 30(*c, d*) are the intensity and phase reconstruction crosscuts respectively. FIG. 30(*e*) is the intensity reconstruction of copper oxide suspension, while FIG. 30(*f*) is the phase reconstruction. FIG. 30(*g, h*) are the intensity and phase reconstruction crosscuts respectively.

FIG. 31(*a*) is the intensity reconstruction of nickel oxide suspension, while FIG. 31(*b*) is the phase reconstruction. FIG. 31(*c, d*) are the intensity and phase reconstruction crosscuts respectively. FIG. 31(*e*) is the intensity reconstruction of zinc oxide suspension, while FIG. 31(*f*) is the phase reconstruction. FIG. 31(*g, h*) are the intensity and phase reconstruction crosscuts respectively.

Figure 32:
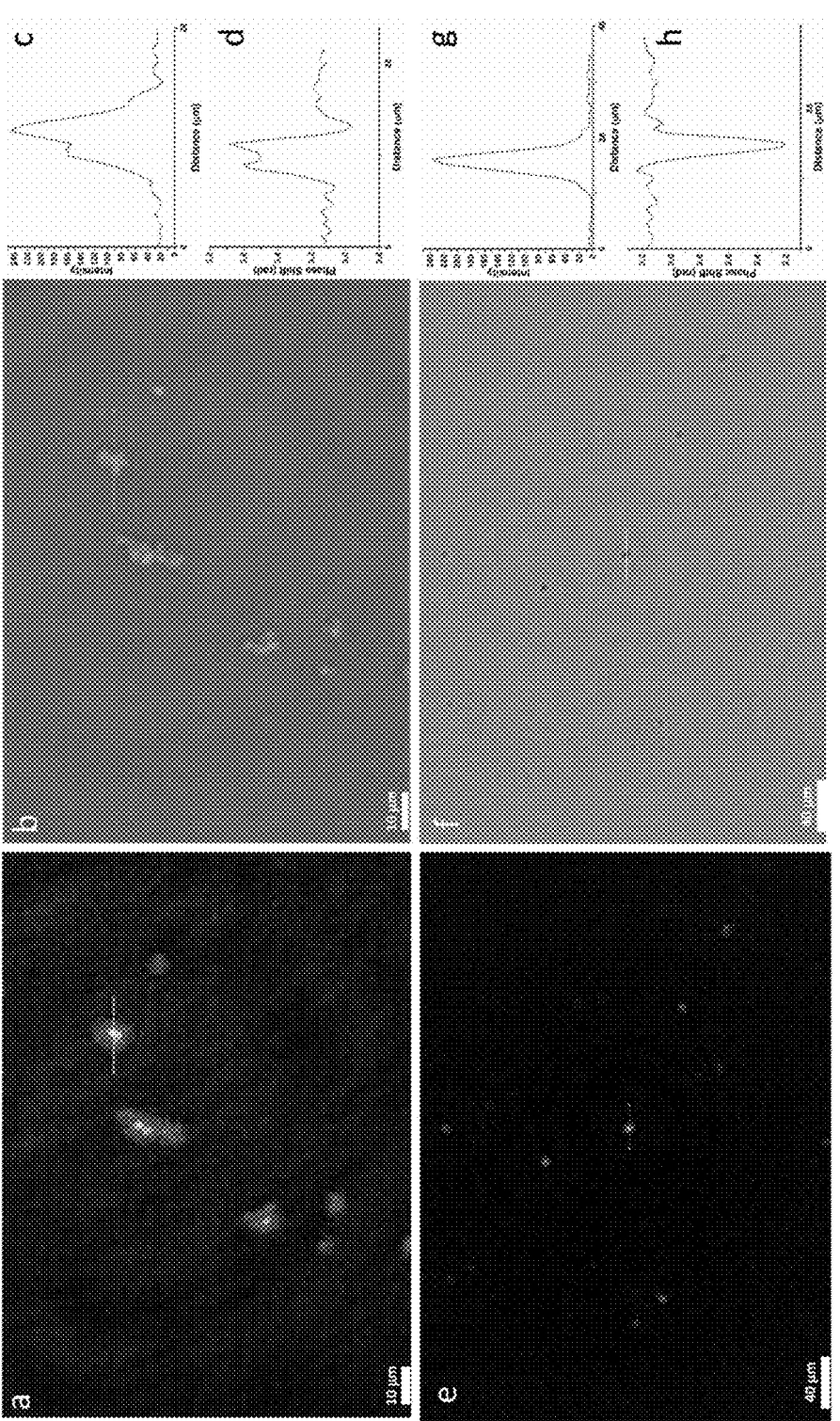
FIG. 32 shows reconstruction information for dry aluminum oxide at z=1956 µm for FIGS. 32(*a-d*), and dry copper oxide at z=1573 µm for FIGS. 32(*e-h*), with FIG. 32(*a*) is intensity reconstruction.

FIG. 32(*a*) is the intensity reconstruction of dry aluminum oxide powder, while FIG. 32(*b*) is the phase reconstruction. FIG. 32(*c, d*) are the intensity and phase reconstruction crosscuts respectively. FIG. 32(*e*) is the intensity reconstruction of dry copper oxide powder, while FIG. 32(*f*) is the phase reconstruction. FIG. 32(*g, h*) are the intensity and phase reconstruction crosscuts respectively.

Figure 33:
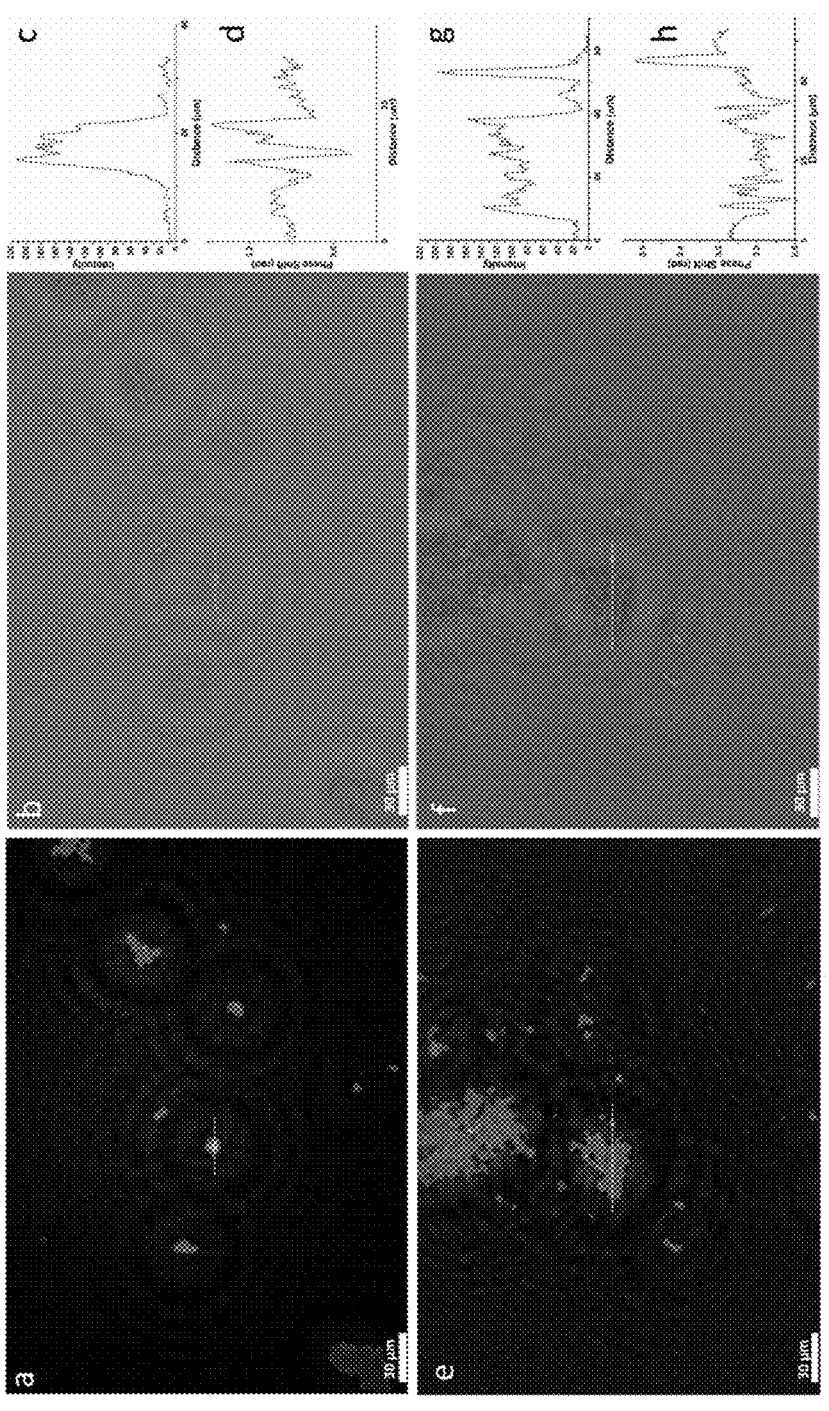
FIG. 33 shows reconstruction information for dry lead oxide at z=820 μm for FIGS. 33(a-d), and dry nickel oxide at z=820 μm for FIGS. 33(e-h), with FIG. 33(a) is intensity reconstruction.

FIG. 33(*a*) is the intensity reconstruction of dry lead oxide powder, while FIG. 33(*b*) is the phase reconstruction. FIG. 33(*c, d*) are the intensity and phase reconstruction crosscuts respectively. FIG. 33(*e*) is the intensity reconstruction of dry nickel oxide powder, while FIG. 33(*f*) is the phase reconstruction. FIG. 33(*g, h*) are the intensity and phase reconstruction crosscuts respectively.

Figure 34:
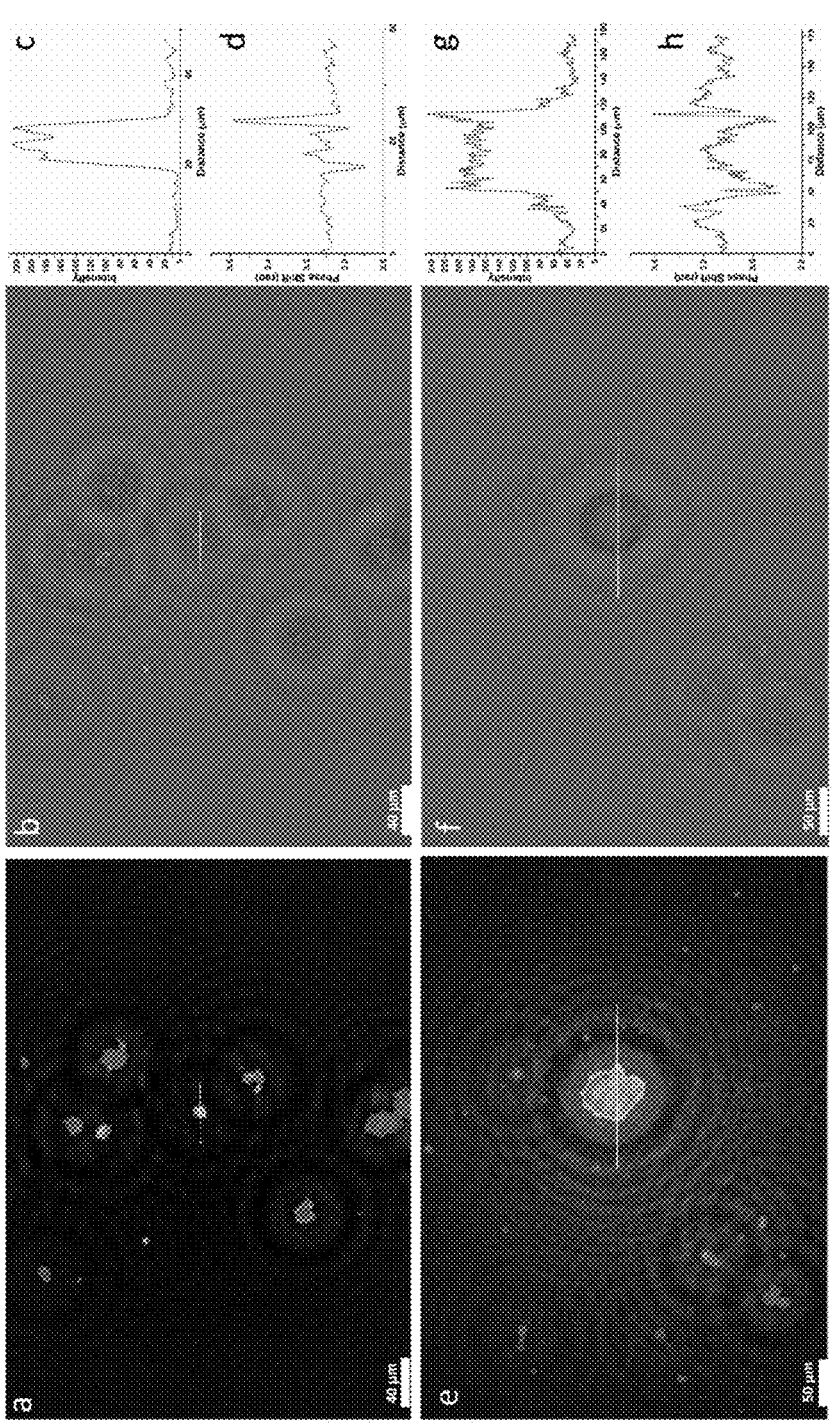
FIG. 34 shows reconstruction information for dry titanium oxide at z=1340 μm for FIGS. 34(a-d), and dry zinc oxide at z=2025 μm for FIGS. 34(e-h), with FIG. 34(a) is intensity reconstruction.
Figure 35:
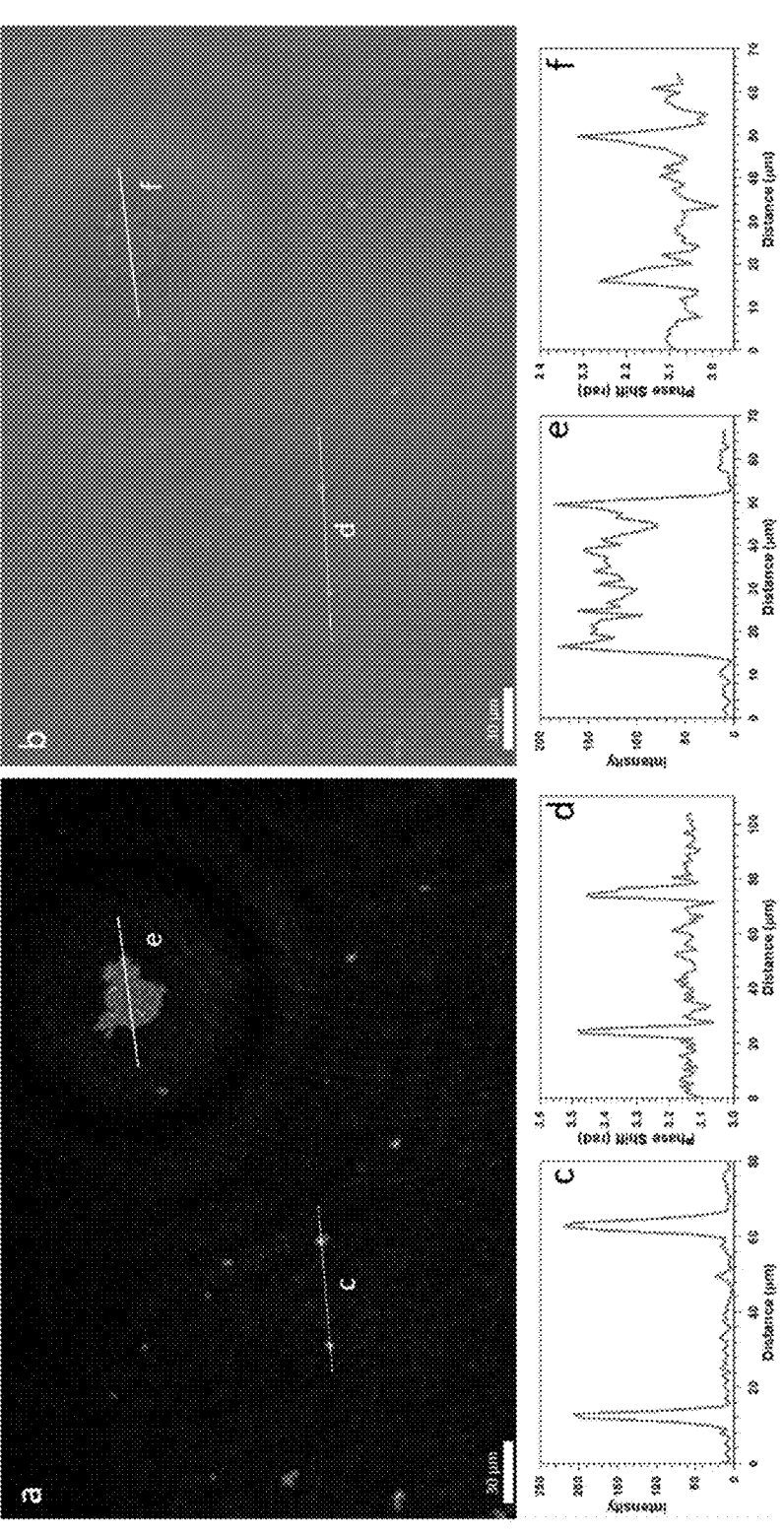
FIG. 35 shows reconstruction information for a mixture of mercury sulfide particles and titanium oxide particles in Milli-Q water, with FIG. 35(a) is intensity reconstruction of the mixture.

FIG. 34(*a*) is the intensity reconstruction of dry titanium oxide powder, while FIG. 34(*b*) is the phase reconstruction. FIG. 34(*c, d*) are the intensity and phase reconstruction crosscuts respectively. FIG. 34(*e*) is the intensity reconstruction of dry zinc oxide powder, while FIG. 34(*f*) is the phase reconstruction. FIG. 34(*g, h*) are the intensity and phase reconstruction crosscuts respectively.

Here we illustrate the effects on the size, shape, and phase of metal oxide particles mixed with mercury containing particles in a Milli-Q water suspension. In this way we demonstrate that we can distinguish between these different particles and display the interactions between them. The reconstructed holograms of the particle mixture of mercury sulfide and titanium oxide is illustrated in FIG. 35. This is used as a representative mixture to demonstrate the effects of mixing because they are common particles in each group.

FIG. 35(*a*) is the intensity reconstruction of the mixture, FIG. 35(*b*) is the phase reconstruction, FIG. 35(*c*) is the intensity reconstruction crosscut of titanium oxide particles from the mixture, FIG. 35(*d*) is the phase reconstruction crosscut of the titanium oxide particles from the mixture, FIG. 35(*e*) is the intensity reconstruction of crosscut of the mercury sulfide particles from the mixture, and FIG. 35(*f*) is the phase reconstruction of the mercury sulfide particles from the mixture. The particle sizes determined from the crosscuts were approximately 3 µm and 35 µm for titanium oxide and mercury sulfide respectively.

Figure 36:
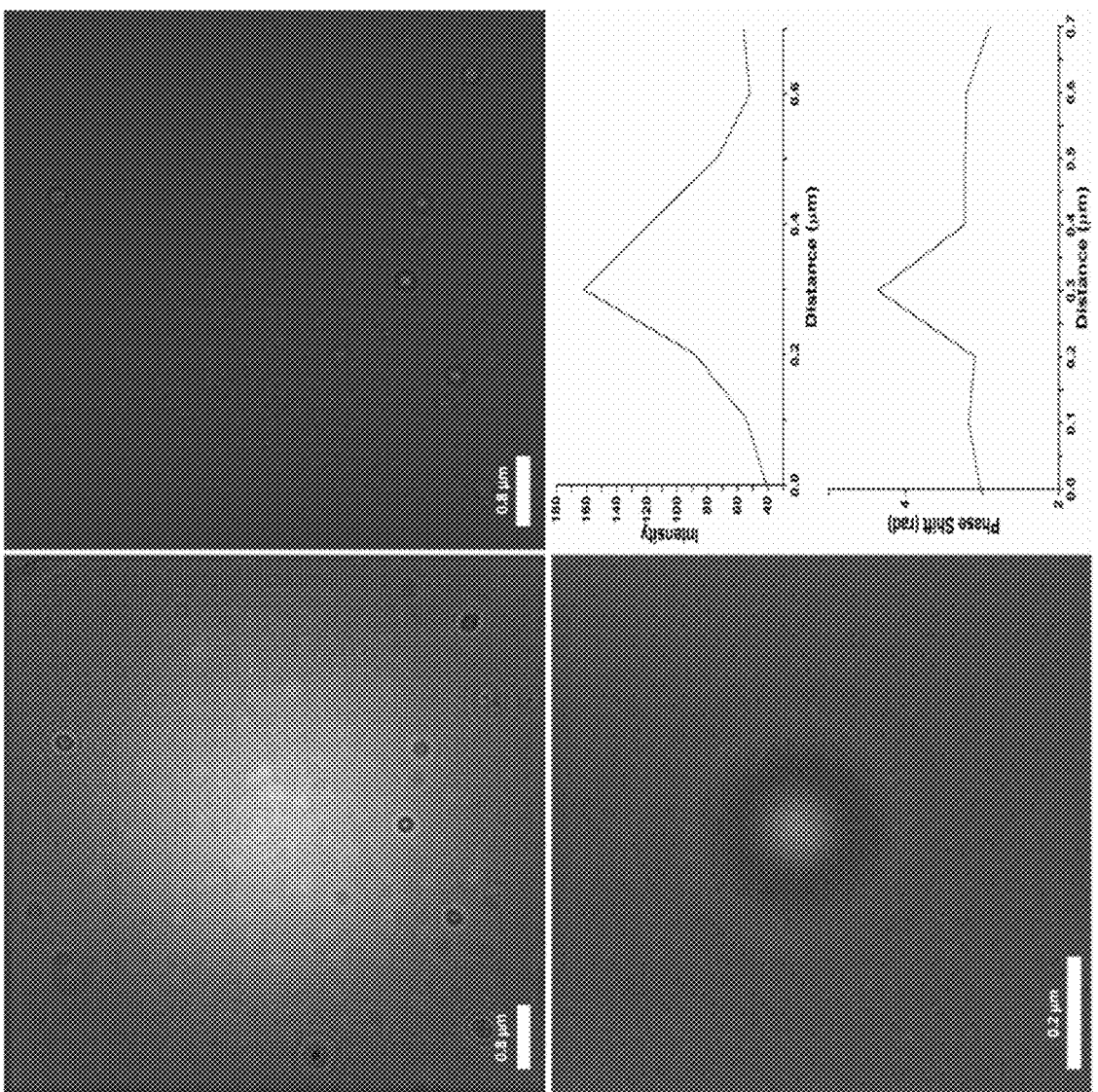
FIG. 36 shows reconstruction information for nano-sized titanium oxide particle in water at z=1150 μm, with FIG. 36(a) is intensity reconstruction.
Figure 37:
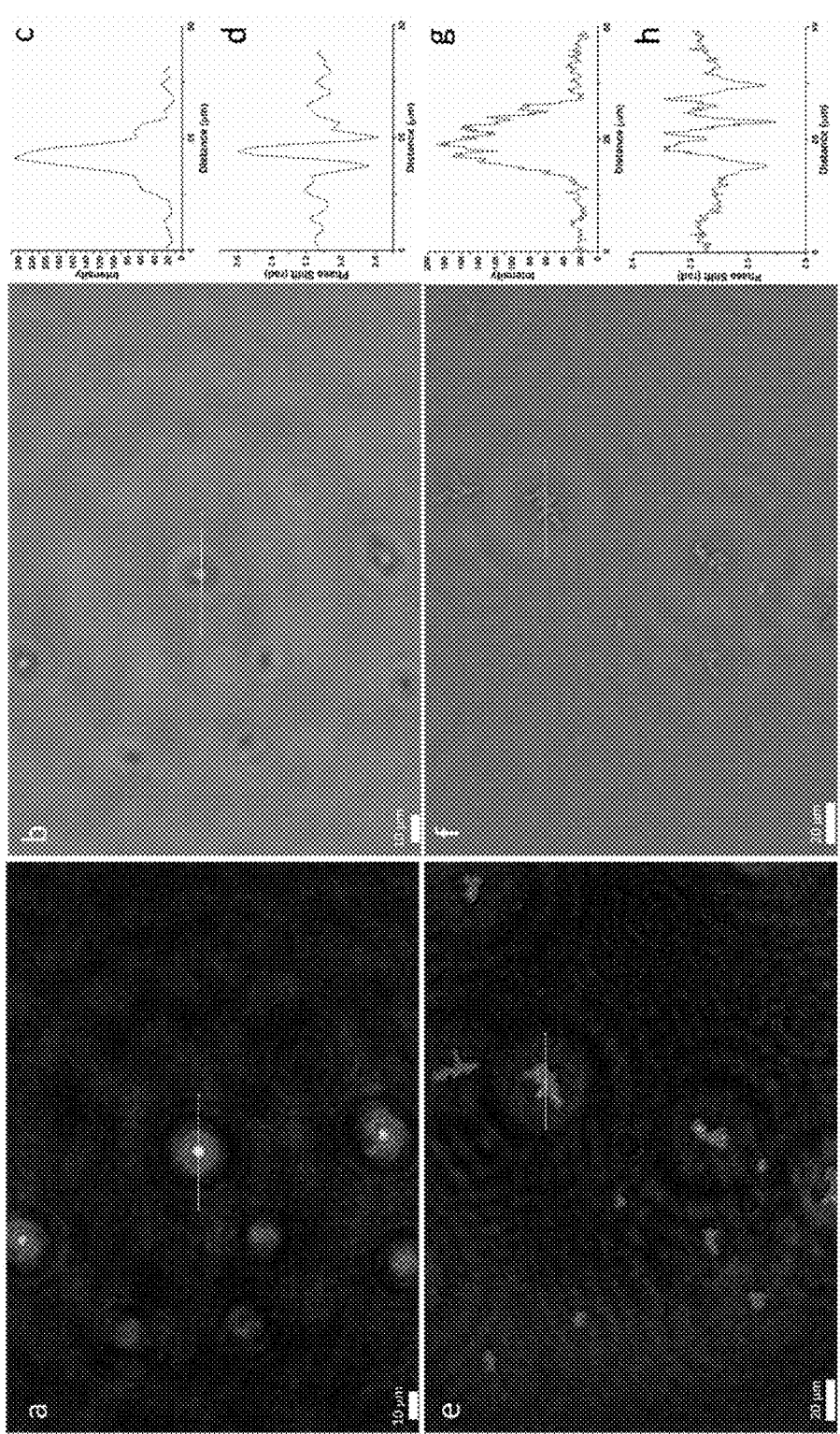
FIG. 37 shows intensity and phase reconstruction of titanium oxide in water at z=2278 μm, and nickel oxide in water at z=817 μm, with FIG. 37(a, b) Intensity and phase reconstructions of titanium oxide, with FIG. 37(c) showing intensity, and FIG. 37(d) phase shift crosscuts.

FIG. 36 shows an example observation of a nano-sized titanium oxide particle in water. The intensity and phase reconstructions are shown in FIG. 36(*a, b*), with a magnified phase image of a particle shown in FIG. 36(*c*). Intensity and phase shift crosscuts of the same particle are shown in FIG. 36(*d, e*).

Figure 38:
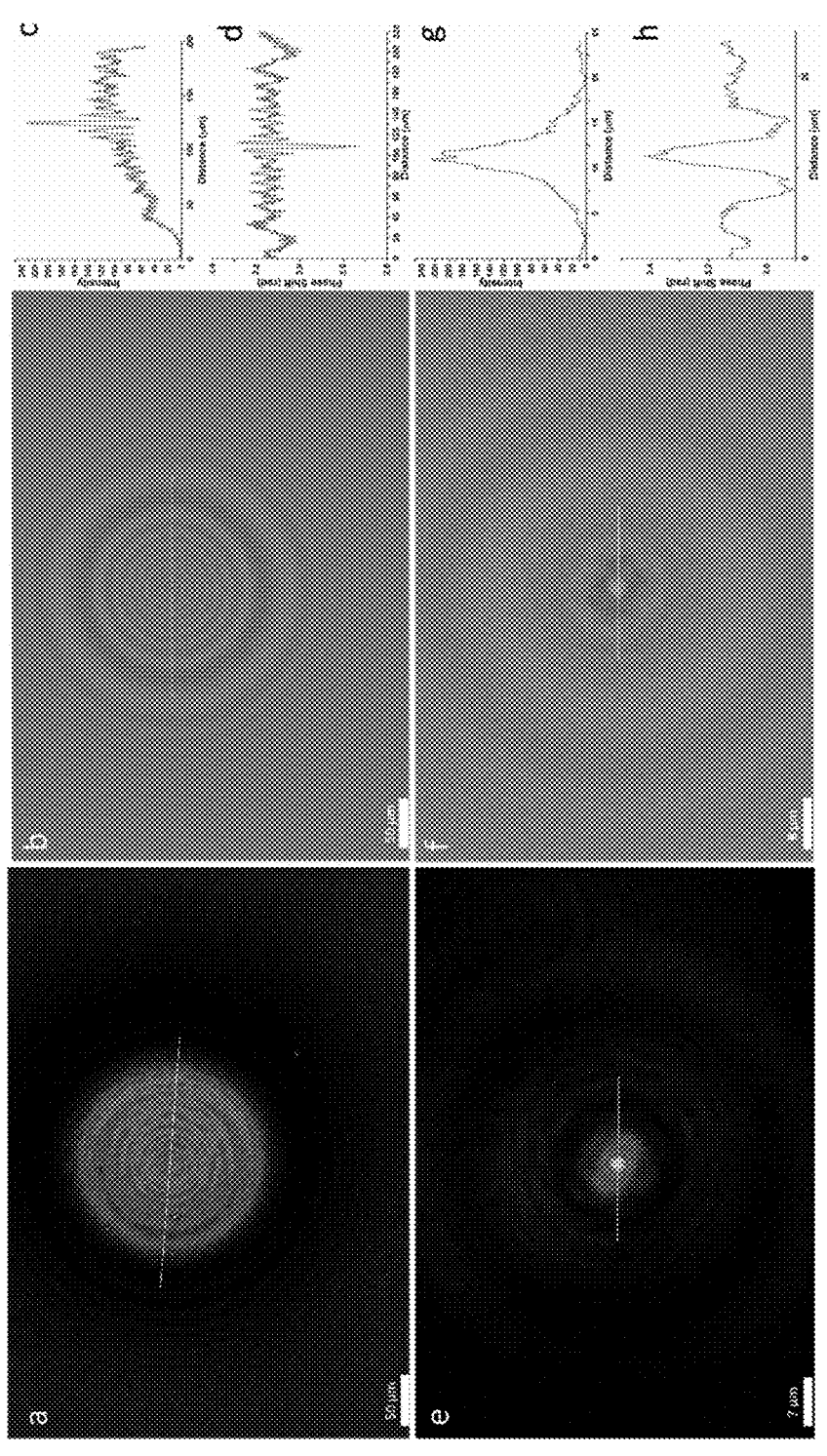
FIG. 38 shows intensity and phase reconstruction of an elemental mercury droplet at z=1911 μm, and mercury oxide particles in Milli-Q water at z=522 μm, with FIG. 38(a) Intensity reconstruction of elemental mercury.
Figure 39:
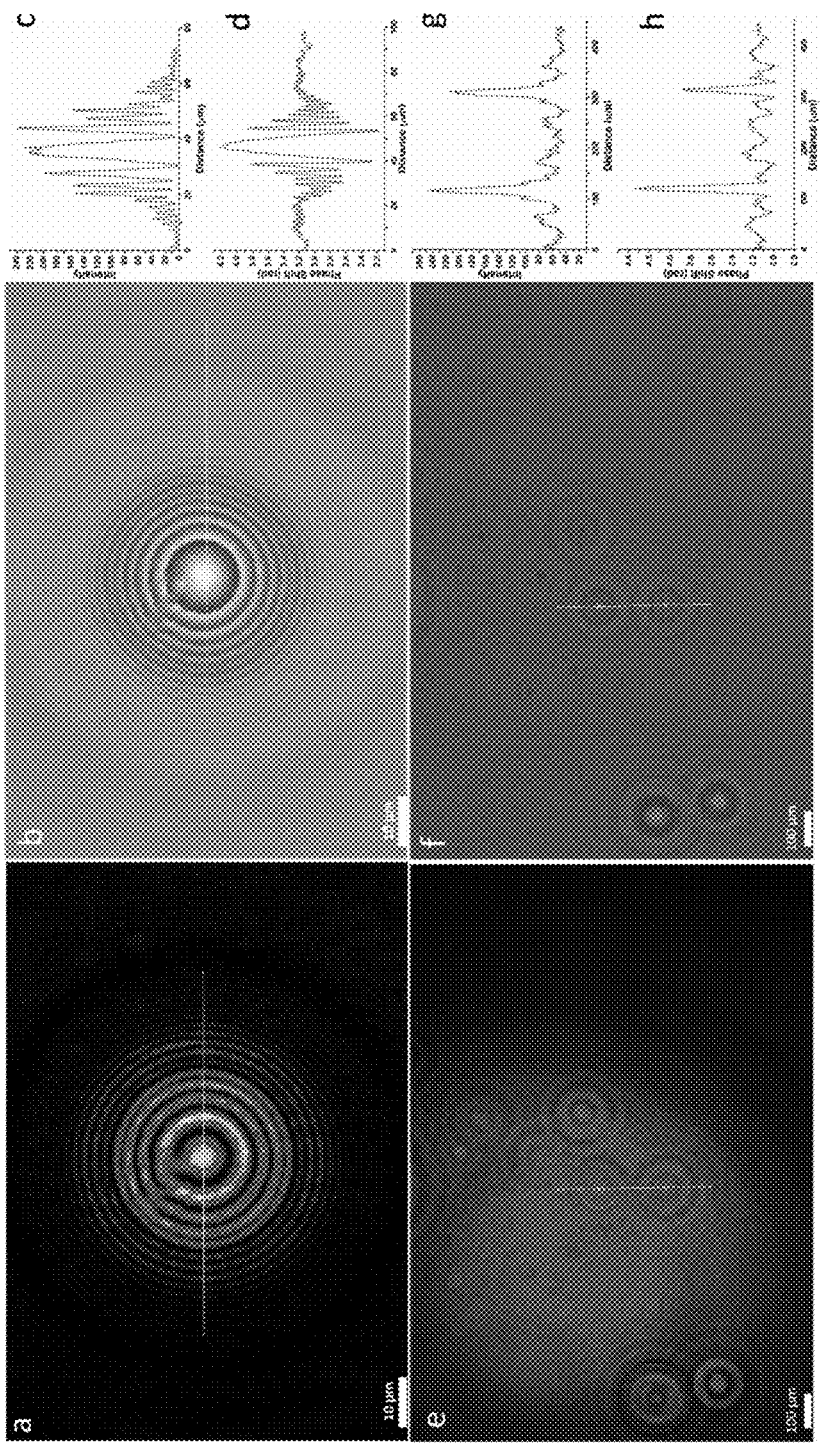
FIG. 39 shows intensity and phase reconstruction of mercury oxide coated with decanethiol at z=934 μm, and mercury oxide coated with benzene at z=6773 μm, with FIG. 39(a, b) Intensity and phase reconstructions of decanethiol coated mercury oxide, with FIG. 39(c) intensity, and FIG. 39(d) phase shift crosscuts.

There is a suite of experimental and theoretical research that has provided evidence for stable mercury compounds in the environment. The various mercury compounds (mercury oxides, halides, and organomercury) have been measured in environmental matrices, such as water, snow, and air. Here we demonstrate the observation of both elemental mercury, and mercury containing compounds made by Nano-DIHM (FIGS. 38-39). The elemental mercury measurements were taken by placing ~1 to 5 µL sized droplets onto the microscopic slide, without using the slide cover. By doing this the elemental mercury droplet still maintains its original shape (~spherical) due to the high surface tension. Due to the high opacity of elemental mercury, it has been observed to reflect/absorb a significant portion of light, thus creating ring like structures (FIG. 38(*a, b*)). The intensity and phase shift across the crosscuts of the particle is shown in FIG. 38(*c, d*).

We have also made observations of other mercury containing particles such as mercury oxide, and mercury sulfide. The intensity and phase reconstructions of mercury oxide particles suspended in Milli-Q are shown in FIG. 38(*e, f*). The intensity and phase shift across the crosscuts of the particle are shown in FIG. 38(*g, h*).

The sharp bi-modal intensity peak of mercury oxide particles suggests the agglomeration of particles (FIG. 38(*g*)) while the singular intensity peak is observed for elemental mercury droplets (FIG. 38(*c*)). It is well known that the elemental mercury is very opaque to light and thus only a fraction of light passes to the detector through the edge of elemental mercury. This is shown by the multiple peaks around the core of the elemental mercury droplet. A mercury oxide particle was easily distinguished from an elementary mercury droplet because of their intensity profiles as well as their shape (FIG. 38(*a*) and FIG. 38(*e*)).

We have suspended the mercury oxide particles with decanethiol and benzene. The results for mercury oxide coated with decanethiol are shown in FIG. 39. The intensity and phase reconstructions of the decanethiol coated mercury oxide is shown in FIG. 39(*a, b*). The impact of the decanethiol coating is clearly significant on mercury oxide particles in contrast to pure mercury oxide particles (FIG. 38(*e*)). The intensity and phase shift crosscuts of the decanethiol coated mercury oxide particle are shown in FIG. 39(*c, d*). The multimodal intensity and phase shift crosscut distribution indicates the interaction between the mercury oxide particle and decanethiol and indicates the heterogeneity of the particle. The broader peak in the intensity and phase shift shows the core of mercury oxide particle (~3 µm) while the rings/layers arise from the coating (FIG. 39(*a-d*)).

We also used benzene to coat the mercury oxide particles and evaluate the different organic coating impact (FIG.

Figure 40:
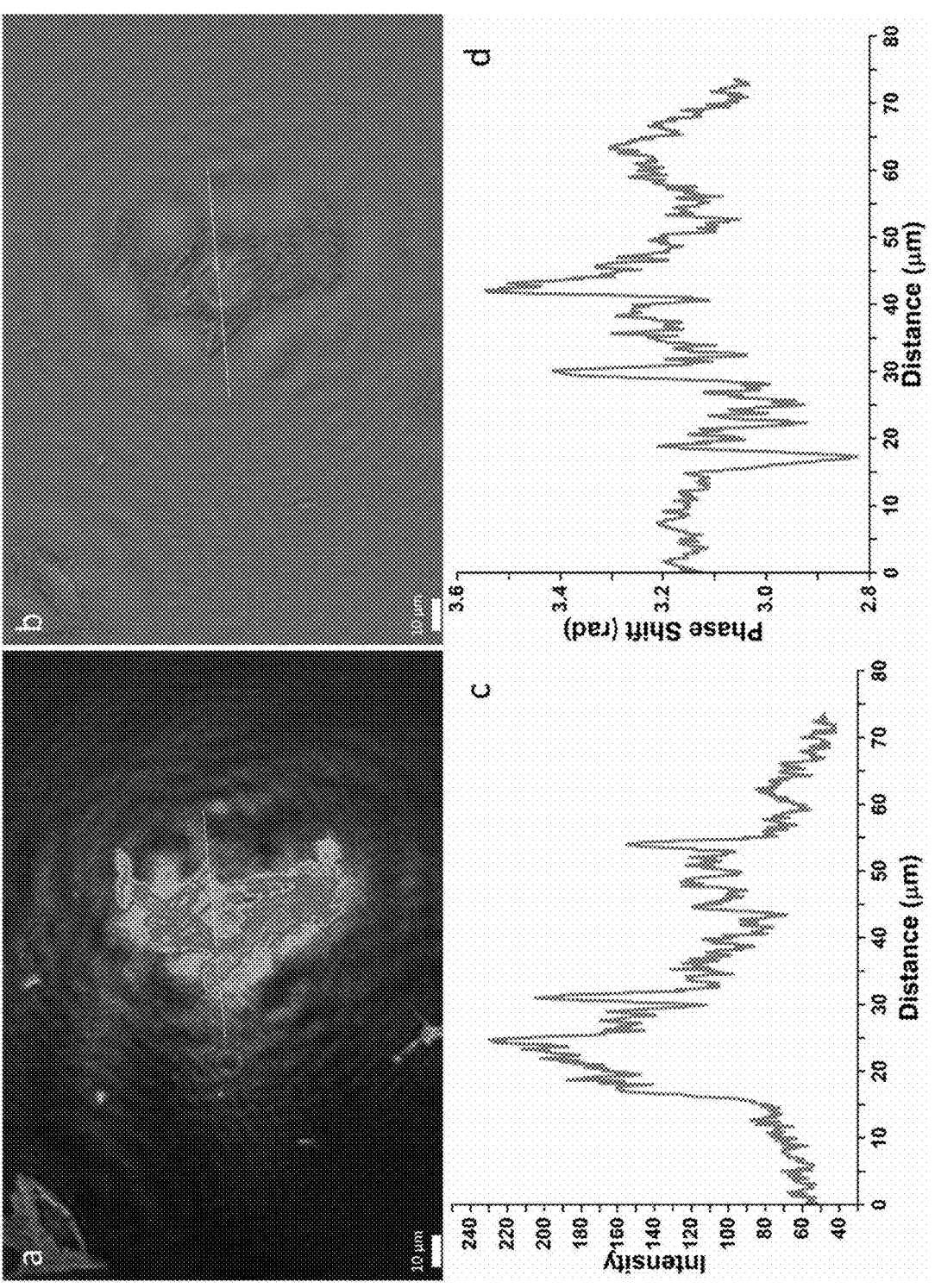
FIG. 40 shows reconstruction information for mercury chloride coated iron oxide particles, with FIG. 40(a) is intensity reconstruction.

39(*e-h*)). The intensity and phase reconstructions of a benzene coated mercury oxide particle are shown in FIG. 39(*e, f*). The intensity and phase shift crosscuts are shown in FIG. 39(*g, h*). The Nano-DIHM clearly distinguishes the coating of decanethiol and benzene on mercury oxide particles. It is clear evidence that the decanethiol has a stronger interaction with mercury oxide particles and transformed the mercury oxide particle structure to more layered structure. This could be understood due to the thiol group being strongly attracted to mercury. We further provide an example of iron oxide particles coated in the soluble mercury chloride species as shown in FIG. 40.

As an exploratory example, we show the impact of coating on the size, shape, and phase for iron oxide coated with mercury chloride (FIG. 40), as it is the more common mercury halide by concentration. The pure iron oxide images are provided in FIG. 40(*a-d*) for comparison. The intensity image of the coated iron oxide particle is shown in FIG. 40(*a*), and the phase reconstruction of the coated iron oxide particle is shown in FIG. 40(*b*). The intensity and phase across the crosscuts of the coated iron oxide particle are shown in FIG. 40(*c*) and FIG. 40(*d*) respectively.

Intensity and phase reconstructions of particles and clusters that are coated in other dissolved matter produce different results as compared to the same particles or clusters alone in suspension. In the first example of iron oxide in suspension, iron oxide tends to form rather large clusters or groupings of particles. In the case of iron oxide in the presence of dissolved matter, we show an example of iron oxide with mercury chloride in solution. Mercury chloride is a soluble mercury-containing compound, and we chose it as an example due to its presence in natural waters and its ability to be transformed into the more dangerous organo-mercury compounds. FIG. 40 shows the effect of a coating being present on the iron oxide surface. There is a clear increase in the noise intensity in the immediate surroundings of the iron oxide cluster. In this case there is a more prominent difference in the intensity reconstruction than the phase reconstruction, although there is a slight difference in the pattern around the cluster.

Figure 41:
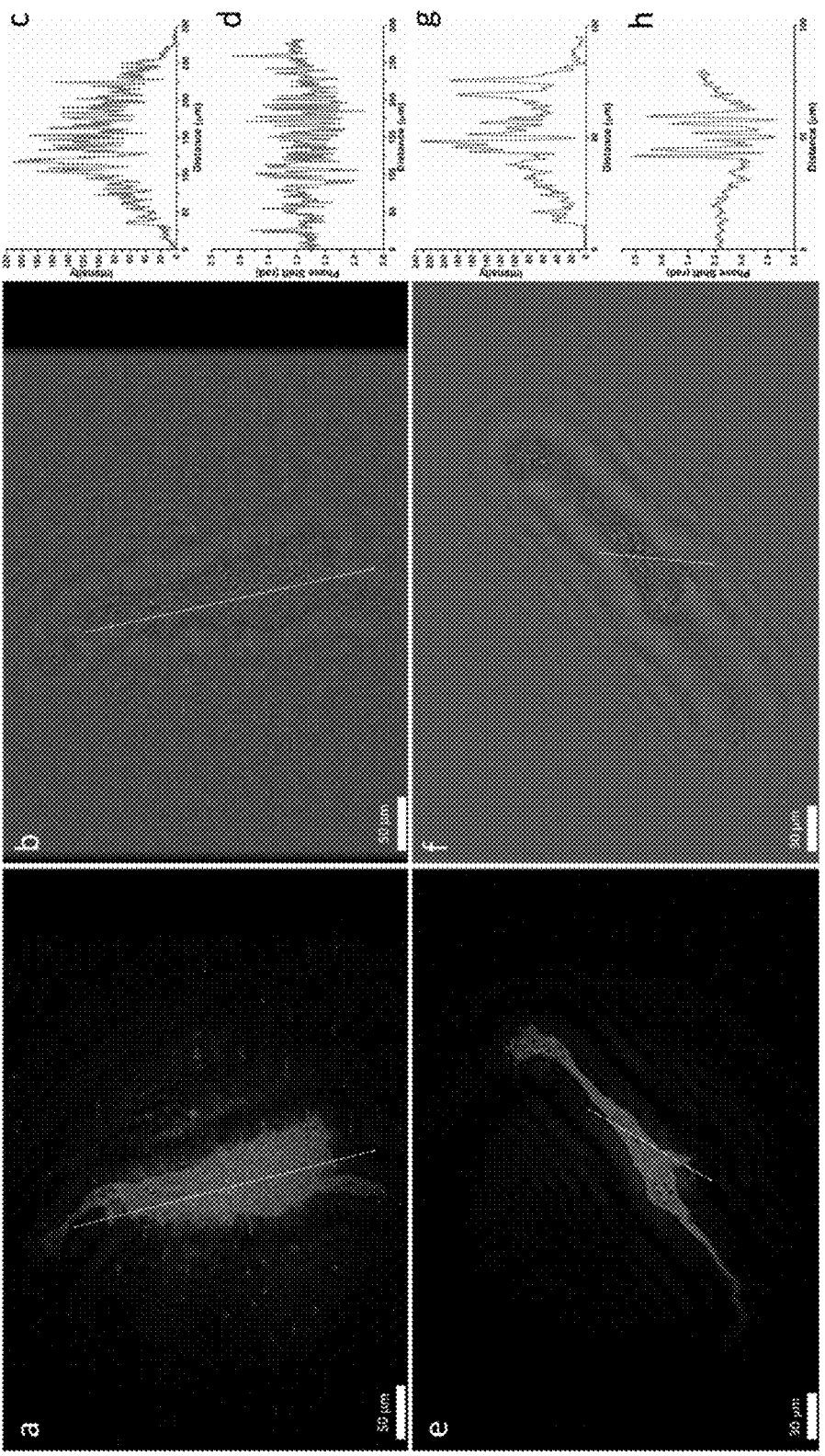
FIG. 41 shows intensity and phase reconstructions for MS2 bacteriophage particles alone and mixed with mercury oxide in water, with FIG. 41(a, b) Intensity and phase reconstructions of MS2 bacteriophage.

In the following, we show the impact of bio-organic material, such as MS2 bacteriophage on mercury oxide particles. The model MS2 bacteriophage is a common virus which is abundant on the microlayer of larger water body and is not harmful for humans. We first imaged the MS2 bacteriophage particles in Milli-Q water without interactions with another particle. The intensity and phase reconstructions of MS2 bacteriophage in water are shown in FIG. 41(*a, b*). The intensity and phase shift crosscuts of MS2 bacteriophage are shown in FIG. 41(*c, d*). The high viscosity and surface tension makes MS2 molecules sticks together and form a cluster within a suspension/drop which is shown in FIG. 41(*a*).

The interaction between MS2 and mercury oxide particles is shown in FIG. 41(*e*). As shown in FIG. 41(*e*), the mercury oxide particles stick on the MS2 shape and change the morphology of MS2 with typically an elongated cluster. The intensity and phase crosscut reconstructions of the mixed (MS2 and mercury oxide) particles can be seen in FIG. 41(*g, h*). Quantitatively, the phase shift changes of MS2 particles in original colloidal suspension varies from 3.2 to 3.6 rad while the mixed particle (MS2 and mercury oxide) shows the phase shift changes 3.2 to 3.8 rad. Overall, the mixed particles show significant changes in their surface morphology due the high surface tension of MS2 attracting the mercury oxide particles and producing a more compact structure.

TEM allows for very high-quality images of particles down to the nanometer scale. TEM can only be used for offline analysis and samples can be dried on a TEM grid before imaging. The downside of TEM is that it cannot be used on a liquid sample or in-situ in real time, dynamic suspension, while Nano-DIHM can be used to analyse particles in a fluid in motion (dynamic).

Figure 42:
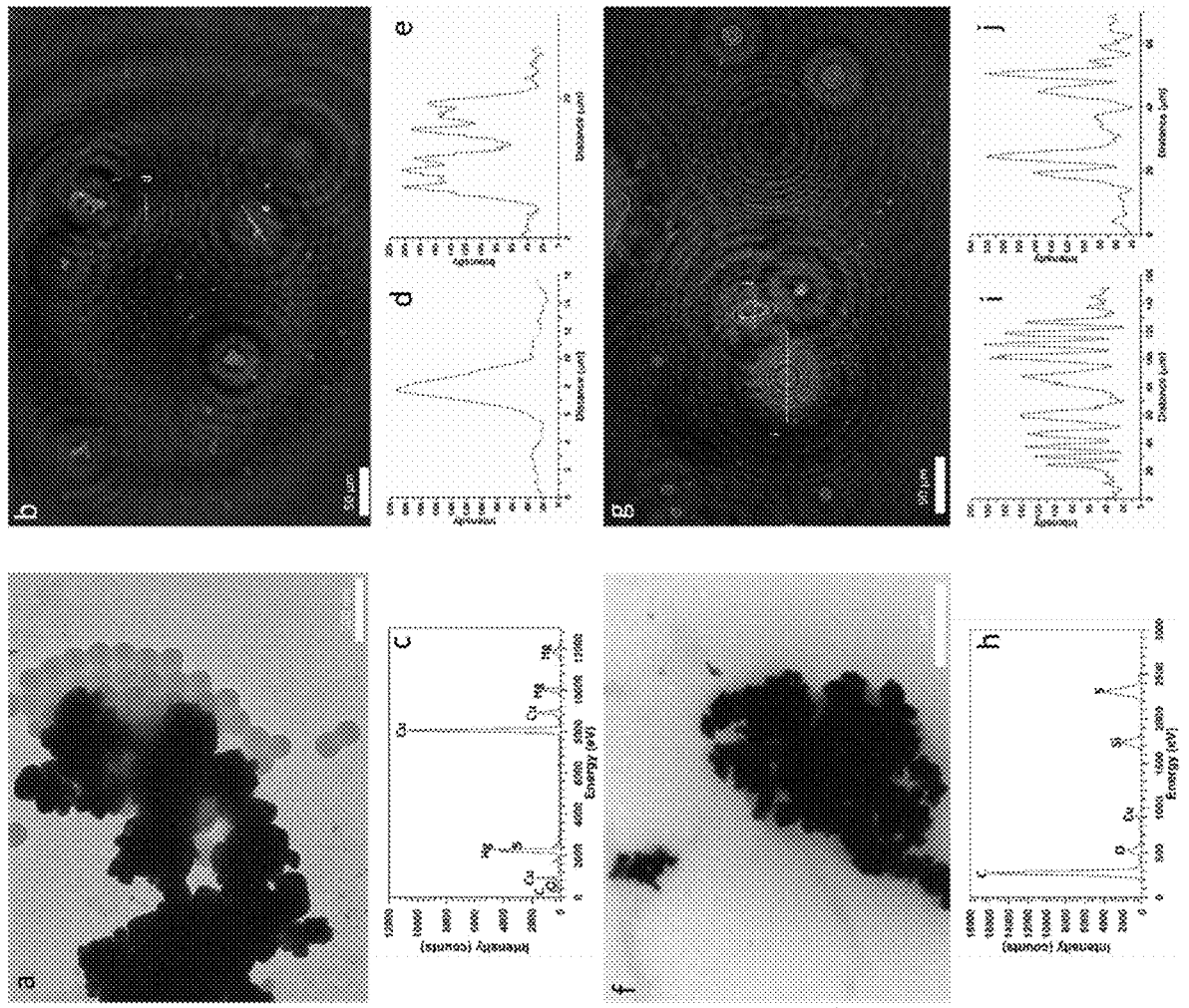
FIG. 42 shows a comparison of techniques, with FIG. 42(a) showing S/TEM of mercury sulfide and PSL.

The following provides a comparison of the current work's nano-DIHM technique with the well-established technique of transmission electron microscopy. The first sample contains a mixture of mercury sulfide and PSL particles in Milli-Q water. The second sample contains mercury sulfide particles coated with decanethiol in Milli-Q water. During the sample preparation stage before taking images with TEM, however, the sample is dried on the copper grid. This difference in procedure causes the particles to aggregate differently than in the holographic images, which allows the samples to still be in suspension. The described comparison is shown in FIG. 42. FIG. 42(*a*) shows the S/TEM image of mercury sulfide particles mixed with PSL, and FIG. 42(*c*) is the corresponding energy-dispersive x-ray spectroscopy (EDS) results showing the presence of mercury and sulfur. FIG. 42(*b*) is the intensity reconstruction for the mixture of mercury sulfide and PSL particles, and FIG. 42(*d, e*) are the intensity reconstruction crosscuts for the PSL and mercury sulfide particles respectively. FIG. 42(*f*) depicts the S/TEM image for mercury sulfide particles coated in decanethiol, and FIG. 42(*h*) is the corresponding EDS results taken to show the sulfur specifically only from the coating on the particles. FIG. 42(*g*) is the intensity reconstruction for mercury sulfide coated with decanethiol, and FIG. 42(*i, j*) are the intensity reconstruction crosscuts of two decanethiol-coated mercury sulfide particles.

This study presents a novel nano-DIHM technique for in-situ and real-time detection and characterization of various types of contaminant-containing particles present in natural waters. The primary contaminants of concern are oil droplets from spills, mercury-containing particles, virus-containing aerosols, and heavy metals. Nano-DIHM is a significant advancement as it demonstrates a viable method for in-situ detection and characterization of contaminant particles. We show the ability of the combination of octopus and Stingray software to be trained to recognize specific contaminants, such as oil vs water in dynamic mode. This provides an advantage of the technique to record particles in motion and track their trajectories and interactions in real time.

In addition to the applicability as a sensor, the other primary goal of this study is demonstrating the ability to characterize various contaminant-containing particles and see the effects of their interactions with each other and other soluble materials in a sample. While many of these studies were performed in stationary microscopic slides to demonstrate more detailed stationary interactions between particles of different types and soluble coatings, we show the ability of the technique for studying these same interactions in-situ. However, the resolution of the Nano-DIHM (cost effective) is not equivalent to much more expensive S/TEM. The Nano-DIHM provide a significant benefit and allows much more flexibility when characterizing particles and interactions that are naturally suspended in water in situ in real time then S/TEM.

This study can be expanded upon in future studies by training the software for various contaminant-containing particles relevant to a specific area and implementing it on real-world waters to test the ability to distinguish the specified contaminants from a more polluted sample. A larger library of contaminants/compounds data set is required to use this technique in future complex environmental matrices. This challenge can be overcome by adding more reference data. The Nano-DIHM in future also can be used as a particle counter in water borne contaminant studies. An example of this would be to use the technique at the site of a previous oil spill to see if oil droplets are remaining. Finally, Nano-DIHM is also usable on particles suspended in air and will be further employed for identifying and characterizing contaminant-containing particles under various atmospheric conditions, such as temperature, pressure, and in the presence of other gaseous pollutants.

Figure 43:
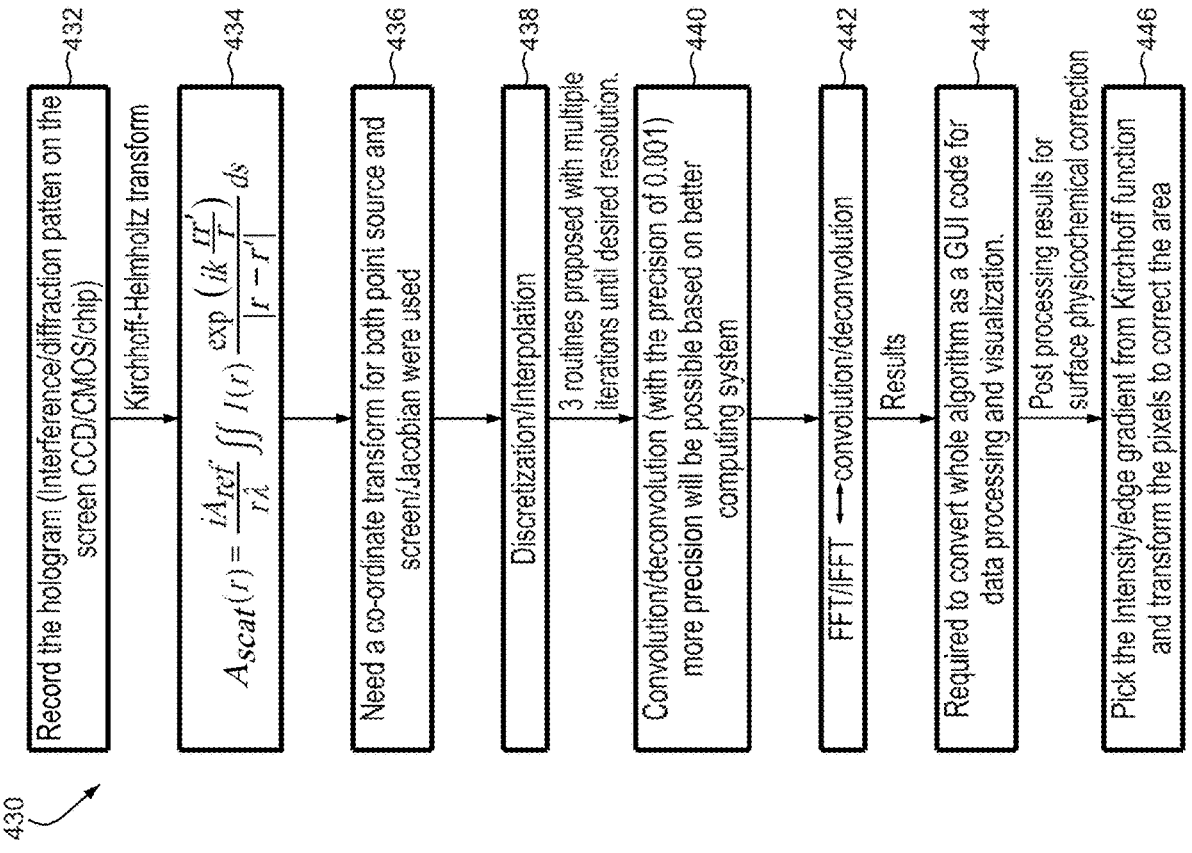
FIG. 43 is a flow chart of an example of a method of reconstructing holograms, in accordance with one or more embodiments.

FIG. 43 shows an example of a method 430 of reconstructing holograms, in accordance with an embodiment. As shown in this example, the method 430 includes a step 432 of recording one or more holograms including interference, diffraction patterns on the sensor screen. At step 434, the recorded hologram is processed according to the Kirchhoff-Helmholtz transform. At step 436, co-ordinate transform(s) for both the point source and the sensor screen/Jacobian are performed. At step 438, a step of discretization and/or interpolation is performed. At step 440, a step of convolution and/or deconvolution (with the precision of 0.001 or more) is performed. The step 440 can be performed at least three times so as to include at least three deconvolution steps. At step 442, FFT/and/or convolution/deconvolution steps are performed. At step 444, the method 430 provides a graphical user interface (GUI) for data processing and visualization. At step 446, an intensity and/or edge gradient is selected from the Kirchhoff function and the pixels are transformed to correct the area. In some embodiments, the step of acquiring the plurality of holograms is followed by reconstructing the holograms in an automated manner by a computer. The reconstruction can include the steps of the method 430. In some embodiments, a type for each particle in a reconstructions is identified in an automated manner with a computer having been trained using machine learning.

As can be understood, the examples described above and illustrated are intended to be exemplary only. The method and system described herein can be used in many applications including, but not limited to, oil industry (e.g., spills), sustainable technology, RNA/DNA, electron microscopy, nanotechnology, medicine, biogeochemisty, aerosol sciences, pharmaceutical, remote sensing (e.g., extra terrestrial research), climate change, ice nucleation, material science and technology, aerosol sciences, air quality and e-waster treatment recycling, to name a few examples. In some applications, the medium is a fluid. In this disclosure, the term "fluid" is meant to encompass any type of fluid including, any liquid, any gas, any aerosol, fluid of any viscosity or texture, rheological fluids, suspensions, to name a few examples. In some embodiments, the wavelength of the light source is dependent on the medium. For instance, the wavelength of the light source can be about 405 nm when the medium is water. However, other wavelengths can be preferably used for other types of mediums. In some embodiments, there is described a measurement system for use in performing shape, size, intensity and phase measurements of a medium. The measurement system can include a digital in-line holographic microscope (DIHM) including a light source directed through a pinhole towards a sensor forming an illuminated volume between the pinhole and the sensor, and a medium holder (such as a microscope slide, a flow tube, and the like) having an interrogation volume configured to receive the medium and be placed within the illuminated volume, wherein the sensor collects holographic images of the medium. The scope is indicated by the appended claims.

What is claimed is:

1. A method of performing measurements comprising:
propagating a light beam through a pinhole, and propagating a diverging beam exiting the pinhole first across a medium including particles and then to a sensor;
acquiring, with the sensor, a hologram constructed from the interaction between the diverging beam and particles, the hologram including scattering information of the particles;
performing a numerical reconstruction of the hologram;
changing the distance between the pinhole and the medium including the particles and repeating the steps of propagating, acquiring, and preforming a numerical reconstruction for a plurality of different planes extending between the pinhole and the medium including the particles the planes being perpendicular to an orientation defined between the pinhole and the sensor; and
determining, from the numerical reconstructions of the holograms, at least one of shape, size, intensity and phase of the particles from the scattering information of said particles.

2. The method of claim 1 wherein the medium is a fluid, the method further comprising circulating the fluid including the particles across the light beam, between the pinhole and the sensor.

3. The method of claim 2 wherein said circulating includes circulating the fluid within a flow tube.

4. The method of claim 3 wherein the flow tube includes an inlet and an outlet, said circulating including circulating the medium from the inlet to the outlet forming a directional moving flow.

5. The method of claim 3 further comprising the flow tube partially reflecting the diverging light beam backward multiple times, superposing diverging light coming directly from the pinhole with reflected light which appears to come from multiple virtual pinholes, wherein the particles are ≤200 nm.

6. The method of claim 2 wherein the fluid includes water, and the light beam has a wavelength within the visible range of the electromagnetic spectrum.

7. The method of claim 6 wherein the wavelength of the light beam is about 405 nm.

8. The method of claim 1 wherein, for particles having a dimension below one micrometer, a distance between the pinhole and the medium is within 5 micrometers, preferably with 4 micrometers, and most preferably within 3 micrometers.

9. The method of claim 1 wherein the sensor has a field of view of at least 25 mm², preferably at least 30 mm² and most preferably at least 40 mm².

10. The method of claim 1 wherein said determining including identifying which of the reconstructions corresponding to a given one of the different planes has a sharpness above a given sharpness threshold.

11. The method of claim 1 wherein said planes are spaced apart by 0.01 micrometers or less from each other.

12. The method of claim 1 wherein said performing a numerical reconstruction includes performing at least three deconvolution steps.

13. The method of claim 1 wherein the step of determining at least one of shape, size, intensity and phase of the particles further includes determining dynamic information of the particles over a period of time.

14. The method of claim 1 wherein the particles have a particle size of less than 100 microns, preferably less than 100 nm.

15. The method of claim 1 wherein the medium including the particles is an aerosol.

16. The method of claim 15 wherein the aerosol is a bioaerosol, the bioaerosol being a virus aerosol of airborne viruses, the bioaerosol being a virus nanoparticle or microparticle aerosol, comprising airborne particles or droplets with a virus.

17. The method of claim 15 wherein the aerosol includes microplastic particles.

18. The method of claim 1 wherein the particles are biological particles containing biological material, the step of acquiring being preceded by irradiating the medium with a secondary light source, the secondary light source emitting light in the ultraviolet range of the electromagnetic spectrum, the biological particles being photolyzed when irradiated by the secondary light source.

19. The method of claim 1 wherein the step of acquiring the plurality of holograms is followed by reconstructing the holograms in an automated manner by a computer.

20. The method of claim 1 wherein the step determining at least one of shape, size, intensity and phase of the particles is followed by identifying a type for each particle in an automated manner with a computer having been trained using machine learning.

21. The method of claim 1 wherein the performing a numerical reconstruction includes processing the hologram according to a Kirchhoff-Hemlholtz transform followed by performing a fast-Fourier transform (FFT).

22. The method of claim 21 further comprising performing real-time volumetric reconstruction and 4D particle tracking.

23. The method of claim 1 further comprising measuring phase shift from the numerical reconstruction of the holograms, and determining refractive index of said particles based on a known size of the particles and on the phase shift.

* * * * *